US009643201B2

(12) United States Patent
Toh et al.

(10) Patent No.: US 9,643,201 B2
(45) Date of Patent: *May 9, 2017

(54) HIGH VISCOSITY FLUID DISPENSING SYSTEM

(71) Applicant: The Boeing Company, Chicago, IL (US)

(72) Inventors: Chin H. Toh, Orange, CA (US); Trent Rob Logan, Foothill Ranch, CA (US); John Walter Pringle, IV, Gardena, CA (US); Rodney Stephen Wright, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/096,275

(22) Filed: Dec. 4, 2013

(65) Prior Publication Data

US 2014/0367481 A1    Dec. 18, 2014

Related U.S. Application Data

(63) Continuation-in-part of application No. 13/919,318, filed on Jun. 17, 2013, now Pat. No. 9,415,404.

(51) Int. Cl.
*B05B 7/06*    (2006.01)
*B05B 1/14*    (2006.01)
(Continued)

(52) U.S. Cl.
CPC ...... *B05B 15/0431* (2013.01); *B05C 11/1044* (2013.01); *B05C 17/00516* (2013.01); *B05C 17/00543* (2013.01); *B64F 5/0009* (2013.01)

(58) Field of Classification Search
USPC ............ 118/313–315; 239/570, 106, 533.15, 239/558, 560, 561, 575, 590, 596, (Continued)

(56) References Cited

U.S. PATENT DOCUMENTS

| | | |
|---|---|---|
| 3,883,305 A | 5/1975 | Hoskins et al. |
| 3,938,467 A | 2/1976 | Radowicz |

(Continued)

FOREIGN PATENT DOCUMENTS

| | | |
|---|---|---|
| DE | 4225618 A1 | 2/1994 |
| EP | 0278560 A1 | 8/1988 |

(Continued)

OTHER PUBLICATIONS

"See-Flo IPD Dispenses High Viscosity Adhesives," Sealant Equipment and Engineering, Inc., Apr. 2000, 2 pages, accessed Mar. 26, 2013. http://www.sealantequipment.com/pressrel/seefloipd.htm.

(Continued)

*Primary Examiner* — Yewebdar Tadesse
(74) *Attorney, Agent, or Firm* — Yee & Associates, P.C.

(57) ABSTRACT

A method and apparatus for depositing a fluid over an interface. A nozzle may comprise a body having a first end and a second end, an input located at the first end of the body, an output located at the second end of the body, and a plurality of channels located within the body. The input may be configured to receive a fluid. The plurality of channels may have a configuration that causes the fluid received through the input to flow through the plurality of channels and exit the output to form a deposition having a desired shape over an interface.

14 Claims, 31 Drawing Sheets

(51) Int. Cl.
*B05B 15/04* (2006.01)
*B05C 17/005* (2006.01)
*B05C 11/10* (2006.01)
*B64F 5/00* (2017.01)

(58) Field of Classification Search
USPC .................. 239/DIG. 23, 601; 141/311 A
See application file for complete search history.

(56) References Cited

U.S. PATENT DOCUMENTS

| | | | |
|---|---|---|---|
| 5,094,278 | A | 3/1992 | Arao et al. |
| 5,335,862 | A | 8/1994 | Esper |
| 5,472,144 | A | 12/1995 | McDonald |
| 5,865,221 | A * | 2/1999 | Ludwig ................. B65B 39/004 141/115 |
| 7,594,616 | B2 * | 9/2009 | Hupp ..................... F16K 23/00 141/311 A |
| 2014/0077006 | A1 | 3/2014 | Goudy |
| 2014/0367480 | A1 | 12/2014 | Toh et al. |

FOREIGN PATENT DOCUMENTS

EP 0572061 A1 5/1992
EP 0509323 A2 10/1992

OTHER PUBLICATIONS

"Non-stick surface," Wikipedia Foundation, Inc., last modified Mar. 2013, 3 pages, accessed Mar. 26, 2013. http://en.wikipedia.org/wiki/Non-stick_surface.
"Polytetrafluoroethylene," Wikipedia Foundation, Inc., last modified Mar. 2013, 10 pages, accessed Mar. 26, 2013. http://en.wikipedia.org/wiki/Polytetrafluoroethylene.
"Universal Summit Nozzles," Nordson Corporation, Oct. 2011, 2 pages, accessed Mar. 26, 2013. http://www.nordson.com/en-us/divisions/adhesive-dispensing/Literature/NWL/NWL5709.pdf.
"Sealant Equipment—Dispensing Principles," Sealant Equipment and Engineering, copyright 2013, 7 pages, accessed Nov. 1, 2013. http://www.sealantequipment.com/p-dispensingprinciples.html.
Toh et al., "High Viscosity Fluid Dispensing System," U.S. Appl. No. 13/919,318, filed Jun. 17, 2013, 58 pages.
International Search Report and Written Opinion, dated Jan. 28, 2015, regarding Application No. PCT/US2014/038219, 13 pages.
Office Action, dated Dec. 22, 2015, regarding U.S. Appl. No. 13/919,318, 20 pages.
Notice of Allowance, dated Apr. 19, 2016, regarding U.S. Appl. No. 13/919,318, 7 pages.

* cited by examiner

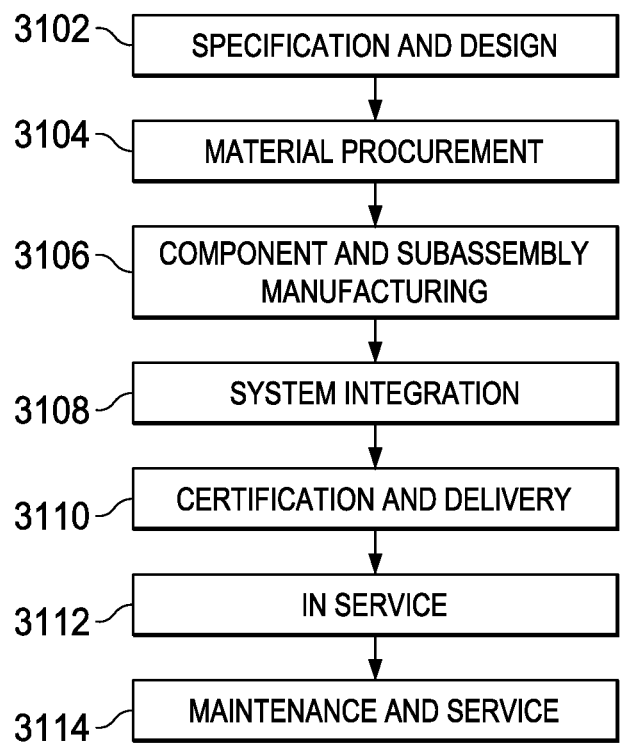
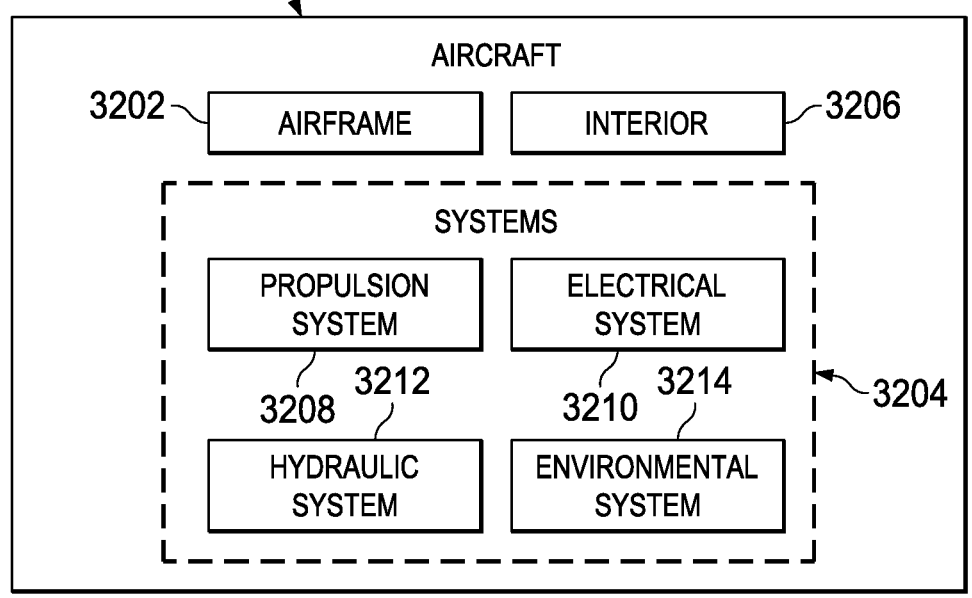

HIGH VISCOSITY FLUID DISPENSING SYSTEM

CROSS-REFERENCE TO RELATED APPLICATION

This application is a continuation-in-part of prior U.S. patent application Ser. No. 13/919,318, filed Jun. 17, 2013, and entitled "High Viscosity Fluid Dispensing System."

BACKGROUND INFORMATION

1. Field

The present disclosure relates generally to dispensing fluids and, in particular, to dispensing high viscosity fluids. Still more particularly, the present disclosure relates to a method and apparatus for dispensing a high viscosity fluid, such as sealant, onto a surface from a desired distance away from the surface in a desired spray pattern.

2. Background

Assembly operations oftentimes require applying sealant to various locations. For example, without limitation, during the assembly of an aircraft, sealant may be applied to joints and fastener elements to seal faying surfaces, protect components, prevent leakages, and/or reduce undesired electromagnetic effects. As one illustrative example, sealant may be applied over a fastener element installed at an outer surface of an object to prevent any fluid from escaping the object and/or entering the object.

Oftentimes, sealant may be manually dispensed from a sealant cartridge and applied. However, the manual dispensing and application of the sealant may be more time-consuming and/or difficult than desired. In some cases, a sealant cartridge may be mounted onto a robot that is used to dispense the sealant from the sealant cartridge. However, these different processes may require more frequent replacements of sealant cartridges than desired. Further, these types of processes may require more cleanup of spills and/or excess sealant.

Additionally, some currently available methods for dispensing sealant may be unable to dispense sealant in a desired pattern at desired distances. In particular, the accuracy of the pattern formed by the sealant dispensed from these currently available methods for dispensing sealant may decrease as the distance between the sealant dispensing system and the surface onto which the sealant is being applied increases.

Working with sealant using some currently available methods for dispensing sealant may be more difficult than desired, depending on the viscosity of the sealant. Typically, sealants having viscosities above, for example, without limitation, about 10,000 centiPoise (cP), may be more difficult to dispense in a desired pattern with a desired level of accuracy than desired.

Further, some currently available methods and systems for dispensing sealant may be unable to dispense sealant in desired patterns based on the types of interfaces that are to be sealed. For example, without limitation, some currently available sealant dispensing systems may be unable to dispense sealant in one pattern to seal a seam interface, another pattern to seal a cross-seam interface, and yet another pattern to seal the interface between a fastener head and the surface in which the fastener head has been installed. Therefore, it would be desirable to have a method and apparatus that take into account at least some of the issues discussed above, as well as other possible issues.

SUMMARY

In one illustrative embodiment, an apparatus may comprise a housing having a chamber, a dispensing device, and a nozzle. The housing may be configured to receive a fluid. The chamber may be configured to increase a tendency of the fluid to flow within the chamber. The dispensing device may be configured to move the fluid in the chamber towards an exit of the chamber such that the fluid may be dispensed through the exit of the chamber. The nozzle may comprise a body having a first end and a second end, an input located at the first end of the body, an output located at the second end of the body, and a plurality of channels located within the body. The input may be configured to receive the fluid from the exit of the chamber. The plurality of channels may have a configuration that causes the fluid received through the input to flow through the plurality of channels and exit the output to form a deposition having a desired shape over an interface.

In another illustrative embodiment, a fluid dispensing system may comprise a housing, a dispensing device, and a nozzle. The housing may have a chamber configured to receive a fluid. The chamber may be configured to increase a tendency of the fluid to flow within the chamber. The dispensing device may be configured to move the fluid in the chamber towards an exit of the chamber such that the fluid may be dispensed through the exit of the chamber. The nozzle may comprise a body having a first end and a second end, a plurality of channels located within the body, an input located at the first end of the body, a cavity, and an output located at the second end of the body. The body may include a first section that extends from the first end to a plane through the body. The body may further include a second section that extends from the plane to the second end of the body. The plurality of channels may have a plurality of openings. The plurality of channels may have a configuration that includes a diameter profile and an arrangement. The input may be configured to receive the fluid from the exit of the chamber. The cavity may be configured to receive the fluid from the input. The output may be formed by the plurality of openings of the plurality of channels. The configuration of the plurality of channels may cause the fluid flowing through the plurality of channels to exit the output with a desired velocity profile and a desired pressure profile to form a deposition having a desired shape over an interface. The interface may be selected from one of a seam interface, a cross-seam interface, a fastener interface, a corner interface, and a step interface.

In yet another illustrative embodiment, a nozzle may comprise a body having a first end and a second end, an input located at the first end of the body, an output located at the second end of the body, and a plurality of channels located within the body. The input may be configured to receive a fluid. The plurality of channels may have a configuration that causes the fluid received through the input to flow through the plurality of channels and exit the output to form a deposition having a desired shape over an interface.

In still another illustrative embodiment, a method for depositing a fluid over an interface may be provided. The fluid may be moved by a dispensing device within a chamber in a housing towards an exit of the chamber such that the fluid may be dispensed through the exit of the chamber. The fluid may be received from the exit of the chamber at an input of a nozzle located at a first end of a body of the nozzle. The fluid from the input may be moved through a plurality of channels located within the body such that the fluid exits the plurality of channels at an output of the nozzle located at a second end of the body. The fluid that exits the output of the nozzle may be deposited over the interface to form a deposition. A flow of the fluid through the plurality of channels may be controlled by a configuration of the plurality of channels such that the deposition of the fluid over the interface has a desired shape.

In yet another illustrative embodiment, a method for depositing a fluid over an interface using a nozzle may be provided. The nozzle may be positioned relative to the interface. The nozzle may comprise a body having a first end and a second end. The second end of the body may have a selected shape that allows the second end to be positioned within a desired distance from the interface. The fluid may be moved by a dispensing device within a chamber in a housing of a fluid dispensing system towards an exit of the chamber such that the fluid may be dispensed through the exit of the chamber. The fluid may be received within a cavity in a first section of the body from the exit of the chamber through an input of the nozzle. The fluid may be moved from the cavity in the first section to a plurality of channels in a second section of the body such that the fluid exits the plurality of channels at an output of the nozzle located at the second end of the body. The fluid that exits the output of the nozzle may be deposited over the interface to form a deposition. The interface may be selected from one of a seam interface, a cross-seam interface, a fastener interface, a corner interface, and a step interface. A flow of the fluid through the plurality of channels may be controlled by a configuration of the plurality of channels such that the fluid exits the output of the nozzle with a desired velocity profile and a desired pressure profile to form the deposition having a desired shape.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 31 is an illustration of an aircraft manufacturing and service method in the form of a block diagram in accordance with an illustrative embodiment; and FIG. 32 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a method and apparatus for dispensing sealant that allows the viscosity of the fluid to be controlled such that the mobility of the sealant may be increased. In this manner, the sealant may be dispensed more easily. Further, the illustrative embodiments recognize and take into account that it may be desirable to have an apparatus that allows the sealant to be pressurized as the sealant is dispensed such that the sealant may be dispensed in a desired pattern with a desired velocity from a desired distance.

Thus, the illustrative embodiments provide a method and apparatus for applying a fluid having a high viscosity onto a surface. In one illustrative embodiment, an apparatus may comprise a housing, a heating system, and a dispensing device. The housing may comprise a chamber configured to receive a fluid. The chamber may have an inner surface comprised of a friction-reducing material. The heating system may be configured to heat the fluid within the chamber to reduce viscosity of the fluid in the chamber to increase a mobility of the fluid within the chamber. The dispensing device may be configured to move the fluid in the chamber towards an exit of the chamber such that the fluid may be dispensed through the exit of the chamber.

Figure 1:
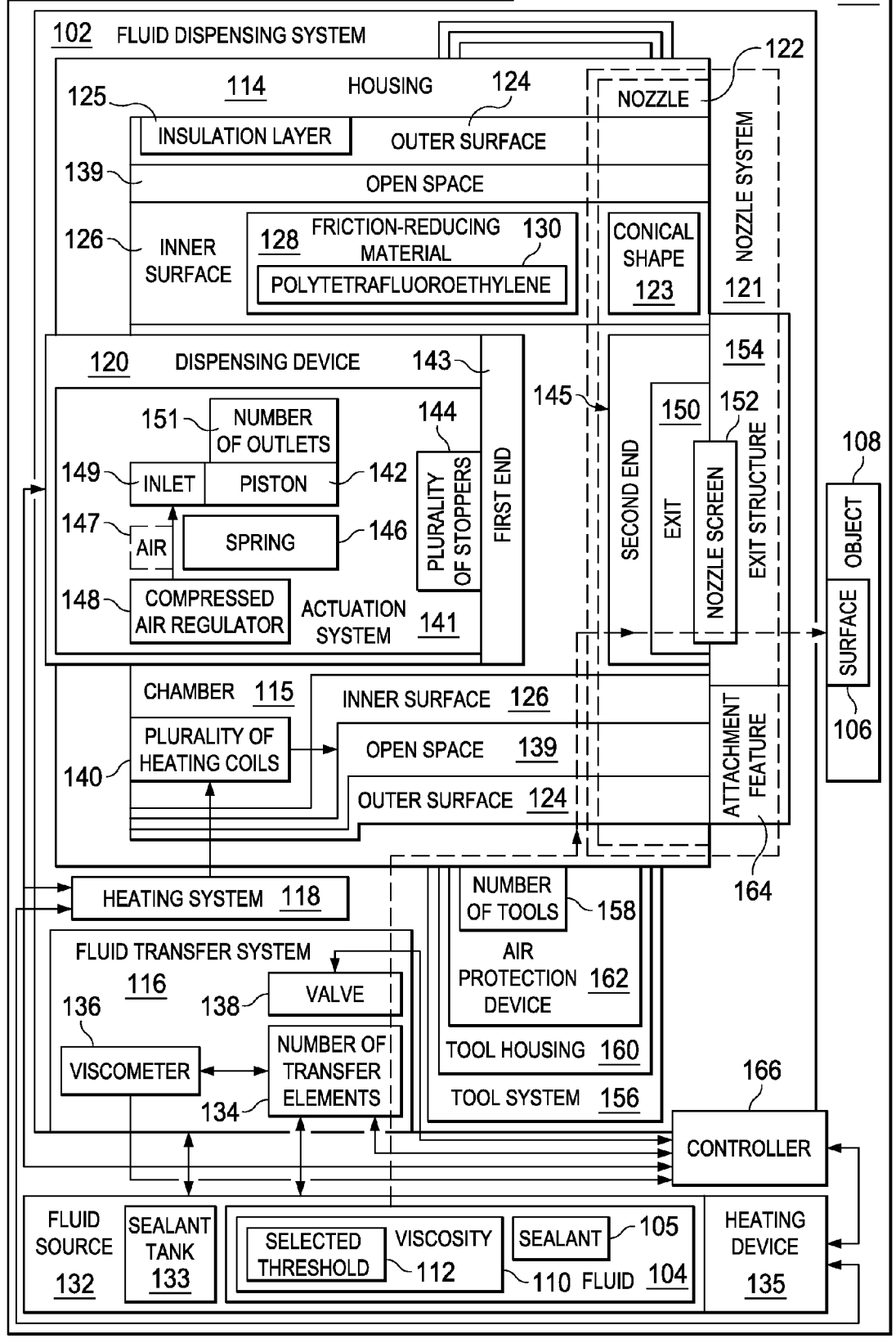
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. In this illustrative example, manufacturing environment 100 may be an example of an environment in which manufacturing operations may be performed. These manufacturing operations may include, for example, without limitation, fluid dispensing operations.

Within manufacturing environment 100, fluid dispensing system 102 may be used to dispense fluid 104 onto surface 106 of object 108. Object 108 may take a number of different forms. Depending on the implementation, object 108 may be comprised of one or more components. For example, without limitation, object 108 may take the form of a fuselage, a wing, a spar, a fastener element, a panel, a door, a joint, a hinged object, a box, a vehicle, a desk, a chair, a flap, an aileron, a ship, a spacecraft, or some other type of object.

Fluid 104 may take the form of sealant 105 in this illustrative example. Further, fluid 104 may have viscosity 110. In this illustrative example, viscosity 110 may be high. In particular, viscosity 110 may be above selected threshold 112 when fluid 104 is at a baseline temperature. This baseline temperature may be, for example, room temperature, ambient temperature, or some other reference temperature.

Selected threshold 112 may be, for example, without limitation, about 10,000 centiPoise (cP). In other cases, selected threshold 112 may be about 25,000 centiPoise or 100,000 centiPoise. In yet other examples, selected threshold 112 may be about 500,000 centiPoise.

As depicted, fluid dispensing system 102 may include housing 114, fluid transfer system 116, heating system 118, dispensing device 120, and nozzle system 121. Housing 114 may have outer surface 124 and inner surface 126. Inner surface 126 of housing 114 may form chamber 115 configured to hold fluid 104. Nozzle system 121 may be used to dispense fluid 104.

Chamber 115 may extend through both housing 114 and nozzle 122 in nozzle system 121. In one illustrative example, nozzle 122 may be a separate component attached to housing 114. In other illustrative examples, nozzle 122 may be formed by a portion of housing 114. Nozzle 122 may be the component through which fluid 104 is dispensed and applied to surface 106. Nozzle 122 may have conical shape 123 configured to increase the velocity with which fluid 104 is dispensed. In particular, conical shape 123 of nozzle 122 may allow fluid 104 to converge and pick up velocity as fluid 104 flows out of nozzle 122.

In this illustrative example, inner surface 126 of housing 114 may be the portion of housing 114 that contacts fluid 104 while fluid 104 is within chamber 115. Inner surface 126 may be comprised of friction-reducing material 128. Friction-reducing material 128 may be selected such that friction between fluid 104 and inner surface 126 is reduced when fluid 104 is moving, or flowing, within chamber 115.

In one illustrative example, friction-reducing material 128 may comprise polytetrafluoroethylene (PTFE) 130. Of course, in other illustrative examples, friction-reducing material 128 may be comprised of a nanostructured ceramic material, a nanostructured non-stick material, or some other type of material.

As depicted, fluid transfer system 116 may transfer fluid 104 from fluid source 132 into chamber 115. Fluid source 132 may be configured to store and hold fluid 104. When fluid 104 takes the form of sealant 105, fluid source 132 may take the form of sealant tank 133.

In this illustrative example, heating device 135 may be associated with fluid source 132. Heating device 135 may be used to heat fluid 104 held within fluid source 132. In particular, fluid 104 may be heated to a temperature based on viscosity 110.

For example, without limitation, viscosity 110 of fluid 104 may be at a level that reduces the mobility of fluid 104. As used herein, the "mobility" of fluid 104 may mean the tendency of fluid 104 to flow. As viscosity 110 of fluid 104 increases, the mobility of fluid 104 may decrease. Heating device 135 may be used to heat fluid 104 to reduce viscosity 110 of fluid 104 and thereby, increase the mobility of fluid 104. In other words, the tendency of fluid 104 to flow through chamber 115 may be increased using heating device 135.

In one illustrative example, heating device 135 may be considered a part of heating system 118. In other illustrative examples, heating device 135 may be considered separate from heating system 118. Heating device 135 may take a number of different forms. For example, without limitation, heating device 135 may take the form of a plurality of heating coils, a microwave oven, or some other type of heating device.

Fluid transfer system 116 may include at least one of number of transfer elements 134, viscometer 136, or valve 138. As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Further, as used herein, a "number of" items may be one or more items. In this manner, number of transfer elements 134 may include one or more transfer elements. A transfer element in number of transfer elements 134 may take the form of a hose, a tube, a coil, a hollow elongate member, or some other type of element configured to allow fluid 104 to flow. Number of transfer elements 134 may be used to transfer fluid 104 from fluid source 132 into chamber 115.

Valve 138 may be used to control the flow of fluid 104 into chamber 115. In this manner, valve 138 may also be referred to as a flow control valve. Viscometer 136 may be used to measure viscosity 110 of fluid 104 as fluid 104 leaves fluid source 132 and is transferred into chamber 115. Heating system 118 may be used to ensure that a desired viscosity for fluid 104 is maintained within chamber 115.

In one illustrative example, heating system 118 may take the form of plurality of heating coils 140. Plurality of heating coils 140 may be used to heat fluid 104 within chamber 115 to ensure that viscosity 110 of fluid 104 is at the desired level to ensure the desired mobility of fluid 104 within chamber 115.

Plurality of heating coils 140 may be located within open space 139 between outer surface 124 and inner surface 126 of housing 114 in this example. Outer surface 124 may protect plurality of heating coils 140 from exposure to environmental elements and/or protect an operator from contacting plurality of heating coils 140. Outer surface 124 may also have insulation layer 125 wrapped along the length of outer surface 124 to shield the operator from contacting outer surface 124 that has been heated and to help maintain the temperature of fluid 104. Inner surface 126 separates plurality of heating coils 140 from fluid 104 such that the heating of fluid 104 may be performed in a more controlled manner.

In this illustrative example, dispensing device 120 may be used to move fluid 104 through chamber 115 and out of chamber 115. As depicted, dispensing device 120 may include actuation system 141. Actuation system 141 may be located at or near first end 143 of chamber 115. Actuation system 141 may be configured to move fluid 104 from first end 143 of chamber 115 towards second end 145 of chamber 115.

Actuation system 141 may include, for example, without limitation, any number of actuators and/or other devices. In one illustrative example, actuation system 141 may include piston 142, plurality of stoppers 144, spring 146, and compressed air regulator 148.

Piston 142 may be configured to move fluid 104 towards second end 145 of chamber 115. Piston 142 may be moved using compressed air generated by compressed air regulator 148. Compressed air regulator 148 may be configured to pump air 147 that is compressed into inlet 149 associated with piston 142. Air 147 may be compressed according to desired specifications. This compressed air may power piston 142 and cause piston 142 to move in a direction towards second end 145. As piston 142 moves towards second end 145, air 147 may be discharged through number of outlets 151 associated with piston 142. Number of outlets 151 may allow air 147 to exit housing 114.

As used herein, when one component is "associated" with another component, the association is a physical association in the depicted examples. For example, a first component, such as inlet 149, may be considered to be associated with a second component, such as piston 142, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Once air 147 has been discharged through number of outlets 151, spring 146 may be used to allow piston 142 to move back towards first end 143. In other words, spring 146 may allow piston 142 to return to the starting position of piston 142.

Plurality of stoppers 144 may be used to stop the movement of piston 142. In one illustrative, plurality of stoppers 144 may include one stopper to limit the movement of piston 142 in the direction towards second end 145 and another stopper to limit the movement of piston 142 in the direction towards first end 143.

In this illustrative example, the movement of piston 142 in the direction towards second end 145 may move fluid 104 towards exit 150 of chamber 115 at second end 145 of chamber 115 within nozzle 122. In this manner, exit 150 of chamber 115 may also be the exit of nozzle 122. In particular, fluid 104 may be moved such that fluid 104 is dispensed through exit 150 of chamber 115.

Nozzle system 121 may also include nozzle screen 152. As depicted, nozzle screen 152 may be positioned at exit 150 of chamber 115. Nozzle screen 152 may be used to modify the flow of fluid 104 out of chamber 115 at exit 150. Nozzle screen 152 may be associated with nozzle 122. In this manner, nozzle screen 152 may be considered part of nozzle 122, attached to nozzle 122, or associated with nozzle 122 in some other manner. Nozzle screen 152 may be used to increase the exit pressure of fluid 104 dispensed out of nozzle 122 such that fluid 104 is dispensed in a spraying manner.

In some illustrative examples, nozzle 122 may be used to increase the exit pressure of fluid 104 dispensed out of nozzle 122, while nozzle screen 152 may be used to screen, or filter, fluid 104 being dispensed through nozzle screen 152. For example, without limitation, nozzle screen 152 may be used to filter out any lumps in fluid 104 such that fluid 104 dispensed through nozzle screen 152 has a desired consistency. In this manner, nozzle 122 and/or nozzle screen 152 may be used to control the exit pressure of fluid 104 being dispensed through nozzle system 121.

In this illustrative example, exit structure 154 may also be associated with nozzle 122. Exit structure 154 may also be positioned at second end 145 of chamber 115 at exit 150. Exit structure 154 may be used to further control the flow of fluid 104 out of nozzle 122. In one illustrative example, exit structure 154 may take the form of a conical rim. In some cases, the size and/or shape of exit structure 154 may be adjustable such that the flow of fluid 104 out of nozzle 122 may be adjusted as needed.

Additionally, fluid dispensing system 102 may also include tool system 156. Tool system 156 may include number of tools 158 and tool housing 160. Number of tools 158 may be housed within tool housing 160. Number of tools 158 may be configured for use in performing fluid dispensing operations.

For example, without limitation, number of tools 158 may include at least one of an imaging device, a light source, a number of sensor devices, or some other type of device. The imaging device may be used to monitor the fluid dispensing operations and assist in the positioning of fluid dispensing system 102. The light source may be needed for dispensing fluid 104 in areas of low visibility and/or in enclosed spaces. The sensor devices may be used for measuring the thickness of fluid 104 being dispensed for quality control purposes. In this manner, any number of devices may be included within tool system 156 for use in performing fluid dispensing operations.

In this illustrative example, air protection device 162 may be associated with tool housing 160. At least one of number of tools 158 may be exposed to the environment around fluid dispensing system 102 within tool housing 160. Tool housing 160 may need to be at least partially open such that number of tools 158 may have a line of sight towards fluid 104 being dispensed through nozzle 122 and/or surface 106.

Air protection device 162 may be configured to create a curtain of air that shields number of tools 158 from fluid spatter and/or the environment around fluid dispensing system 102. This curtain of air still allows number of tools 158 to maintain visibility of fluid 104 being dispensed and/or surface 106 as needed.

In one illustrative example, fluid dispensing system 102 may also have attachment feature 164. In particular, attachment feature 164 may be configured for association with housing 114. Further, attachment feature 164 may be configured for use in attaching one of a drip tray (not shown), a drip bucket (not shown), or some other type of object (not shown) that can catch any dripping of fluid 104 as fluid 104 is dispensed through nozzle 122. In one illustrative example, attachment feature 164 may take the form of a hook, a fastener element, or some other type of attachment feature.

As depicted, controller 166 may be used to control at least one of heating system 118, actuation system 141, valve 138, or some other component within fluid dispensing system 102. In particular, controller 166 may be configured to control compressed air regulator 148 within actuation system 141. Controller 166 may be considered part of or separate from fluid dispensing system 102, depending on the implementation.

In some cases, controller 166 may be configured to receive data from viscometer 136. Controller 166 may use this data to control heating system 118, heating device 135, and/or valve 138. In particular, controller 166 may control the temperature to which heating system 118 is used to heat fluid 104 within chamber 115 and/or the temperature to which heating device 135 is used to heat fluid 104 within fluid source 132 based on viscosity 110 of fluid 104 as measured by viscometer 136.

In this manner, fluid dispensing system 102 may allow fluid 104 having viscosity 110 above selected threshold 112 to be dispensed with ease. Viscosity 110 of fluid 104, and thus the mobility of fluid 104, may be controlled using heating system 118 and heating device 135. Further, the friction generated between fluid 104 and inner surface 126 of chamber 115 may be reduced by friction-reducing material 128. Thus, the dispensing of fluid 104 may be made easier.

Figure 2:
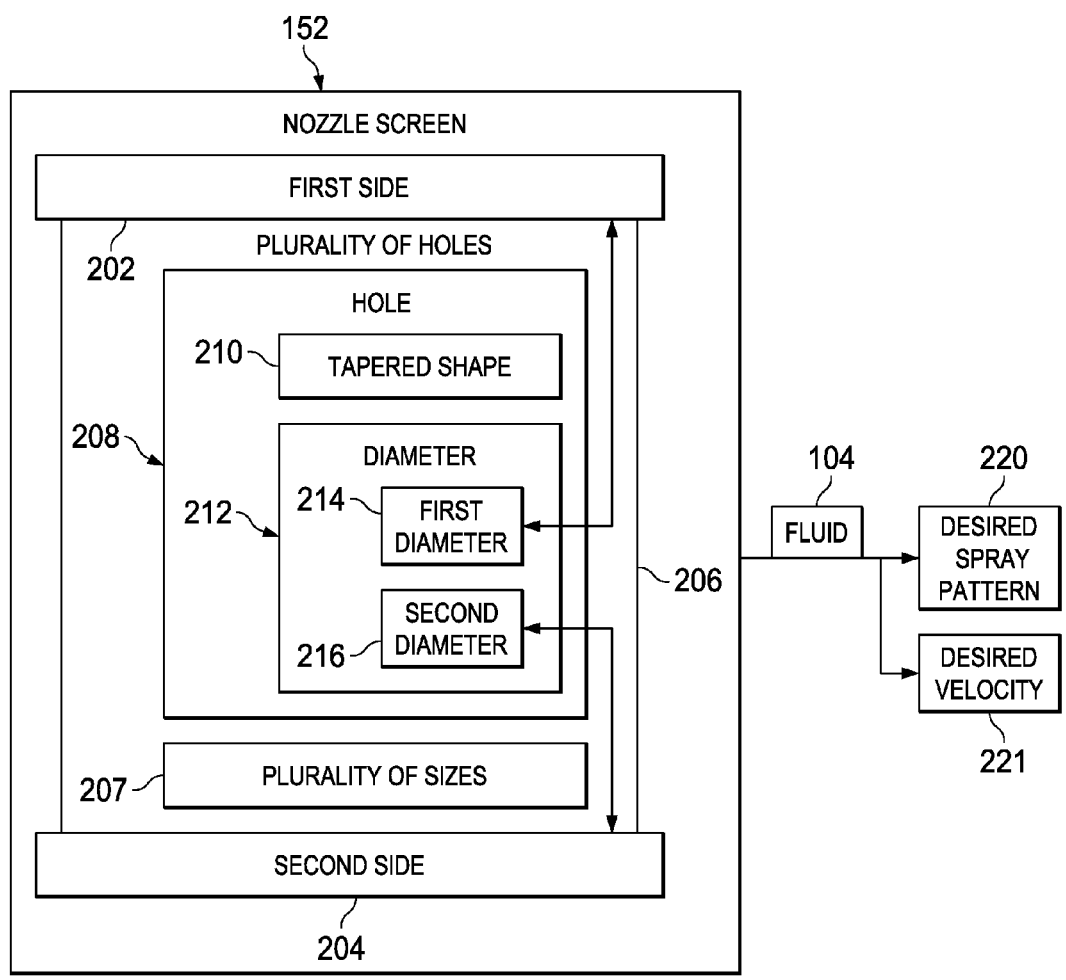
FIG. 2 is an illustration of a nozzle screen in the form of a block diagram in accordance with an illustrative embodiment.

With reference now to FIG. 2, an illustration of nozzle screen 152 from FIG. 1 is depicted in greater detail in the form of a block diagram in accordance with an illustrative embodiment. In this illustrative example, nozzle screen 152 may have first side 202 and second side 204.

First side 202 may be configured to face exit 150 in FIG. 1. Second side 204 may be configured to face away from exit 150 and nozzle 122. In particular, second side 204 may be configured to face surface 106 in FIG. 1 when fluid dispensing system 102 in FIG. 1 is positioned relative to surface 106. In this manner, fluid 104 may enter nozzle screen 152 through first side 202 and exit nozzle screen 152 through second side 204.

Further, nozzle screen 152 may have plurality of holes 206 configured to extend from first side 202 to second side 204. In particular, each of plurality of holes 206 may form a channel through nozzle screen 152 that is open at both first side 202 and second side 204.

Plurality of holes 206 may have plurality of sizes 207. Some of plurality of holes 206 may have one size, while other holes in plurality of holes 206 may have different sizes.

Hole 208 may be an example of one of plurality of holes 206. As depicted, hole 208 may have tapered shape 210. With tapered shape 210, diameter 212 of hole 208 changes. In particular, diameter 212 of hole 208 may be first diameter 214 at first side 202 and second diameter 216 at second side 204. First diameter 214 may be greater than second diameter 216 in this illustrative example.

The tapered shape of each of plurality of holes 206 may be sized such that the exit pressure of fluid 104 from FIG. 1 dispensed through nozzle screen 152 may be increased as fluid 104 passes through nozzle screen 152. In some cases, plurality of holes 206 may be considered a plurality of small nozzles working in parallel such that fluid 104 is "sprayed out" through nozzle screen 152 in a plurality of streams as compared to a single stream. This type of configuration for nozzle screen 152 may allow fluid 104 to be sprayed out in a controlled manner from a greater distance from surface 106 in FIG. 1 as compared to when each of plurality of holes 206 has a substantially constant diameter between first side 202 and second side 204 of nozzle screen 152.

Nozzle screen 152 may take a number of different shapes, depending on the implementation. For example, without limitation, nozzle screen 152 may have a circular shape, a square shape, a rectangular shape, a triangular shape, an elliptical shape, an octagonal shape, or some other type of shape. The shape of nozzle screen 152 and the arrangement of plurality of holes 206 may be selected such that fluid 104 sprays out of nozzle screen 152 in desired spray pattern 220 with desired velocity 221.

Further, the cross-sectional shape of each of plurality of holes 206 may be selected such that fluid 104 is sprayed out in desired spray pattern 220 with desired velocity 221. For example, without limitation, the cross-sectional shape of hole 208 may be selected from one of a circular shape, a square shape, a rectangular shape, a triangular shape, an elliptical shape, an octagonal shape, or some other type of shape. Spraying fluid 104 with desired velocity 221 may ensure that fluid 104 reaches surface 106 from a selected distance away from surface 106.

Additionally, in this illustrative example, nozzle screen 152 may be comprised of friction-reducing material 128. In particular, first side 202, second side 204, and the inner surfaces of plurality of holes 206 may be comprised of friction-reducing material 128 such that all portions of nozzle screen 152 that may come into contact with fluid 104 may be comprised of friction-reducing material 128. In this manner, friction between fluid 104 and nozzle screen 152 may be reduced as fluid 104 passes through nozzle screen 152.

With reference now to FIG. 3, an illustration of a nozzle is depicted in the form of a block diagram in accordance with an illustrative embodiment. In this illustrative example, nozzle 300 may be used to dispense a fluid, such as fluid 104 in FIG. 1. Nozzle 300 may be configured for attachment to any number of different types of fluid dispensing systems for use in dispensing a fluid, such as fluid 104 in FIG. 1.

In one illustrative example, nozzle 300 may be used to implement nozzle 122 in fluid dispensing system 102 described in FIG. 1. When nozzle 300 is used in fluid dispensing system 102, nozzle screen 152 may be excluded from nozzle system 121 in FIG. 1. In some cases, when nozzle 300 is used in fluid dispensing system 102, at least one of exit structure 154 or attachment feature 164 may be excluded from nozzle system 121 in FIG. 1.

As depicted, nozzle 300 may include body 302. Body 302 may have first end 304 and second end 306. First end 304 may be configured for attachment to some type of structure associated with a fluid dispensing system.

In one illustrative example, first end 304 may be configured for attachment to housing 114 shown in FIG. 1. For example, without limitation, body 302 may have threads 308 located at first end 304. Threads 308 may be used to attach body 302 of nozzle 300 to housing 114 shown in FIG. 1. In one illustrative example, threads 308 may take the form of external threads 310. External threads 310 may be configured to engage corresponding internal threads (not shown) located at second end 145 of chamber 115 shown in FIG. 1.

Nozzle 300 may have input 305 located at first end 304 of body 302 and output 307 located at second end 306. Input 305 may be an input for both nozzle 300 and body 302. Similarly, output 307 may be an output for both nozzle 300 and body 302. A fluid, such as fluid 104 from FIG. 1, may be configured to enter nozzle 300 through input 305 of body 302 and exit nozzle 300 through output 307 of body 302. As one illustrative example, nozzle 300 may be configured to receive fluid 104 from chamber 115 shown in FIG. 1 through input 305 of body 302.

In particular, nozzle 300 may be attached to housing 114 of fluid dispensing system 102 at exit 150 of chamber 115. Fluid 104 may be moved by dispensing device 120 of fluid dispensing system 102 within chamber 115 in housing 114 towards exit 150 of chamber 115 such that fluid 104 is dispensed through exit 150 of chamber 115 and enters nozzle 300 through input 305.

Input 305 of nozzle 300 may also be considered the input of body 302. Output 307 of nozzle 300 may also be considered the output of body 302.

As depicted, plurality of channels 312 may be located within body 302. Plurality of channels 312 may extend through at least a portion of body 302 with respect to center axis 311 through body 302. In particular, body 302 may have number of openings 313 at first end 304 and plurality of openings 314 at second end 306. Plurality of openings 314 may be considered part of plurality of channels 312. In particular, each of plurality of openings 314 may be the open end of a corresponding channel in plurality of channels 312.

Number of openings 313 may form input 305 and allow fluid 104 to flow inside body 302. Plurality of openings 314 may form output 307 and allow fluid 104 within body 302 to exit body 302. In one illustrative example, plurality of channels 312 may extend from number of openings 313 at first end 304 of body 302 to plurality of openings 314 at second end 306 of body 302.

In another illustrative example, plurality of channels 312 may only extend within a portion of body 302 at second end 306 of body 302. For example, without limitation, body 302 may have first section 316 and second section 318. First section 316 may extend from first end 304 of body 302 to plane 321 through body 302. Plane 321 may be substantially perpendicular to center axis 311.

Second section 318 may extend from plane 321 to second end 306 of body 302. In other words, body 302 may be divided by plane 321 into first section 316 and second section 318. In this illustrative example, plurality of channels 312 may extend from plane 321 to plurality of openings 314. In this example, plurality of channels 312 may receive fluid 104 from cavity 320 located within first section 316 of body 302. Cavity 320 may extend from number of openings 313 at first end 304 to plane 321.

Fluid 104 received by nozzle 300 through number of openings 313 may enter cavity 320. Plurality of channels 312 may receive fluid 104 from cavity 320. Fluid 104 may then exit nozzle 300 through plurality of openings 314 located at the ends of plurality of channels 312 at second end 306 of body 302.

Cavity 320 and plurality of channels 312 may be fluidly connected such that the fluid flows from cavity 320 into plurality of channels 312. In particular, cavity 320 may open to plurality of channels 312.

Plurality of channels 312 may have configuration 322. Configuration 322 may include, for example, without limitation, diameter profile 324 and arrangement 326.

Diameter profile 324 may include the diameter of each opening in plurality of openings 314 at the end of a corresponding channel in plurality of channels 312. Further, diameter profile 324 may include the cross-sectional diameter of each channel in plurality of channels 312 with respect to center axis 311. In this illustrative example, a cross-sectional diameter is the diameter of a cross-section taken substantially perpendicular to some axis, such as center axis 311.

Center axis 311 may be either a straight line or a curved line depending on the overall shape of body 302. For example, without limitation, body 302 may have a cross-sectional shape that remains substantially constant or that varies along a length of body 302. When the cross-sectional shape of body 302 remains substantially constant, body 302 may be considered as having a straight form. When the cross-sectional shape of body 302 varies, body 302 may be considered as having a curved form.

As one illustrative example, plurality of channels 312 may include channel 328. Opening 330 may be the opening in plurality of openings 314 that corresponds to channel 328. Opening 330 may form one end of channel 328. In particular, fluid 104 flowing through channel 328 may exit channel 328, and thereby nozzle 300, through opening 330.

Opening diameter 332 may be the diameter of opening 330. Cross-sectional diameter 334 may be the cross-sectional diameter of channel 328 for any cross-section of channel 328 taken substantially perpendicular to center axis 311 through body 302. Cross-sectional diameter 334 may remain substantially constant with respect to center axis 311 or may vary with respect to center axis 311, depending on the implementation. Opening diameter 332 may be the cross-sectional diameter of channel 328 at the end of channel 328 where opening 330 is located.

Arrangement 326 may define how the openings in plurality of openings 314 are positioned relative to each other. For example, without limitation, arrangement 326 may determine the spacing of these openings relative to each other at second end 306. As one illustrative example, arrangement 326 may identify the spacing between an opening in plurality of openings 314 positioned along center axis 311 and openings in plurality of openings 314 that are positioned some distance away from center axis 311.

In some cases, arrangement 326 may be selected such that the openings in plurality of openings 314 are substantially parallel to a same plane. In other cases, arrangement 326 may be selected such that the openings are arranged relative to each other to substantially conform to selected shape 327 of second end 306. Selected shape 327 may be, for example, without limitation, a concave shape, a convex shape, a semi-spherical shape, a pyramidal shape, a conical shape, or some other type of shape.

Arrangement 326 and diameter profile 324 may determine the manner in which fluid 104 exits nozzle 300. In particular, arrangement 326 and diameter profile 324 may determine the manner in which fluid 104 is deposited onto one or more surfaces. For example, without limitation, nozzle 300 may be positioned relative to number of surfaces 336 such that fluid 104 exiting nozzle 300 forms deposition 338 on number of surfaces 336. Deposition 338 may be a deposit of fluid 104 in a single location or area in one illustrative example. In another illustrative example, deposition 338 may take the form of a bead of fluid 104. Configuration 322 for nozzle 300 may be designed such that deposition 338 has desired shape 340.

In addition to causing fluid 104 to be dispensed from nozzle 300 to form deposition 338 having desired shape 340, configuration 322 of plurality of channels 312 may cause fluid 104 to exit nozzle 300 with desired velocity profile 342 and desired pressure profile 344. Desired velocity profile 342 may include a desired velocity for each of plurality of openings 314. For example, desired velocity profile 342 may include a desired velocity for the portion of fluid 104 that exits nozzle 300 through opening 330. The desired velocity may be a single value or some value within a range of values depending on the implementation.

Desired pressure profile 344 may include a desired pressure for each of plurality of openings 314. For example, pressure profile 344 may include a desired pressure for the portion of fluid 104 that exits nozzle 300 through opening 330. The desired pressure may be a single value or some value within a range of values depending on the implementation.

In this illustrative example, desired shape 340, desired velocity profile 342, and desired pressure profile 344 for fluid 104 being dispensed from nozzle 300 may be selected based on the portion of number of surfaces 336 onto which fluid 104 is being applied. For example, without limitation, when fluid 104 takes the form of sealant 105, sealant 105 may be deposited over interface 346 to seal interface 346. Interface 346 may be the point of connection between two or more objects or a common boundary between two or more objects. Sealing interface 346 may mean forming a barrier at interface 346 such that undesired materials are unable to pass through this barrier.

Interface 346 may be of a type of interface selected from one of, for example, without limitation, seam interface 350, cross-seam interface 352, fastener interface 354, corner interface 356, and step interface 358. These types of interfaces are described in greater detail in figures below.

Desired shape 340, desired velocity profile 342, and desired pressure profile 344 may be selected based on the type of interface 346 to be sealed. Thus, configuration 322 for plurality of channels 312 may also be selected based on the type of interface 346.

Desired shape 340 may be selected to improve the quality of deposition 338 over interface 346 based on the type of interface 346. Further, in some cases, desired velocity profile 342 and desired pressure profile 344 may be selected such that deposition 338 having desired shape 340 is formed.

Desired shape 340 may include at least one of perimeter 339, thickness profile 341, or some other type of parameter for deposition 338. Perimeter 339 may be the linear distance around the outer edge of deposition 338. Thickness profile 341 may be the thickness of deposition 338 at every point along deposition 338. For example, deposition 338 may have a first thickness at one location of deposition 338 and a second thickness at another location of deposition 338. The first thickness may be the same as or different from the second thickness, depending on the implementation.

Different types of interfaces may need to be sealed using depositions of sealant having different thickness profiles to ensure that the seals meet certain requirements. As a result, nozzles having different configurations may be needed for sealing these different types of interfaces.

In some illustrative examples, second section 318 may have outer shape 360 based on the type of interface 346. In particular, outer shape 360 may be selected such that second end 306 of body 302 can be positioned relative to interface 346 in a desired manner. As one illustrative example, when interface 346 takes the form of step interface 358, outer shape 360 may take the form of tapered shape 362. Tapered shape 362 may allow second end 306 to be positioned within a desired distance relative to interface 346 to ensure that deposition 338 has desired shape 340.

In this illustrative example, cavity 320 may have cavity cross-sectional diameter 364 that remains substantially constant with respect to center axis 311. But in other illustrative examples, cavity cross-sectional diameter 364 may vary with respect to center axis 311. For example, without limitation, cavity cross-sectional diameter 364 may decrease in the direction from first end 304 towards second end 306.

Additionally, when nozzle 300 is attached to a fluid dispensing system, such as fluid dispensing system 102 in FIG. 1, desired thickness profile 341 and desired pressure profile 344 may be further controlled by the operation of the various components within the fluid dispensing system. For example, without limitation, controller 166 may control the operation of dispensing device 120 in FIG. 1 such that fluid 104 is dispensed flows into nozzle 300 in a manner that allows fluid 104 to have desired thickness profile 341 and desired pressure profile 344 when fluid 104 exits nozzle 300.

Figure 3:
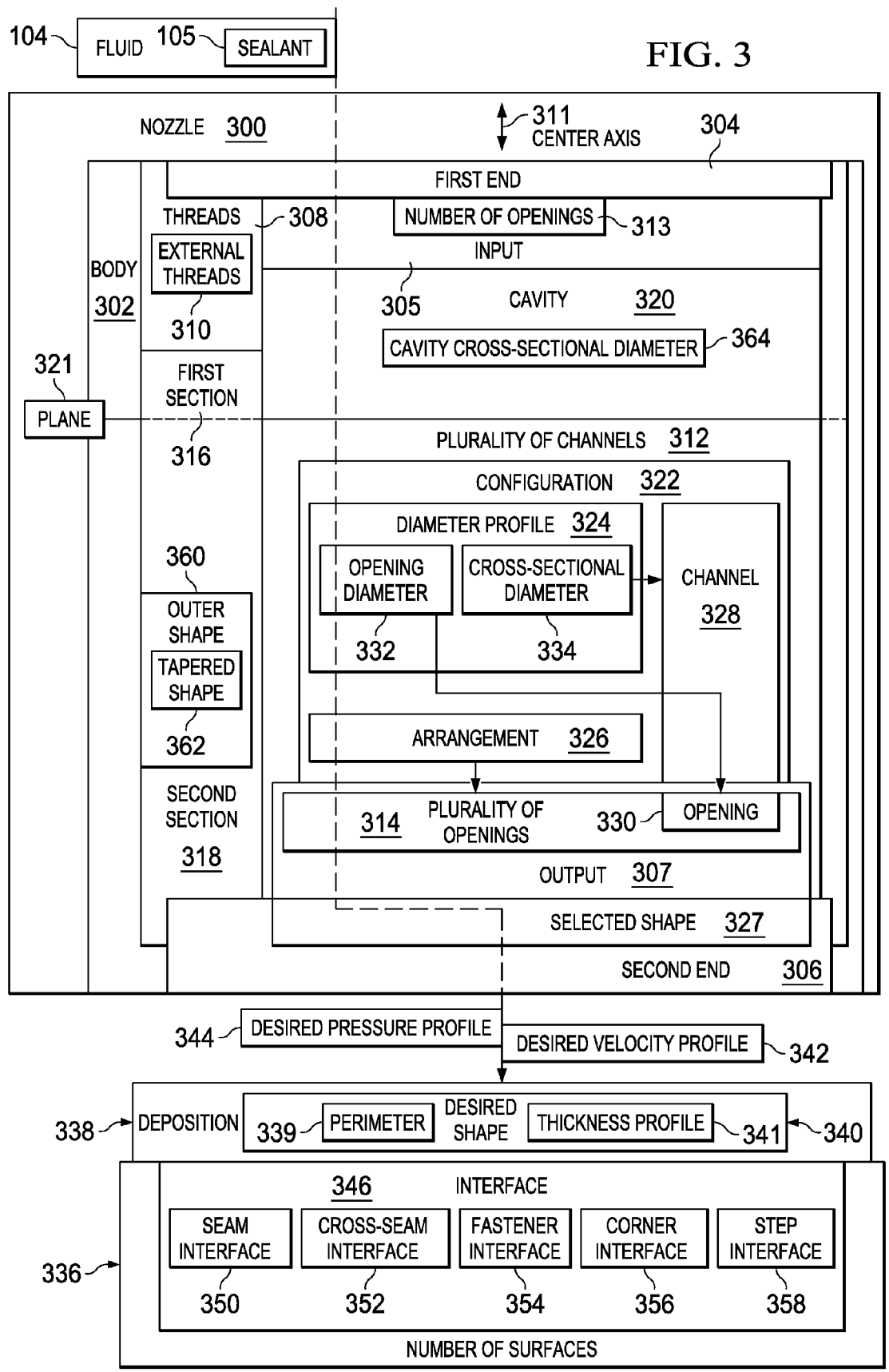
FIG. 3 is an illustration of a nozzle in the form of a block diagram in accordance with an illustrative embodiment.

The illustrations of manufacturing environment 100 and fluid dispensing system 102 in FIG. 1, nozzle screen 152 in FIG. 2, and nozzle 300 in FIG. 3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although actuation system 141 is described as comprising piston 142, spring 146, and compressed air regulator 148, actuation system 141 may be implemented in some other manner. For example, without limitation, actuation system 141 may be implemented using a motor-driven roller screw, an electromagnetic slider, and/or other types of devices.

In other illustrative examples, attachment feature 164 may be optional. In some cases, tool system 156 may be optional.

Further, depending on the implementation, body 302 of nozzle 300 in FIG. 3 may or may not have two sections. For example, in some cases, body 302 may only have second section 318 and may not have cavity 320. Thus, plurality of channels 312 may extend from first end 304 of body 302 to second end 306 of body 302.

Although configuration 322 is described as having diameter profile 324, configuration 322 may have some other type of sizing profile. For example, without limitation, configuration 322 may include an area profile in which the area profile includes a cross-sectional area for each of plurality of channels 312. The cross-sectional area may be needed when the cross-sectional shape of a channel in plurality of channels 312 is not circular. The cross-sectional area of a channel in plurality of channels 312 may vary or remain substantially constant along center axis 311.

Further, in other illustrative examples, configuration 322 may include a shape profile that includes a cross-sectional shape for each channel in plurality of channels 312. The cross-sectional shape of a channel in plurality of channels 312 may vary or remain substantially constant along center axis 311. The cross-sectional shape may be selected from one of a circular shape, an elliptical shape, an oval shape, a rectangular shape, a square shape, an amorphous shape, or some other type of shape.

Although nozzle 300 is described as being configured for use with fluid dispensing system 102 in FIG. 1, nozzle 300 may be configured for use with some other type of fluid dispensing system. Nozzle 300 may be configured for attachment to different types of fluid dispensing systems. In particular, nozzle 300 may be attached to any fluid dispensing system that includes a housing with a chamber configured to receive a fluid in which the chamber is configured to increase a tendency of the fluid to flow within the chamber and that includes a dispensing device configured to move the fluid in the chamber towards an exit of the chamber such that the fluid is dispensed through the exit of the chamber into input 305 of nozzle 300 when nozzle 300 is attached to the fluid dispensing system.

Figure 4:
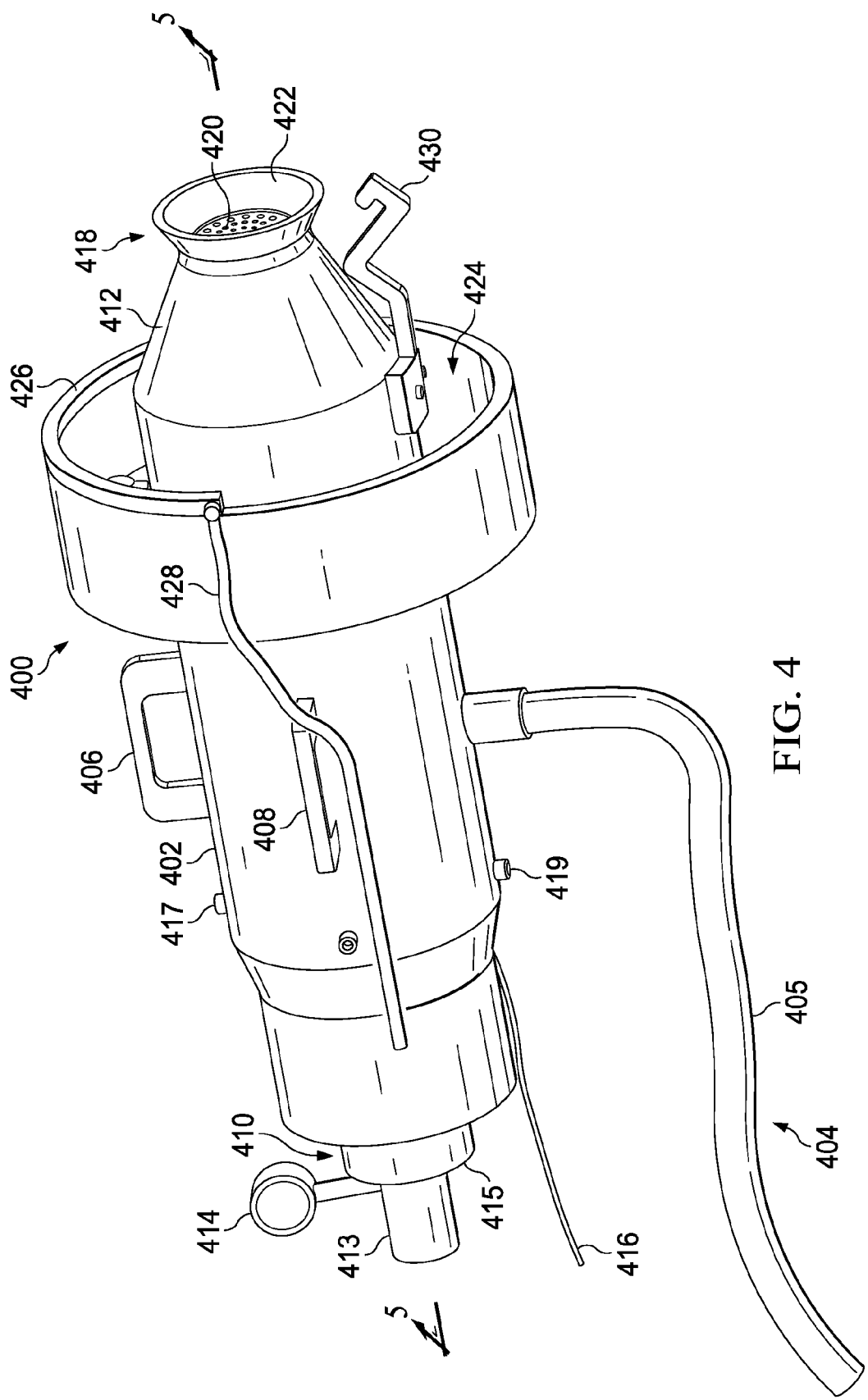
FIG. 4 is an illustration of a fluid dispensing system in accordance with an illustrative embodiment.

With reference now to FIG. 4, an illustration of a fluid dispensing system is depicted in accordance with an illustrative embodiment. In this illustrative example, fluid dispensing system 400 may be an example of one implementation for fluid dispensing system 102 in FIG. 1. As depicted, fluid dispensing system 400 may include housing 402, fluid transfer system 404, handle 406, handle 408, and actuation system 410.

Housing 402, fluid transfer system 404, and actuation system 410 may be examples of implementations for housing 114, fluid transfer system 116, and actuation system 141, respectively, in FIG. 1. Housing 402 may include nozzle 412 in this example. Nozzle 412 may be an example of one implementation for nozzle 122 in FIG. 1. Handle 406 and handle 408 may be used by an operator to handle and operate fluid dispensing system 400.

As depicted, fluid transfer system 404 may include hose 405 and other components (not shown in this view). Hose 405 may be an example of one implementation for a transfer element in number of transfer elements 134 in FIG. 1. Hose 405 may be used to transfer fluid (not shown) from a fluid source (not shown) into a chamber (not shown) within housing 402.

Actuation system 410 may include inlet 413, compressed air regulator 414, and piston 415. Inlet 413, compressed air regulator 414, and piston 415 may be examples of implementations for inlet 149, compressed air regulator 148, and piston 142, respectively, in FIG. 1. Further, actuation system 410 may also include outlet 417 and outlet 419. Outlet 417 and outlet 419 may be an example of one implementation for number of outlets 151 in FIG. 1. In this illustrative example, power line 416 may be used to provide electrical power to fluid dispensing system 400. Of course, in other illustrative examples, fluid dispensing system 400 may be powered using pneumatic power and/or some other type of power.

In this illustrative example, exit 418 of nozzle 412 may be an example of one implementation for exit 150 in FIG. 1. Exit 418 may also be the exit of the chamber (not shown) that passes through housing 402 and nozzle 412. Nozzle screen 420 may be positioned at exit 418 such that fluid being dispensed through nozzle 412 passes through nozzle screen 420. Nozzle screen 420 may be an example of one implementation for nozzle screen 152 in FIG. 1.

Further, exit structure 422 may be attached to nozzle 412. Exit structure 422 may be an example of one implementation for exit structure 154 in FIG. 1. Exit structure 422 may be used to further control the flow of fluid out of nozzle 412.

Tool system 424 may be attached to housing 402 in this illustrative example. Tool system 424 may be an example of one implementation for tool system 156 in FIG. 1. Further, as depicted, air protection device 426 may be associated with tool system 424. Air protection device 426 may receive air through air line 428. Tool system 424 and air protection device 426 may be described in greater detail in FIG. 6 below.

In this illustrative example, fluid dispensing system 400 may also include drip tray hook 430. Drip tray hook 430 may be used to attach a drip tray (not shown) to fluid dispensing system 400. This drip tray may be used to catch any dripping of fluid that is dispensed from nozzle 412. In other examples, a drip bucket (not shown) may be hung from drip tray hook 430. Drip tray hook 430 may be an example of one implementation for attachment feature 164 in FIG. 1.

Figure 5:
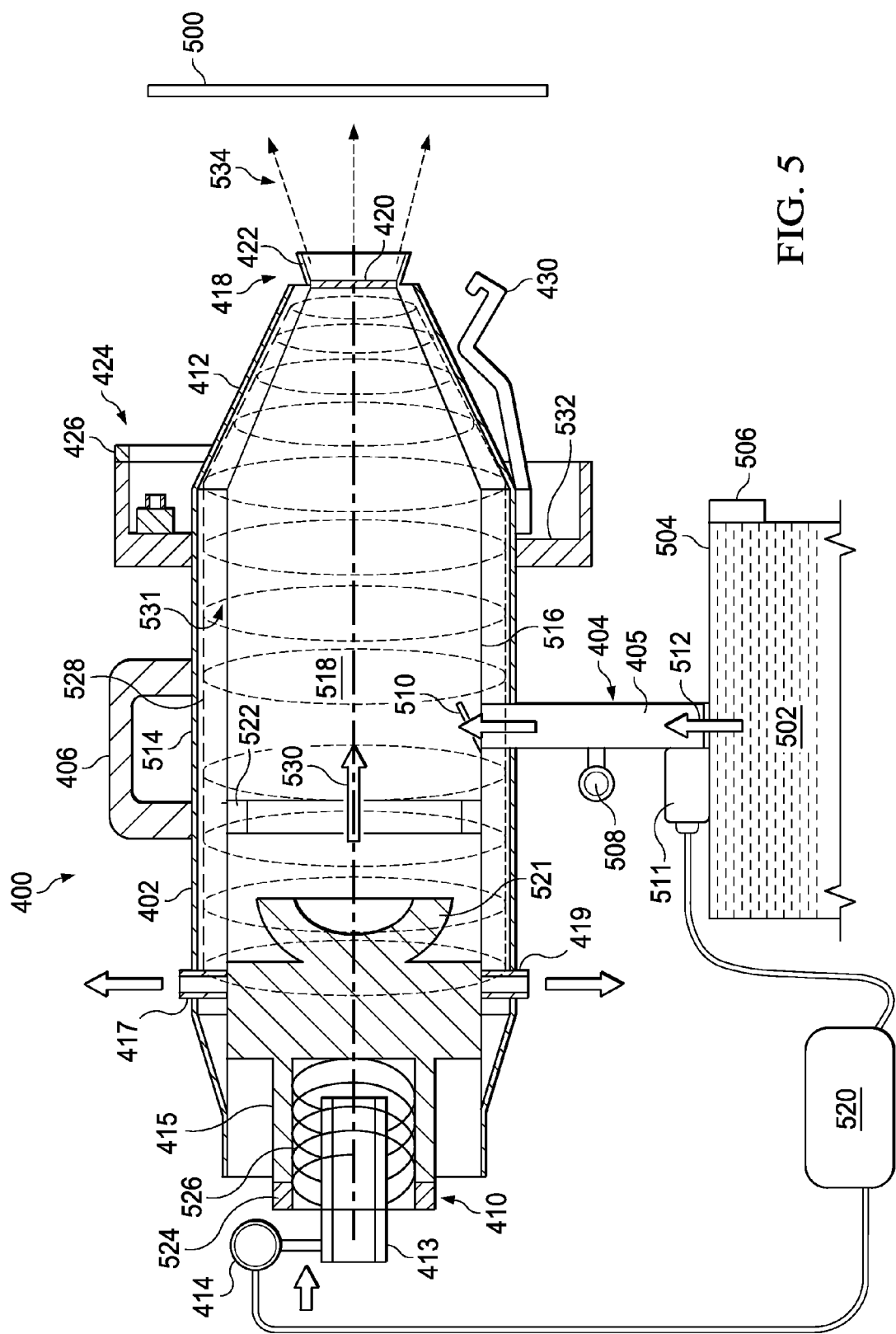
FIG. 5 is an illustration of a cross-sectional view of a fluid dispensing system in accordance with an illustrative embodiment.

Turning now to FIG. 5, an illustration of a cross-sectional view of fluid dispensing system 400 from FIG. 4 is depicted in accordance with an illustrative embodiment. In this illustrative example, a cross-sectional view of fluid dispensing system 400 has been taken with respect to lines 5-5 from FIG. 4.

As depicted, fluid dispensing system 400 may be used to dispense fluid 502 and apply fluid 502 held in fluid tank 504 onto surface 500. Fluid 502 and fluid tank 504 may be examples of implementations for fluid 104 and fluid source 132, respectively, in FIG. 1.

In this illustrative example, fluid tank 504 may be heated. In other words, fluid tank 504 may be configured to heat fluid 502 to reduce the viscosity of fluid 502 to a desired viscosity. In some cases, fluid tank 504 may also be equipped with mixers (not shown) for use in mixing and preparing a multi-component fluid 502 before dispensing. In other words, fluid 502 may be comprised of a single homogeneous substance or a combination of various substances that are mixed within fluid tank 504. Thermometer 506 may be used to monitor the temperature of fluid 502 within fluid tank 504.

Fluid transfer system 404 may transfer fluid 502 from fluid tank 504 into chamber 518 within housing 402. Fluid transfer system 404 may include hose 405, viscometer 508, valve 510, and pump 511. Viscometer 508 and valve 510 may be examples of implementations for viscometer 136 and valve 138, respectively, in FIG. 1.

Viscometer 508 may be associated with hose 405 and configured to measure the viscosity of fluid 502. Valve 510 may be configured to control the flow of fluid 502 into chamber 518. Pump 511 may be used to pump fluid 502 from fluid tank 504 into hose 405 and towards valve 510. Fluid 502 may flow from fluid tank 504 into chamber 518 in the direction of arrow 512.

As depicted, housing 402 may have outer surface 514 and inner surface 516. Chamber 518 may be formed by inner surface 516 of housing 402. Outer surface 514, inner surface 516, and chamber 518 may be examples of implementations for outer surface 124, inner surface 126, and chamber 115, respectively, in FIG. 1.

In this illustrative example, actuation system 410 may include piston 415, stopper 522, stopper 524, spring 526, inlet 413, and compressed air regulator 414. Stopper 522 and stopper 524 may be an example of one implementation for plurality of stoppers 144 in FIG. 1.

Controller 520 may be used to control compressed air regulator 414, and thereby, the motion of piston 415 in synchronization with pump 511 to deliver fluid 502. Controller 520 may be an example of one implementation for controller 166 in FIG. 1. Compressed air regulator 414 may regulate the sending of compressed air into inlet 413 associated with piston 415. This compressed air may power piston 415 and cause piston 415 to move away from an initial position in the direction of arrow 530. Stopper 522 may limit the movement of piston 415 such that piston 415 may not be moved past stopper 522 in the direction of arrow 530.

The compressed air may be discharged through outlet 417 and outlet 419. When the compressed air is discharged, spring 526 may cause piston 415 to return to or near the initial position for piston 415. In this manner, spring 526 may be implemented using an extension spring in this illustrative example. Spring 526 may be an example of one implementation for spring 146 in FIG. 1.

Stopper 524 may be used to limit the movement of piston 415 in the direction opposite of arrow 530. Stopper 522 and stopper 524 may be implemented using ring stoppers, in this illustrative example.

In this manner, compressed air regulator 414 may be used to send compressed air into inlet 413 in a manner that causes piston 415 to move within chamber 518 in a pumping manner. Piston 415 may be used to pump fluid 502 out of chamber 518. As depicted, scooping structure 521 may be associated with piston 415. Scooping structure 521 may be used to cause fluid 502 to converge, or be scooped, within chamber 518 and move in the direction of arrow 530.

In this illustrative example, fluid dispensing system 400 may include heating system 528. Heating system 528 may comprise plurality of heating coils 531. Heating system 528 and plurality of heating coils 531 may be an example of implementations for heating system 118 and plurality of heating coils 140, respectively, in FIG. 1. As depicted, plurality of heating coils 531 may be located between inner surface 516 and outer surface 514 of housing 402. Plurality of heating coils 531 may be used to heat fluid 502 within chamber 518 to ensure that a desired viscosity for fluid 502 is maintained such that a desired mobility for fluid 502 is also maintained. In some cases, plurality of heating coils 531 may be controlled by controller 520, as in this illustrative example.

Further, inner surface 516 may be comprised of a friction-reducing material, such as, for example, without limitation, a polytetrafluoroethylene material, configured to reduce friction created between inner surface 516 and fluid 502 as fluid 502 moves within chamber 518.

As depicted, fluid 502 may be dispensed by being pushed out of nozzle 412 at exit 418 of chamber 518. Tool system 424 may have tool housing 532 configured to house a number of tools (not shown in this view). Tool housing 532 may be an example of one implementation for tool housing 160 in FIG. 1.

In this illustrative example, fluid 502 may exit nozzle 412 through nozzle screen 420 in the direction of arrows 534. The flow pattern of fluid 502 as fluid 502 is dispensed may be controlled by the shape of exit structure 422 and a plurality of holes (not shown) in nozzle screen 420. This plurality of holes (not shown) in nozzle screen 420 may be implemented in a manner similar to plurality of holes 206 in nozzle screen 152 in FIG. 2.

Controller 520 may be used to control the dispensing of fluid 502 from fluid dispensing system 400 such that the supply of fluid 502 from fluid tank 504 into chamber 518 and the spraying of fluid 502 out through nozzle screen 420 are synchronized. In some cases, controller 520 may be used to perform other operations. For example, without limitation, fluid dispensing system 400 may be operated by a robotic operator. Controller 520 may be used to control the robotic operator and/or communicate with the robotic operator.

Figure 6:
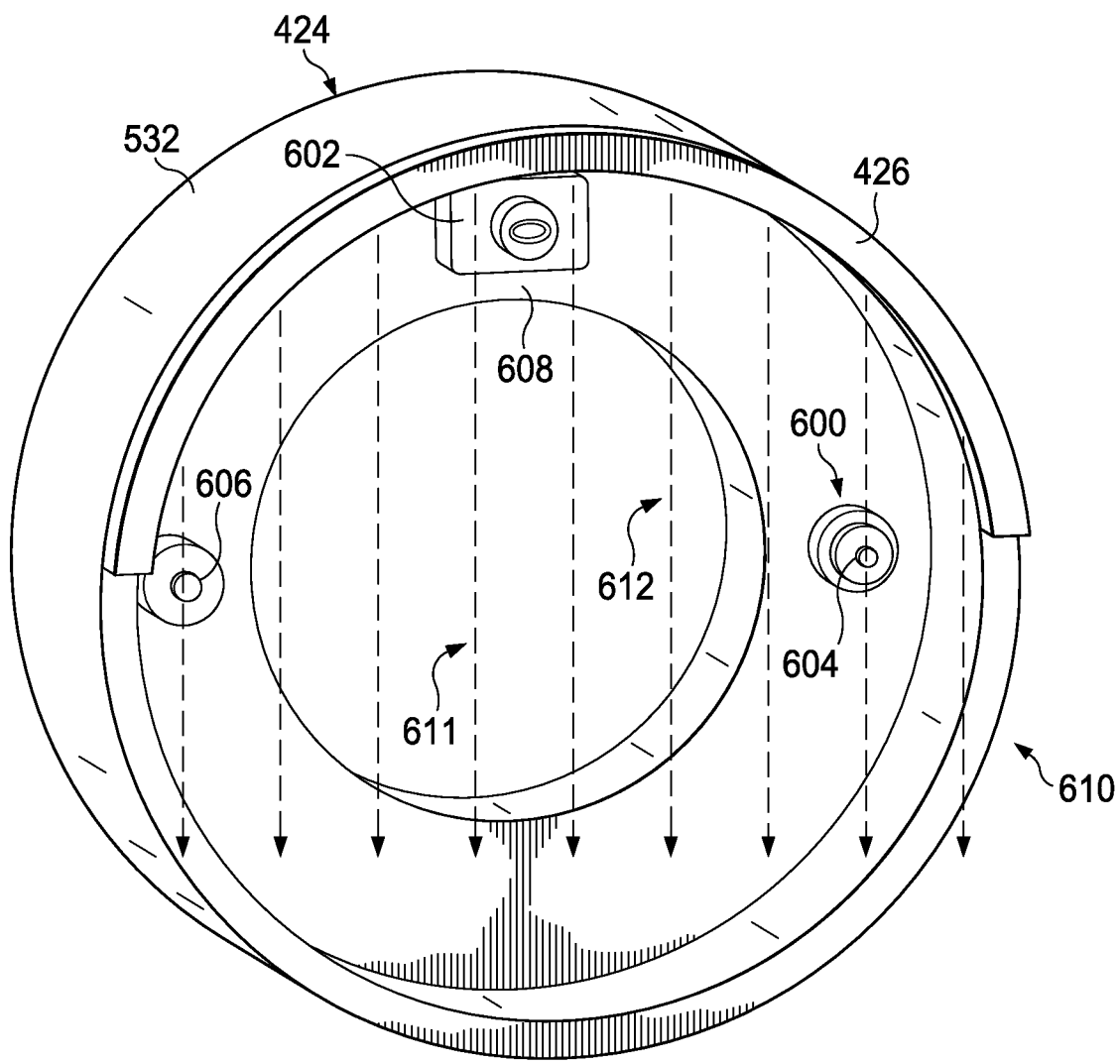
FIG. 6 is an illustration of a tool system and an air protection device in accordance with an illustrative embodiment.

With reference now to FIG. 6, an illustration of tool system 424 and air protection device 426 from FIGS. 4-5 is depicted in accordance with an illustrative embodiment. In this illustrative example, tool system 424 includes number of tools 600 housed within tool housing 532. Number of tools 600 may be an example of one implementation for number of tools 158 in FIG. 1.

As depicted, number of tools 600 may include camera 602, light source 604, and sensor 606. Camera 602, light source 604, and sensor 606 may be mounted to surface 608 of tool housing 532. Further, camera 602, light source 604, and sensor 606 may be exposed at side 610 of tool housing 532. Camera 602 may be used to monitor the dispensing of fluid 502 through nozzle screen 420 in FIG. 5. Light source 604 may provide light when needed. Sensor 606 may be used to measure the thickness of fluid 502 from FIG. 5 being dispensed through nozzle screen 420.

As depicted, air protection device 426 may be configured to allow air received through air line 428 in FIG. 4 to flow through holes or slits (not shown) in air protection device 426 in the direction of arrows 611. Air may flow in the direction of arrows 611 at a rate and in a manner such that air curtain 612 is created. Air curtain 612 may shield number of tools 600 from any fluid spatter resulting from the dispensing of fluid 502 in FIG. 5 and/or from the elements in the environment around fluid dispensing system 400.

Figure 7:
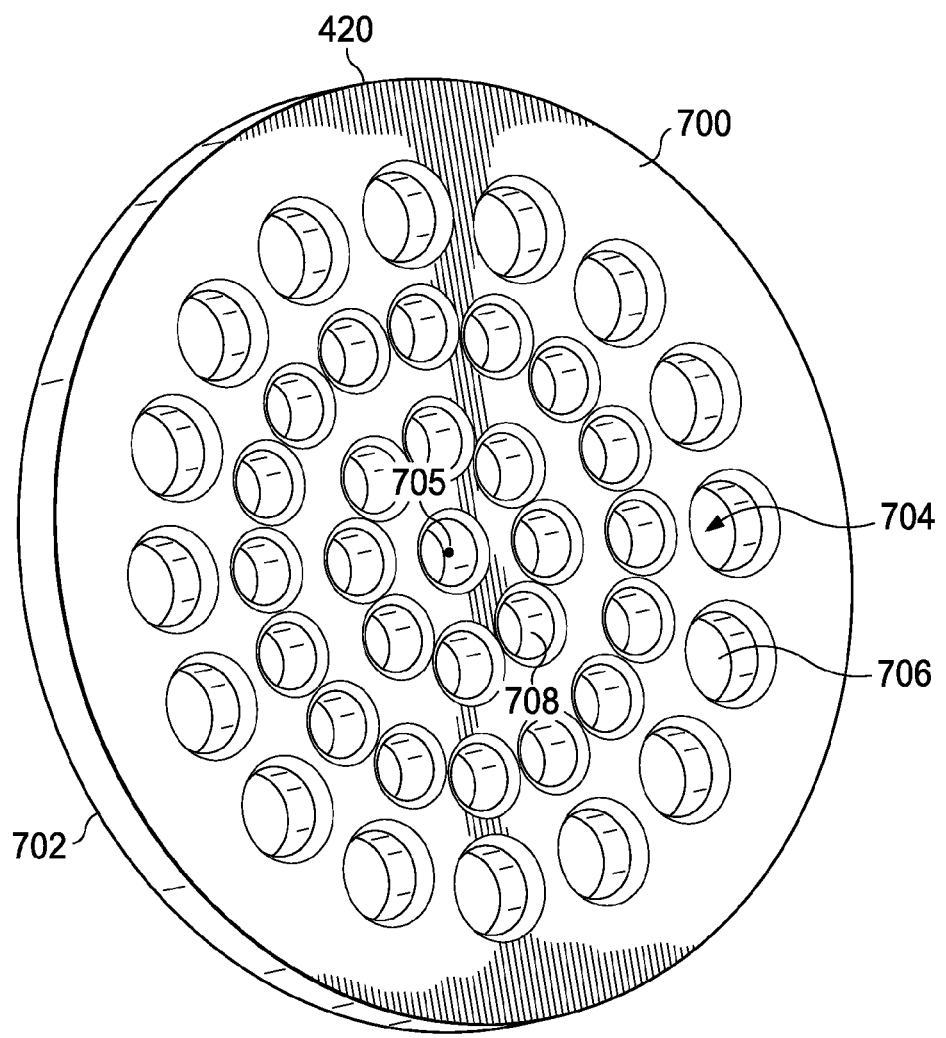
FIG. 7 is an illustration of a nozzle screen in accordance with an illustrative embodiment.

With reference now to FIG. 7, an illustration of nozzle screen 420 from FIGS. 4-5 is depicted in accordance with an illustrative embodiment. As depicted, nozzle screen 420 has first side 700 and second side 702. First side 700 and second side 702 may be examples of implementations for first side 202 and second side 204, respectively, in FIG. 2. Fluid 502 may be configured to enter nozzle screen 420 through first side 700 and exit nozzle screen 420 through second side 702.

In this illustrative example, nozzle screen 420 has plurality of holes 704 with different sizes. Plurality of holes 704 may be an example of one implementation for plurality of holes 206 in FIG. 2. Plurality of holes 704 may be sized such that the flow rate of fluid 502 in FIG. 5 through each of plurality of holes 704 is substantially constant. Typically, the flow rate of fluid 502 increases towards center 705 and decreases away from center 705. Further, flow rate may be substantially equal to the area of a hole multiplied by the velocity of fluid 502 flowing through that hole.

Consequently, the holes in plurality of holes 704 may be sized such that holes in plurality of holes 704 at or near center 705 of nozzle screen 420 have a smaller diameter than other holes at or near a periphery of nozzle screen 420 to ensure a substantially constant flow rate through each of plurality of holes 704. For example, without limitation, hole 706, which is further away from center 705 than hole 708, may be larger in size than hole 708. In this manner, fluid 502 may be dispensed in a desired manner with a desired level of accuracy.

Further, each of plurality of holes 704 may have a tapered shape configured to pressurize fluid 502 from FIG. 5 as fluid 502 passes through nozzle screen 420. In particular, each of plurality of holes 704 may have a larger diameter at first side 700 as compared to second side 702. In this manner, fluid 502 may be pressurized as fluid 502 passes through nozzle screen 420. Plurality of holes 704 may function as a plurality of small nozzles working in parallel.

Figure 8:
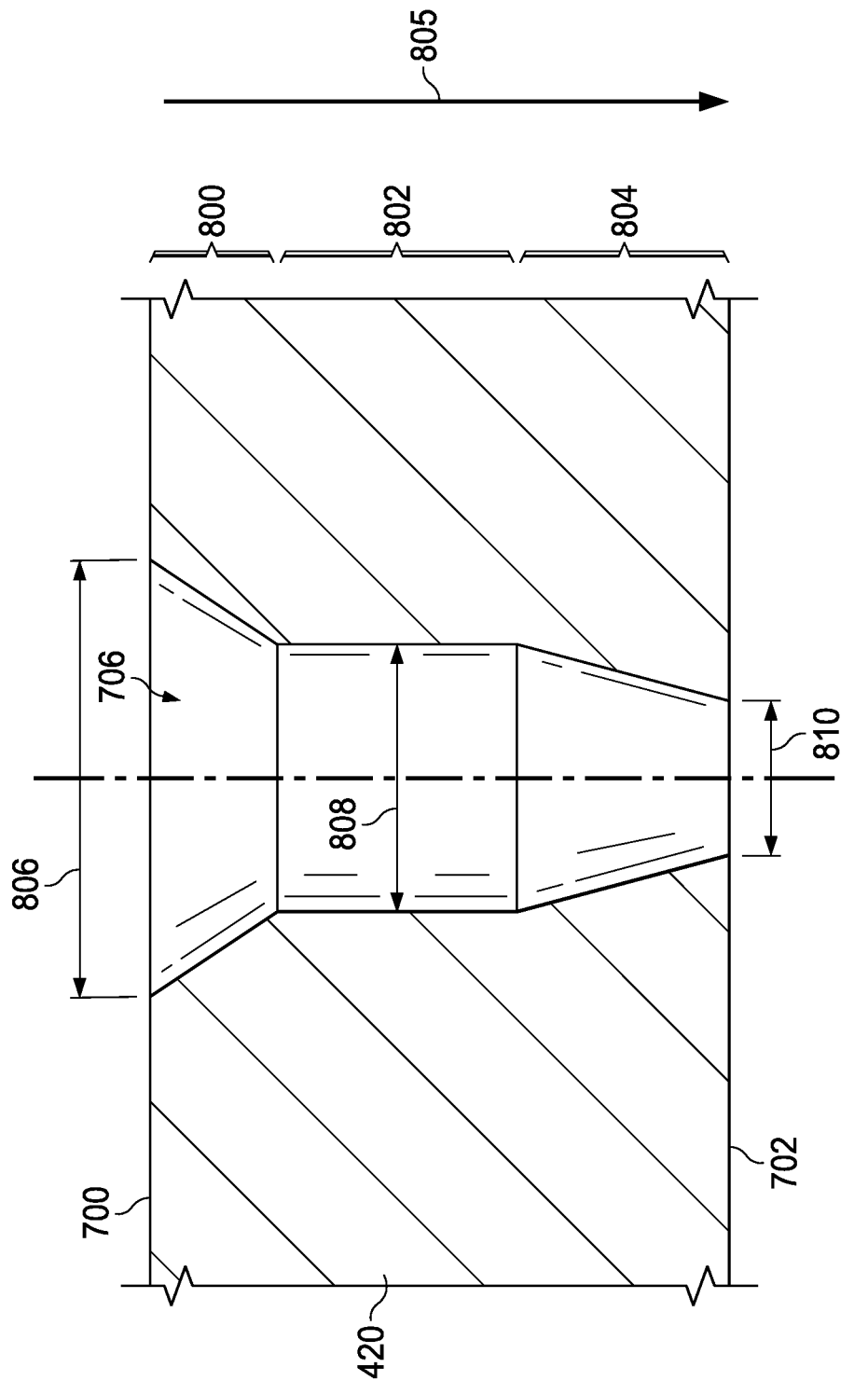
FIG. 8 is an illustration of a hole in accordance with an illustrative embodiment.

With reference now to FIG. 8, an illustration of hole 706 from FIG. 7 is depicted in accordance with an illustrative embodiment. In this illustrative example, hole 706 has first portion 800, second portion 802, and third portion 804. First portion 800 is located closer to first side 700 of nozzle screen 420 and third portion 804 is located closer to second side 702 of nozzle screen 420.

As depicted, within first portion 800 of hole 706, the diameter of hole 706 decreases in size in the direction of arrow 805 from diameter 806 to diameter 808. Within second portion 802 of hole 706, the diameter of hole 706 remains substantially constant as diameter 808. Further, within third portion 804 of hole 706, the diameter of hole 706 further decreases in size in the direction of arrow 805 from diameter 808 to diameter 810.

Fluid 502 from FIG. 5 may pass through nozzle screen 420 in the direction of arrow 805. As fluid 502 passes through hole 706, the tapered shape of hole 706, in particular the decrease in the diameter of hole 706 in the direction of arrow 805, causes the exit pressure of fluid 502 passing through hole 706 to be increased. This increase in exit pressure may cause fluid 502 to exit hole 706 at an increased velocity such that fluid 502 may reach a further distance.

Figure 9:
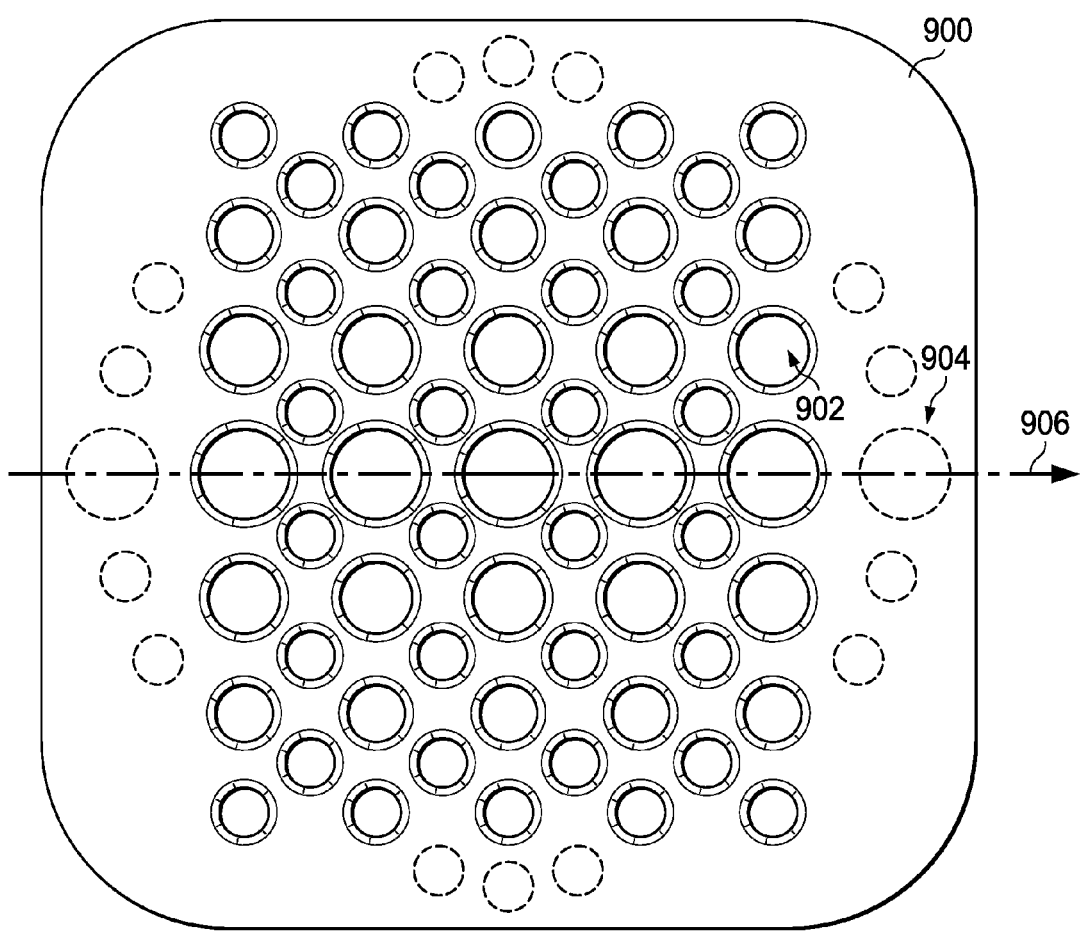
FIG. 9 is another illustration of a nozzle screen in accordance with an illustrative embodiment.

With reference now to FIG. 9, another illustration of a nozzle screen is depicted in accordance with an illustrative embodiment. In this illustrative example, nozzle screen 900 may be an example of another implementation for nozzle screen 152 in FIG. 1. Nozzle screen 900 may have plurality of holes 902 arranged in pattern 904. Plurality of holes 902 may be another example of one implementation for plurality of holes 206 in FIG. 2.

In this illustrative example, the portion of plurality of holes 902 aligned with axis 906 may be larger than the other holes in plurality of holes 902. Further, each of plurality of holes 902 may have a tapered shape configured such that any fluid passing through nozzle screen 900 may be pressurized.

The illustrations of fluid dispensing system 400 in FIGS. 4-5, tool system 424 in FIG. 6, nozzle screen 420 in FIG. 7, hole 706 in FIG. 8, and nozzle screen 900 in FIG. 9 are not meant to imply physical or architectural limitations to the manner in which an illustrative embodiment may be implemented. Other components in addition to or in place of the ones illustrated may be used. Some components may be optional.

The different components shown in FIGS. 4-9 may be illustrative examples of how components shown in block form in FIGS. 1-2 can be implemented as physical structures. Additionally, some of the components in FIGS. 4-9 may be combined with components in FIGS. 1-2, used with components in FIGS. 1-2, or a combination of the two.

Figure 10:
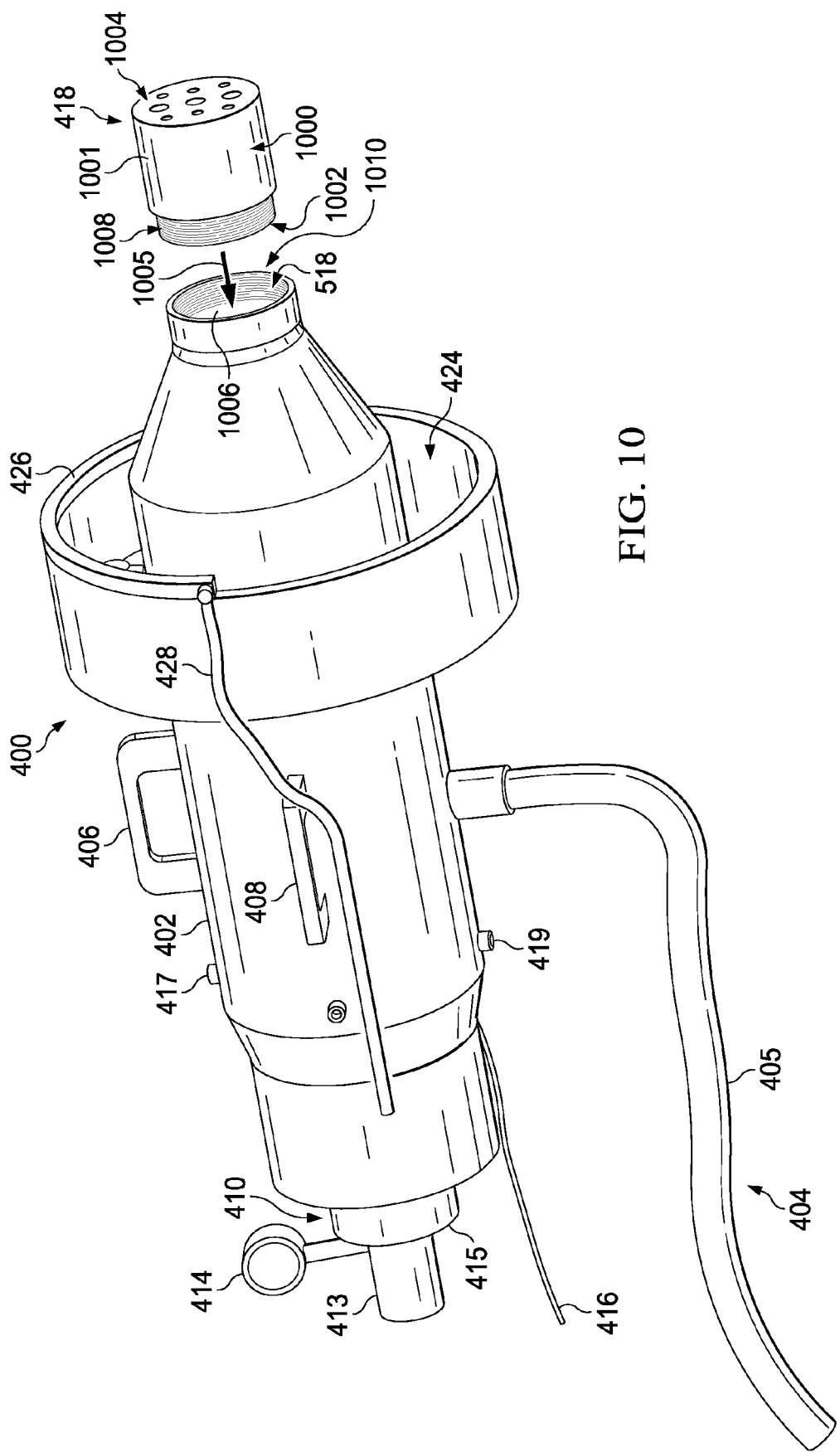
FIG. 10 is an illustration of a fluid dispensing system having a different nozzle in accordance with an illustrative embodiment.

With reference now to FIG. 10, an illustration of fluid dispensing system 400 from FIG. 4 having a different nozzle is depicted in accordance with an illustrative embodiment. In this illustrative example, nozzle 412 in FIG. 4 has been replaced with nozzle 1000. Nozzle 1000 may be an example of one implementation for nozzle 300 in FIG. 3.

As depicted, nozzle 1000 may have body 1001. Body 1001 may have first end 1002 and second end 1004. Body 1001, first end 1002, and second end 1004 may be examples of implementations for body 302, first end 304, and second end 306, respectively, in FIG. 3. First end 1002 may be inserted in the direction of arrow 1005 into opening 1006 in housing 402. Opening 1006 may allow fluid to flow from chamber 518 within housing 402 into nozzle 1000 when nozzle 1000 is attached to housing 402.

In this illustrative example, nozzle 1000 may have external threads 1008 located at first end 1002 of body 1001. In particular, external threads 1008 may engage internal threads 1010 located at opening 1006 to attach nozzle 1000 to housing 402. Nozzle 1000 is described in greater detail in FIGS. 11-13 below.

Figure 11:
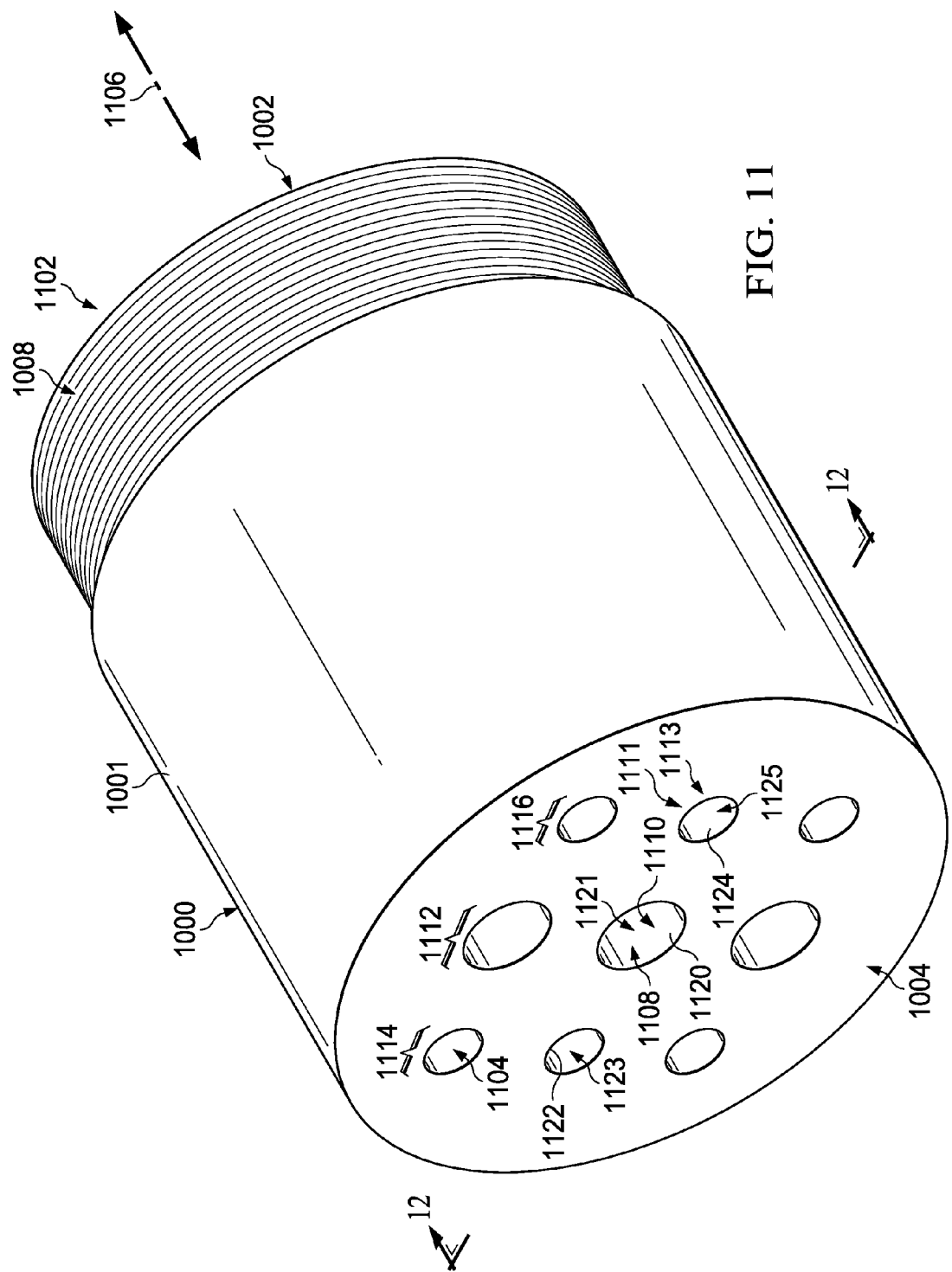
FIG. 11 is an illustration of an isometric view of a nozzle in accordance with an illustrative embodiment.

Turning now to FIG. 11, an illustration of an isometric view of nozzle 1000 from FIG. 10 is depicted in accordance with an illustrative embodiment. In this illustrative example, nozzle 1000 may have input 1102 at first end 1002 of body 1001 and output 1104 at second end 1004 of body 1001. Input 1102 and output 1104 may be examples of implementations for input 305 and output 307, respectively, in FIG. 3.

Further, nozzle 1000 may have center axis 1106. Center axis 1106 may be an example of one implementation for center axis 311 in FIG. 3.

Input 1102 may be formed by an opening (not shown in this view) at first end 1002. Output 1104 may be formed by plurality of openings 1108. Plurality of openings 1108 may be the open ends of plurality of channels 1110. Plurality of openings 1108 and plurality of channels 1110 may be examples of implementations for plurality of openings 314 and plurality of channels 312, respectively, in FIG. 3.

As depicted, plurality of openings 1108 may have configuration 1111, which may be an example of one implementation for configuration 322 in FIG. 3. Configuration 1111 may be selected such that nozzle 1000 may be used to dispense a fluid (not shown) over an interface (not shown), such as seam interface 350 in FIG. 3. Configuration 1111 may include arrangement 1113 of plurality of openings 1108. Arrangement 1113 may be an example of one implementation for arrangement 326 in FIG. 3.

Arrangement 1113 may include plurality of openings 1108 arranged to form center row 1112, first outer row 1114, and second outer row 1116. Further, arrangement 1113 may include plurality of openings 1108 being arranged substantially parallel to each other. In particular, second end 1004 of body 1001 may be substantially planar and thus, plurality of openings 1108 at second end 1004 may be arranged substantially parallel to each other. Arrangement 1113 may be selected such that the fluid flowing through plurality of channels 1110 exits plurality of openings 1108 in a desired manner.

The openings in center row 1112 may have substantially the same diameter. The openings in first outer row 1114 and second outer row 1116 may have substantially the same diameter. However, as depicted, the openings in center row 1112 may be larger in diameter than the openings in first outer row 1114 and second outer row 1116.

For example, center row 1112 may include opening 1120 for channel 1121 in plurality of channels 1110. First outer row 1114 may include opening 1122 for channel 1123 in plurality of channels 1110. Second outer row 1116 may include opening 1124 for channel 1125 in plurality of channels 1110. Opening 1122 and opening 1124 may be substantially equal in diameter. However, opening 1120 may be larger in diameter than opening 1122 and opening 1124.

Figure 12:
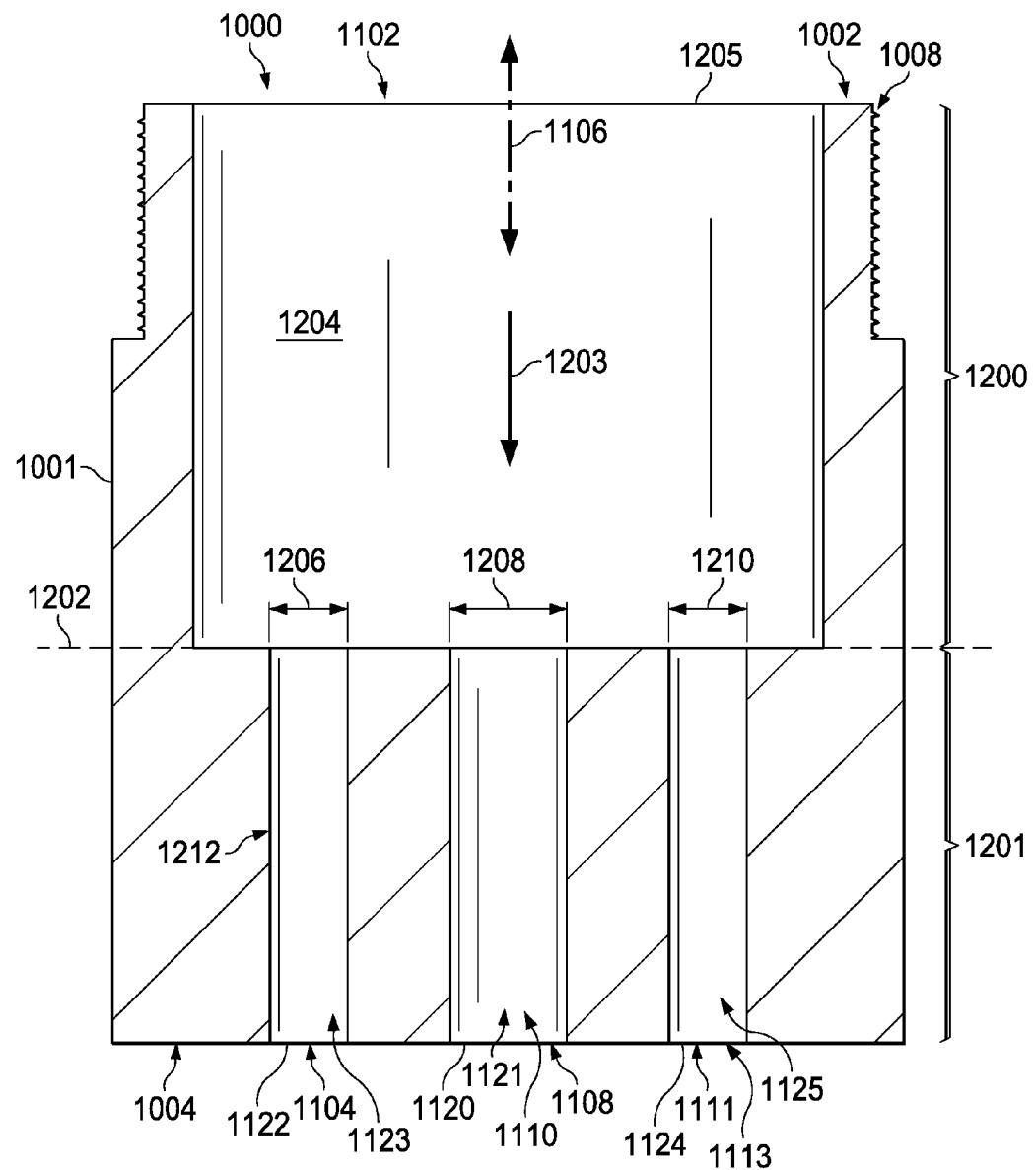
FIG. 12 is an illustration of a cross-sectional view of a nozzle in accordance with an illustrative embodiment.

With reference now to FIG. 12, an illustration of a cross-sectional view of nozzle 1000 from FIG. 11 is depicted in accordance with an illustrative embodiment. In this illustrative example, a cross-sectional view of nozzle 1000 from FIG. 11 is depicted taken with respect to lines 12-12 through center axis 1106 in FIG. 11.

As depicted, body 1001 may have first section 1200 and second section 1201. First section 1200 and second section 1201 may be examples of implementations for first section 316 and second section 318, respectively, in FIG. 3. First section 1200 may extend from first end 1002 of body 1001 to plane 1202 through body 1001. Second section 1201 may extend from plane 1202 to second end 1004 of body 1001.

A fluid (not shown) may flow in the direction of arrow 1203 into nozzle 1000. In particular, first section 1200 may have cavity 1204 configured to receive the fluid. Cavity 1204 may be an example of one implementation for cavity 320 in FIG. 3. Cavity 1204 may receive the fluid through opening 1205 at first end 1002 of body 1001. Opening 1205 may be an example of one implementation of an opening in number of openings 313 in FIG. 3. Opening 1205 may form input 1102 of nozzle 1000.

The fluid may flow through cavity 1204 into plurality of channels 1110. As depicted, channels 1123, 1121, and 1125 may have cross-sectional diameters 1206, 1208, and 1210, respectively. Cross-sectional diameters 1206, 1208, and 1210 may remain substantially constant with respect to center axis 1106. In other words, cross-sectional diameters 1206, 1208, and 1210 may not vary between plane 1202 and second end 1004.

Further, cross-sectional diameter 1206 and cross-sectional diameter 1210 may be substantially equal at corresponding locations with respect to center axis 1106. However, cross-sectional diameter 1208 may be larger than cross-sectional diameter 1206 and cross-sectional diameter 1210. Cross-sectional diameters 1206, 1208, and 1210 may form a portion of diameter profile 1212 for plurality of channels 1110. Diameter profile 1212 may be part of configuration 1111. Diameter profile 1212 may be an example of one implementation for diameter profile 324 in FIG. 3. Diameter profile 1212 may be selected such that the fluid flowing through plurality of channels 1110 exits plurality of openings 1108 in a desired manner.

Figure 13:
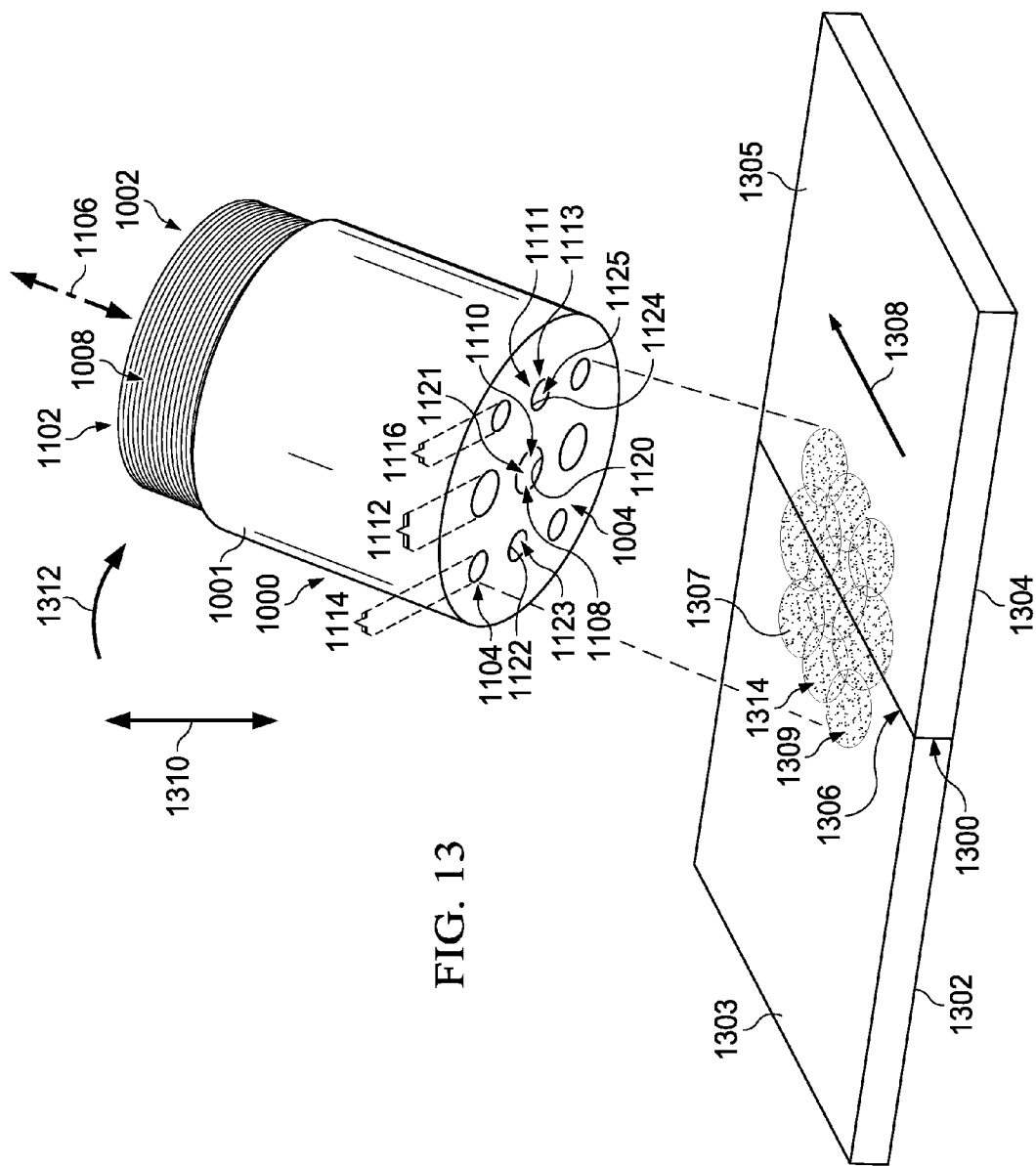
FIG. 13 is an illustration of a nozzle being used to seal a seam interface in accordance with an illustrative embodiment.

With reference now to FIG. 13, an illustration of nozzle 1000 from FIGS. 10-12 being used to seal a seam interface is depicted in accordance with an illustrative embodiment. In this illustrative example, nozzle 1000 may be used to seal interface 1300 formed by first object 1302 and second object 1304. Interface 1300 may be an example of one implementation for interface 346 in FIG. 3.

As depicted, first object 1302 may have first surface 1303 and second object 1304 may have second surface 1305. Interface 1300 may be present where first surface 1303 meets second surface 1305.

In this illustrative example, interface 1300 may take the form of seam interface 1306. Seam interface 1306 may be an example of one implementation for seam interface 350 in FIG. 3. A seam interface, such as seam interface 1306, may be an interface formed where two objects are butted up against each other. With a seam interface, the surfaces of these two objects may be substantially flush with each other when joined. In some illustrative examples, a seam interface may be referred to as a butt interface or a butt joint.

As depicted, nozzle 1000 may be moved along seam interface 1306 in the direction of arrow 1308 to deposit a fluid over seam interface 1306. For example, without limitation, nozzle 1000 may be used to deposit a fluid, in the form of sealant 1307, over seam interface 1306 to seal seam interface 1306. In this illustrative example, nozzle 1000 may be used to form deposition 1309 of sealant 1307 over a portion of seam interface 1306. Deposition 1309 may be an example of one implementation for deposition 338 in FIG. 3.

When depositing sealant 1307 over seam interface 1306, nozzle 1000 may be positioned such that center axis 1106 of nozzle 1000 is substantially parallel with normal axis 1310, which is substantially normal to first surface 1303 and second surface 1305. However, in FIG. 13, nozzle 1000 is depicted as being rotated in the direction of arrow 1312 relative to normal axis 1310 such that plurality of openings 1108 may be clearly seen. Of course, in some cases, nozzle 1000 may be positioned at an angle relative to normal axis 1310 when dispensing fluid.

In this illustrative example, center row 1112 of plurality of openings 1108 has been positioned substantially perpendicular to seam interface 1306. However, in other illustrative examples, center row 1112 may be positioned substantially parallel to seam interface 1306.

Configuration 1111 of plurality of channels 1110 and the positioning of nozzle 1000 may be selected such that the deposition of sealant 1307 over seam interface 1306 has desired shape 1314. Desired shape 1314 may be an example of one implementation for desired shape 340 in FIG. 3. Further, configuration 1111 of plurality of channels 1110 may be selected such that sealant 1307 exits nozzle 1000 through output 1104 of nozzle 1000 having a desired velocity profile and a desired pressure profile.

As one illustrative example, the diameters of plurality of openings 1108 in diameter profile 1212 described in FIG. 12 and the spacing of plurality of openings 1108 in arrangement 1113 described in FIG. 11 may be selected based on the gap size of seam interface 1306. The gap size of seam interface 1306 may be the size of any gap between first object 1302 and second object 1304 along seam interface 1306.

Figure 14:
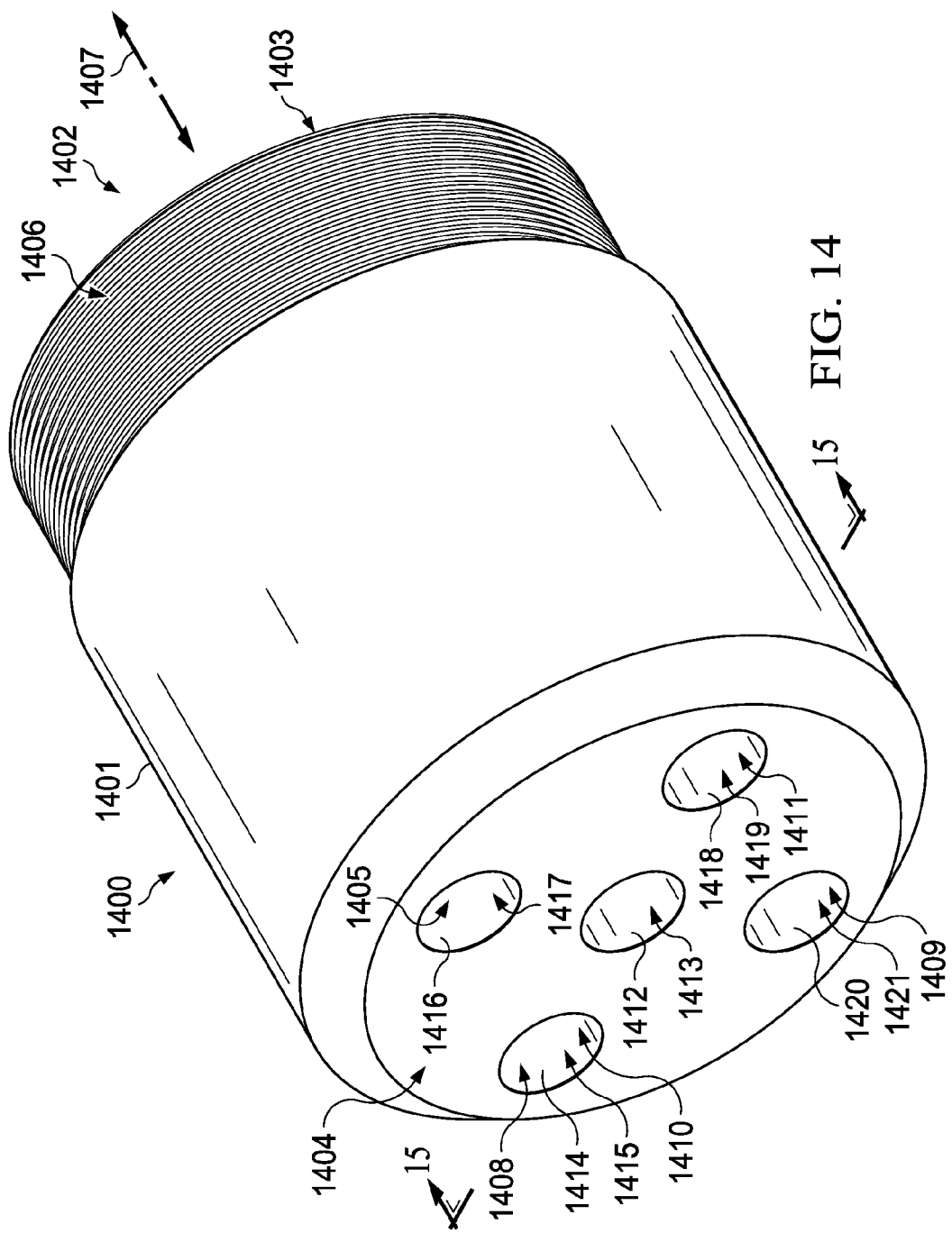
FIG. 14 is an illustration of a different type of nozzle in accordance with an illustrative embodiment.

With reference now to FIG. 14, an illustration of a different type of nozzle is depicted in accordance with an illustrative embodiment. In this illustrative example, nozzle 1400 may be an example of one implementation for nozzle 300 in FIG. 3. Nozzle 1400 may be a different type of nozzle that may be used in fluid dispensing system 400 shown in FIG. 10 instead of nozzle 1000. Nozzle 1400 may be implemented in a manner similar to nozzle 1000 in FIGS. 10-13, except that nozzle 1400 may have a different configuration of channels.

As depicted, nozzle 1400 may have body 1401. Body 1401 may have first end 1402 and second end 1404. Body 1401, first end 1402, and second end 1404 may be examples of implementations for body 302, first end 304, and second end 306, respectively, in FIG. 3.

Nozzle 1400 may have input 1403 at first end 1402 and output 1405 at second end 1404. Input 1403 and output 1405 may be examples of implementations for input 305 and output 307, respectively, in FIG. 3.

As depicted, nozzle 1400 may have external threads 1406 located at first end 1402 of body 1401. External threads 1406 may be configured to engage, for example, without limitation, internal threads 1010 in FIG. 10 to attach nozzle 1400 to housing 402 shown in FIG. 10.

Further, nozzle 1400 may have center axis 1407. Center axis 1407 may be an example of one implementation for center axis 311 in FIG. 3.

Input 1403 may be formed by an opening (not shown in this view) at first end 1402. Output 1405 may be formed by plurality of openings 1408. Plurality of openings 1408 may be the open ends of plurality of channels 1410. Plurality of openings 1408 and plurality of channels 1410 may be examples of implementations for plurality of openings 314 and plurality of channels 312, respectively, in FIG. 3.

As depicted, plurality of openings 1408 may have configuration 1409, which may be an example of one implementation for configuration 322 in FIG. 3. Configuration 1409 may be selected such that nozzle 1400 may be used to dispense a fluid (not shown) over an interface (not shown), such as cross-seam interface 352 in FIG. 3. Configuration 1409 may include arrangement 1411 of plurality of openings 1408. Arrangement 1411 may be an example of one implementation for arrangement 326 in FIG. 3. Arrangement 1411 may be selected such that the fluid flowing through plurality of channels 1410 exits plurality of openings 1408 in a desired manner.

Arrangement 1411 may include plurality of openings 1408 arranged substantially parallel to each other in an X-pattern with respect to center axis 1407. In particular, second end 1404 of body 1401 may be substantially planar and thus, plurality of openings 1408 at second end 1404 may be arranged substantially parallel to each other.

Further, plurality of openings 1408 may include center opening 1412 for center channel 1413 and outer openings 1414, 1416, 1418, and 1420 for outer channels 1415, 1417, 1419, and 1421, respectively, in plurality of channels 1410. Center opening 1412 may be located along center axis 1407. Outer openings 1414, 1416, 1418, and 1420 may be located away from center axis 1407. In this illustrative example, center opening 1412 and outer openings 1414, 1416, 1418, and 1420 may have substantially the same diameter. Arrangement 1411 may be selected such that center opening 1412 and outer openings 1414, 1416, 1418, and 1420 are substantially equally spaced relative to each other at second end 1404. However, in other illustrative examples, outer opening 1414 and outer opening 1418 may be positioned closer to center opening 1412, and thereby center axis 1407, than outer opening 1416 and outer opening 1420.

Figure 15:
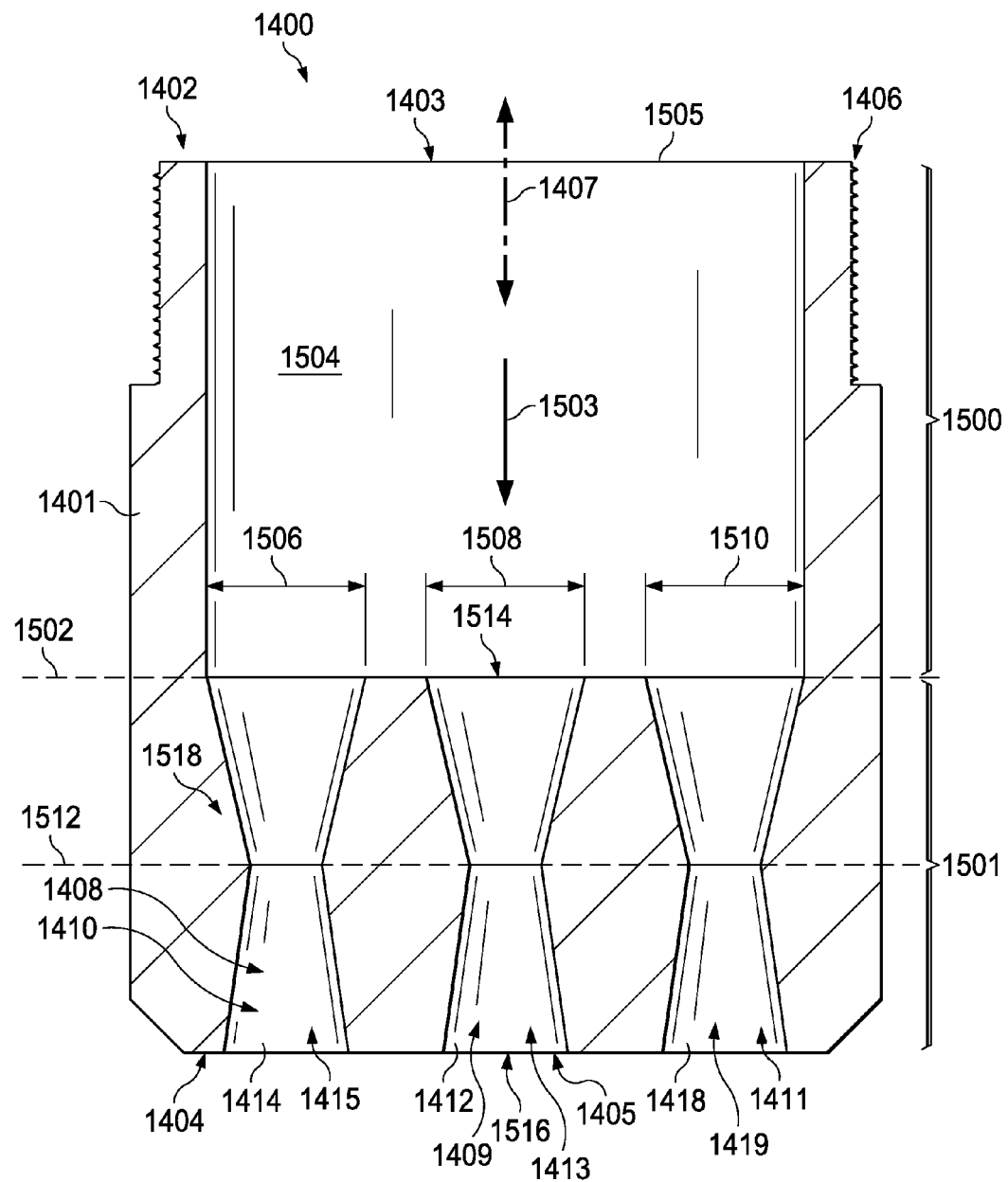
FIG. 15 is an illustration of a cross-sectional view of a nozzle in accordance with an illustrative embodiment.

With reference now to FIG. 15, an illustration of a cross-sectional view of nozzle 1400 from FIG. 14 is depicted in accordance with an illustrative embodiment. In this illustrative example, a cross-sectional view of nozzle 1400 from FIG. 14 is depicted taken with respect to lines 15-15 through center axis 1407 in FIG. 14.

As depicted, body 1401 may have first section 1500 and second section 1501. First section 1500 and second section 1501 may be examples of implementations for first section 316 and second section 318, respectively, in FIG. 3. First section 1500 may extend from first end 1402 of body 1401 to plane 1502 through body 1401. Second section 1501 may extend from plane 1502 to second end 1404 of body 1401.

A fluid (not shown) may flow in the direction of arrow 1503 into nozzle 1400. In particular, first section 1500 may have cavity 1504 configured to receive the fluid. Cavity 1504 may be an example of one implementation for cavity 320 in FIG. 3. Cavity 1504 may receive the fluid through opening 1505 at first end 1402 of body 1401. Opening 1505 may be an example of one implementation of an opening in number of openings 313 in FIG. 3. Opening 1505 may form input 1403 of nozzle 1400.

The fluid may flow through cavity 1504 into plurality of channels 1410. In this illustrative example, each of plurality of channels 1410 may be implemented in the same manner. For example, outer channel 1415, center channel 1413, and outer channel 1419 may have cross-sectional diameters 1506, 1508, and 1510, respectively. Cross-sectional diameters 1506, 1508, and 1510 may vary with respect to center axis 1407. In other words, cross-sectional diameters 1506, 1508, and 1510 may vary between plane 1502 and second end 1404.

Cross-sectional diameter 1508 of center channel 1413 may decrease in the direction of arrow 1503 from plane 1502 to choke plane 1512. Further, cross-sectional diameter 1508 of center channel 1413 may increase in the direction of arrow 1503 from choke plane 1512 to second end 1404. Cross-sectional diameter 1508 of center channel 1413 at choke plane 1512 may be referred to as the "choke diameter" of center channel 1413.

However, as depicted, cross-sectional diameter 1508 of first end 1514 of center channel 1413 may be larger than cross-sectional diameter 1508 of second end 1516 of center channel 1413. In other words, cross-sectional diameter 1508 of first end 1514 of center channel 1413 may be larger than the diameter of center opening 1412. Each of outer channels 1415, 1417, 1419, and 1421 in FIG. 14 and FIG. 15 may be configured in a manner similar to center channel 1413.

Having a larger diameter at first end 1514 of center channel 1413 may facilitate the flow of fluid from cavity 1504 into center channel 1413. However, the choke diameter of center channel 1413 at choke plane 1512 may increase the velocity of fluid that flows through center channel 1413 and exits nozzle 1400 through center opening 1412.

Cross-sectional diameters 1506, 1508, and 1510 may form a portion of diameter profile 1518 for plurality of channels 1410. Diameter profile 1518 may be part of configuration 1409. Diameter profile 1518 may be an example of one implementation for diameter profile 324 in FIG. 3. Diameter profile 1518 may be selected such that the fluid flowing through plurality of channels 1410 exits plurality of openings 1408 in a desired manner.

Figure 16:
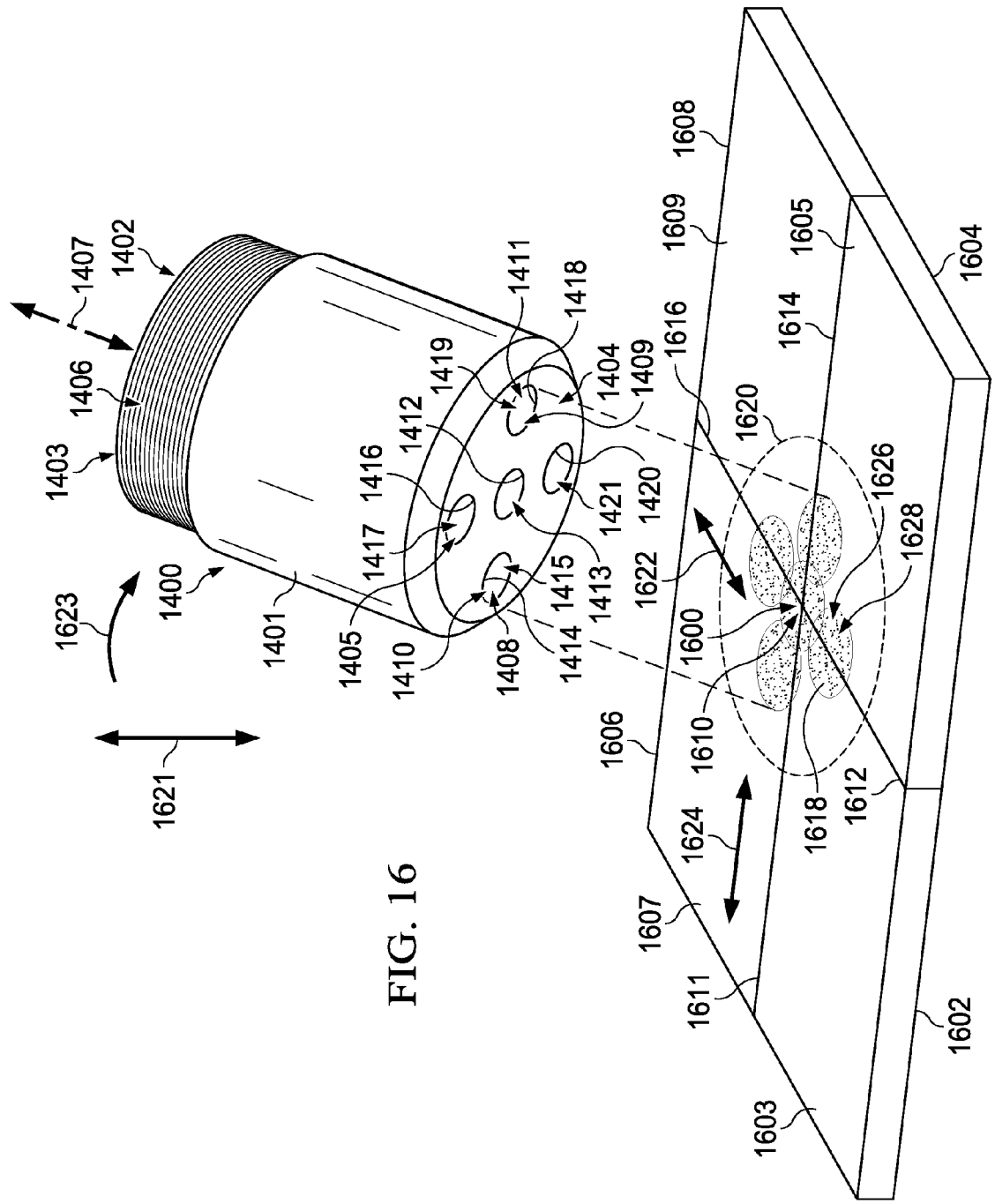
FIG. 16 is an illustration of a nozzle being used to seal a cross-seam interface in accordance with an illustrative embodiment.

With reference now to FIG. 16, an illustration of nozzle 1400 from FIGS. 14-15 being used to seal a cross-seam interface is depicted in accordance with an illustrative embodiment. In this illustrative example, nozzle 1400 may be used to seal interface 1600 formed by first object 1602, second object 1604, third object 1606, and fourth object 1608. Interface 1600 may be an example of one implementation for interface 346 in FIG. 3.

As depicted, first object 1602 may have first surface 1603; second object 1604 may have second surface 1605; third object 1606 may have third surface 1607; and fourth object 1608 may have fourth surface 1609. Interface 1600 may be the point at which first surface 1603, second surface 1605, third surface 1607, and fourth surface 1609 meet. In this illustrative example, interface 1600 may take the form of cross-seam interface 1610.

Cross-seam interface 1610 may be an example of one implementation for cross-seam interface 352 in FIG. 3. A cross-seam interface, such as cross-seam interface 1610, may be the point at which at least two seam interfaces connecting different objects intersect, or cross. With a cross-seam interface, the surfaces of the different objects joined together may be substantially flush with each other when joined. In some illustrative examples, a cross-seam interface may be referred to as a butt interface or a butt joint.

Cross-seam interface 1610 may be formed by the intersection of seam interface 1611, seam interface 1612, seam interface 1614, and seam interface 1616. Seam interface 1611 may be formed between first object 1602 and third object 1606. Seam interface 1612 may be formed first object 1602 and second object 1604. Seam interface 1614 may be formed between second object 1604 and fourth object 1608. Seam interface 1616 may be formed between third object 1606 and fourth object 1608.

When depositing a fluid over cross-seam interface 1610, nozzle 1400 may be positioned such that center axis 1407 of nozzle 1400 is substantially parallel with normal axis 1621, which is substantially normal to first surface 1603, second surface 1605, third surface 1607, and fourth surface 1609. However, in FIG. 16, nozzle 1400 is depicted as being rotated in the direction of arrow 1623 relative to normal axis 1621 such that plurality of openings 1408 may be clearly seen. Of course, in some cases, nozzle 1400 may be positioned at an angle relative to normal axis 1621 when dispensing fluid.

Nozzle 1400 may be positioned over area 1620 to deposit fluid, in the form of sealant 1618, over cross-seam interface 1610. In one illustrative example, nozzle 1400 may be positioned over area 1620 such that center axis 1407 of nozzle 1400 aligns with cross-seam interface 1610. Nozzle 1400 may be used to from deposition 1626 of sealant 1618 within area 1620. Deposition 1626 may be an example of one implementation for deposition 338 in FIG. 3.

Configuration 1409 of plurality of channels 1410 and the positioning of nozzle 1400 may be selected such that deposition 1626 of sealant 1618 over cross-seam interface 1610 has desired shape 1628. Desired shape 1628 may be an example of one implementation for desired shape 340 in FIG. 3. Further, configuration 1409 of plurality of channels 1410 may be selected such that sealant 1618 exits nozzle 1400 through output 1405 of nozzle 1400 having a desired velocity profile and a desired pressure profile, similar to desired velocity profile 342 and desired pressure profile 344, respectively, in FIG. 1.

Nozzle 1400 may then be moved in the direction of arrow 1622 to further deposit sealant 1618 over seam interface 1612 and seam interface 1616. Similarly, nozzle 1400 may be moved in the direction of arrow 1624 to further deposit fluid over seam interface 1611 and seam interface 1614.

Figure 17:
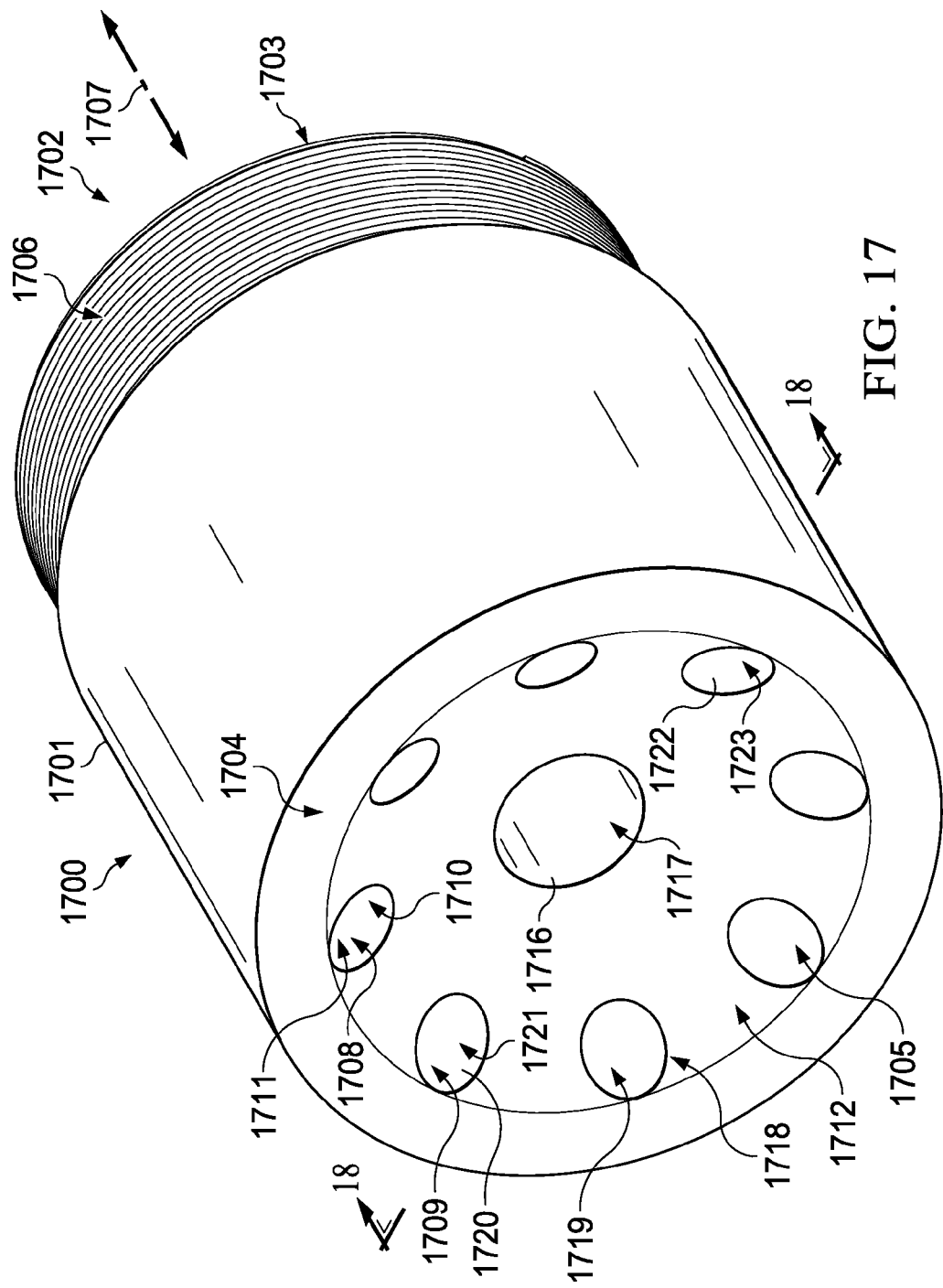
FIG. 17 is an illustration of another type of nozzle in accordance with an illustrative embodiment.

With reference now to FIG. 17, an illustration of another type of nozzle is depicted in accordance with an illustrative embodiment. In this illustrative example, nozzle 1700 may be an example of one implementation for nozzle 300 in FIG. 3. Nozzle 1700 may be a different type of nozzle that may be used in fluid dispensing system 400 shown in FIG. 10 instead of nozzle 1000. Nozzle 1700 may be implemented in a manner similar to nozzle 1000 in FIGS. 10-13 and nozzle 1400 in FIGS. 14-16, except that nozzle 1700 may have a different configuration of channels.

As depicted, nozzle 1700 may have body 1701. Body 1701 may have first end 1702 and second end 1704. Body 1701, first end 1702, and second end 1704 may be examples of implementations for body 302, first end 304, and second end 306, respectively, in FIG. 3.

Nozzle 1700 may have input 1703 at first end 1702 and output 1705 at second end 1704. Input 1703 and output 1705 may be examples of implementations for input 305 and output 307, respectively, in FIG. 3.

As depicted, nozzle 1700 may have external threads 1706 located at first end 1702 of body 1701. External threads 1706 may be configured to engage, for example, without limitation, internal threads 1010 in FIG. 10 to attach nozzle 1700 to housing 402 shown in FIG. 10.

Further, nozzle 1700 may have center axis 1707. Center axis 1707 may be an example of one implementation for center axis 311 in FIG. 3.

Input 1703 may be formed by an opening (not shown in this view) at first end 1702. Output 1705 may be formed by plurality of openings 1708. Plurality of openings 1708 may be the open ends of plurality of channels 1710. Plurality of openings 1708 and plurality of channels 1710 may be examples of implementations for plurality of openings 314 and plurality of channels 312, respectively, in FIG. 3.

As depicted, plurality of openings 1708 may have configuration 1709, which may be an example of one implementation for configuration 322 in FIG. 3. Configuration 1709 may be selected such that nozzle 1700 may be used to dispense a fluid (not shown) over an interface (not shown), such as fastener interface 354 in FIG. 3. Configuration 1709 may include arrangement 1711 of plurality of openings 1708. Arrangement 1711 may be an example of one implementation for arrangement 326 in FIG. 3. Arrangement 1711 may be selected such that the fluid flowing through plurality of channels 1710 exits plurality of openings 1708 in a desired manner.

In this illustrative example, second end 1704 of body 1701 may have concave shape 1712. In particular, second end 1704 of body 1701 may curve inwards in body 1701 to form concave shape 1712. Arrangement 1711 may include plurality of openings 1708 arranged such that plurality of openings 1708 substantially conforms to concave shape 1712. Concave shape 1712 may be configured such that second end 1704 may be able to fully encompass, for example, without limitation, a fastener head installed on a surface, not shown.

Further, plurality of openings 1708 may include center opening 1716 for center channel 1717 and outer openings 1718 for outer channels 1719. Outer openings 1718 may include, for example, outer opening 1720 for outer channel 1721 and outer opening 1722 for outer channel 1723.

Center opening 1716 may be located along center axis 1707. Outer openings 1718 may be located away from center axis 1707. In this illustrative example, center opening 1716 may have a larger diameter than the diameters of outer openings 1718. Arrangement 1711 may be selected such that outer openings 1718 are substantially equally spaced relative to each other around center opening 1716 and substantially equally spaced from center opening 1716.

Figure 18:
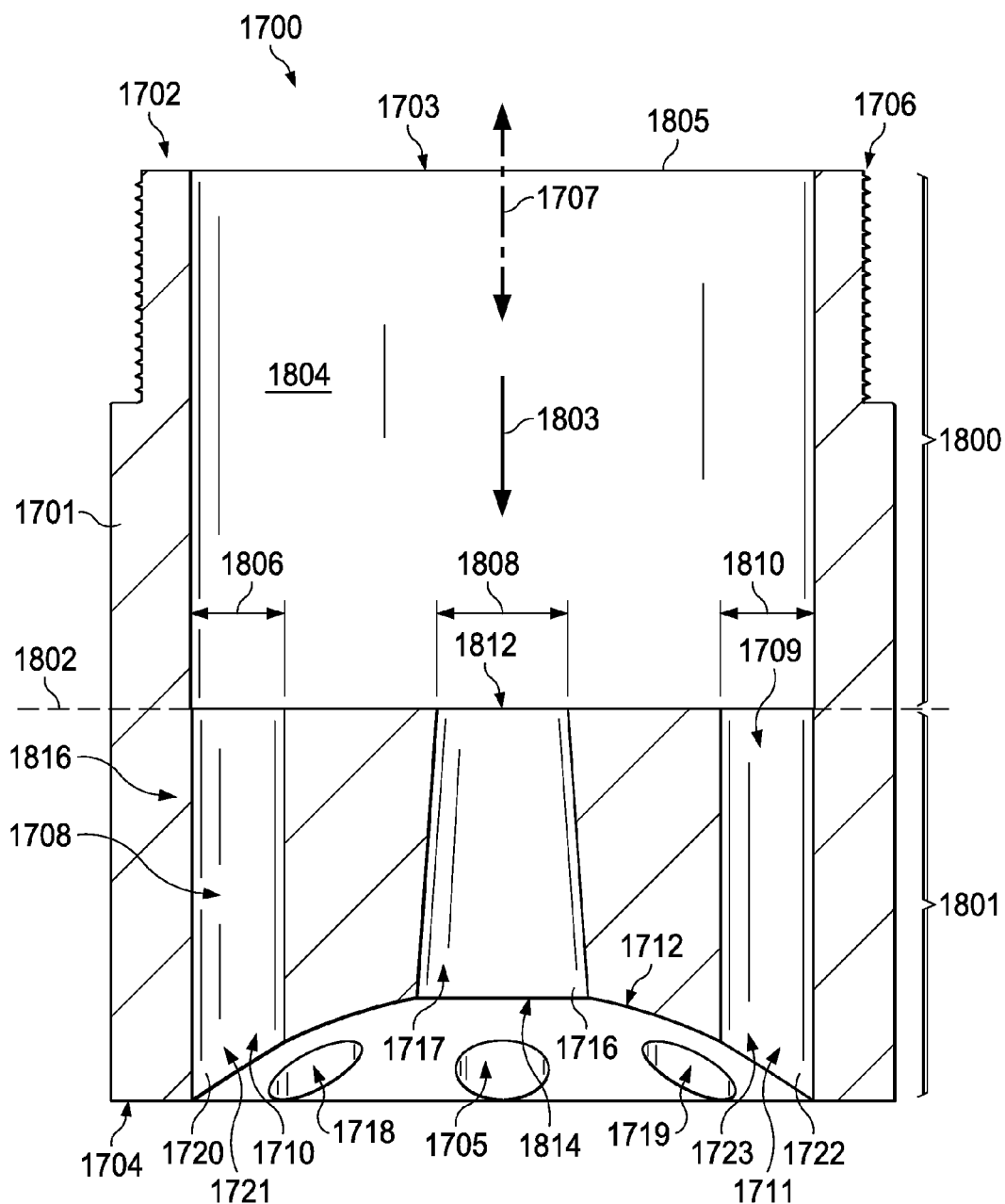
FIG. 18 is an illustration of a cross-sectional view of a nozzle in accordance with an illustrative embodiment.

With reference now to FIG. 18, an illustration of a cross-sectional view of nozzle 1700 from FIG. 17 is depicted in accordance with an illustrative embodiment. In this illustrative example, a cross-sectional view of nozzle 1700 from FIG. 17 is depicted taken with respect to lines 18-18 through center axis 1707 in FIG. 17.

As depicted, body 1701 may have first section 1800 and second section 1801. First section 1800 and second section 1801 may be examples of implementations for first section 316 and second section 318, respectively, in FIG. 3. First section 1800 may extend from first end 1702 of body 1701 to plane 1802 through body 1701. Second section 1801 may extend from plane 1802 to second end 1704 of body 1701.

A fluid (not shown) may flow in the direction of arrow 1803 into nozzle 1700. In particular, first section 1800 may have cavity 1804 configured to receive the fluid. Cavity 1804 may be an example of one implementation for cavity 320 in FIG. 3. Cavity 1804 may receive the fluid through opening 1805 at first end 1702 of body 1701. Opening 1805 may be an example of one implementation of an opening in number of openings 313 in FIG. 3. Opening 1805 may form input 1703 of nozzle 1700.

The fluid may flow through cavity 1804 into plurality of channels 1710. As depicted, outer channel 1721, center channel 1717, and outer channel 1723 may have cross-sectional diameters 1806, 1808, and 1810, respectively. Cross-sectional diameters 1806 and 1810 may remain substantially constant with respect to center axis 1707. In other words, cross-sectional diameters 1806 and 1810 may not vary between plane 1802 and second end 1704.

However, cross-sectional diameter 1808 may vary between plane 1802 and second end 1704 of body 1701. In particular, cross-sectional diameter 1808 may increase in the direction of arrow 1803 from first end 1812 of center channel 1717 to second end 1814 of center channel 1717. In this manner, type of increase in cross-sectional diameter 1808 of center channel 1717 may cause more fluid to exit from and be deposited over the topmost portion of a fastener head.

Further, cross-sectional diameter 1806 and cross-sectional diameter 1810 may be substantially equal with respect to corresponding locations along center axis 1707. However, cross-sectional diameter 1808 may be larger than cross-sectional diameter 1806 and cross-sectional diameter 1810 along the full lengths of the corresponding channels. Cross-sectional diameters 1806, 1808, and 1810 may form a portion of diameter profile 1816 for plurality of channels 1710. Diameter profile 1816 may be part of configuration 1709. Diameter profile 1816 may be an example of one implementation for diameter profile 324 in FIG. 3. Diameter profile 1816 may be selected such that the fluid flowing through plurality of channels 1710 exits plurality of openings 1708 in a desired manner.

Figure 19:
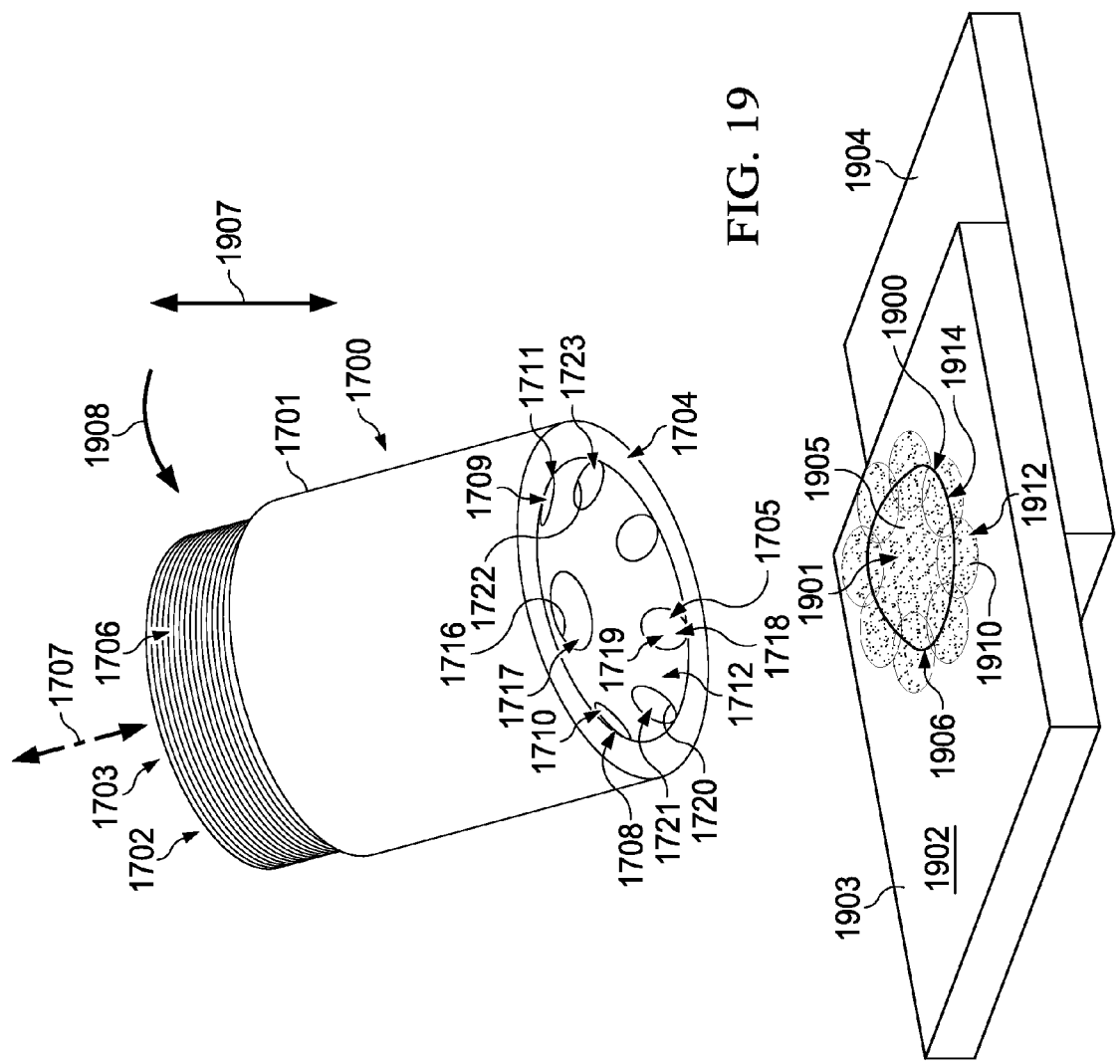
FIG. 19 is an illustration of a nozzle being used to seal a fastener interface in accordance with an illustrative embodiment.

With reference now to FIG. 19, an illustration of nozzle 1700 from FIGS. 17-18 being used to seal a fastener interface is depicted in accordance with an illustrative embodiment. In this illustrative example, nozzle 1700 may be used to seal interface 1900 formed between fastener 1901 and surface 1902 of first object 1903. Interface 1900 may be an example of one implementation for interface 346 in FIG. 3.

Fastener 1901 may be used to join first object 1903 to second object 1904. In this illustrative example, only fastener head 1905 of fastener 1901 is depicted. Interface 1900 may be formed where fastener head 1905 meets surface 1902. In this illustrative example, interface 1900 may take the form of fastener interface 1906.

Fastener interface 1906 may be an example of one implementation for fastener interface 354 in FIG. 3. A fastener interface, such as fastener interface 1906, may be formed where the head of a fastener meets the surface in which the fastener is installed. In some illustrative examples, a fastener interface may be referred to as a rivet interface.

When depositing a fluid over fastener interface 1906, nozzle 1700 may be positioned such that center axis 1707 of nozzle 1700 is substantially parallel with normal axis 1907, which is substantially normal to surface 1902. However, in FIG. 19, nozzle 1700 is depicted as being rotated in the direction of arrow 1908 relative to normal axis 1907 such that plurality of openings 1708 may be clearly seen. Of course, in some cases, nozzle 1700 may be positioned at an angle relative to normal axis 1907 when dispensing fluid.

Nozzle 1700 may be positioned over fastener 1901 to deposit a fluid, in the form of sealant 1910, over fastener interface 1906 and fastener 1901 to form deposition 1912. Deposition 1912 may be an example of one implementation for deposition 338 in FIG. 3. Depositing sealant 1910 over fastener interface 1906 includes depositing sealant 1910 over fastener head 1905 such that deposition 1912 of sealant 1910 completely covers fastener head 1905.

Configuration 1709 of plurality of channels 1710 and the positioning of nozzle 1700 may be selected such that deposition 1912 of sealant 1910 over fastener interface 1905 has desired shape 1914 over fastener interface 1906 and fastener head 1905. Desired shape 1914 may be an example of one implementation for desired shape 340 in FIG. 3. Further, configuration 1709 of plurality of channels 1710 may be selected such that sealant 1910 exits nozzle 1700 through output 1705 of nozzle 1700 having a desired velocity profile and a desired pressure profile.

Figure 20:
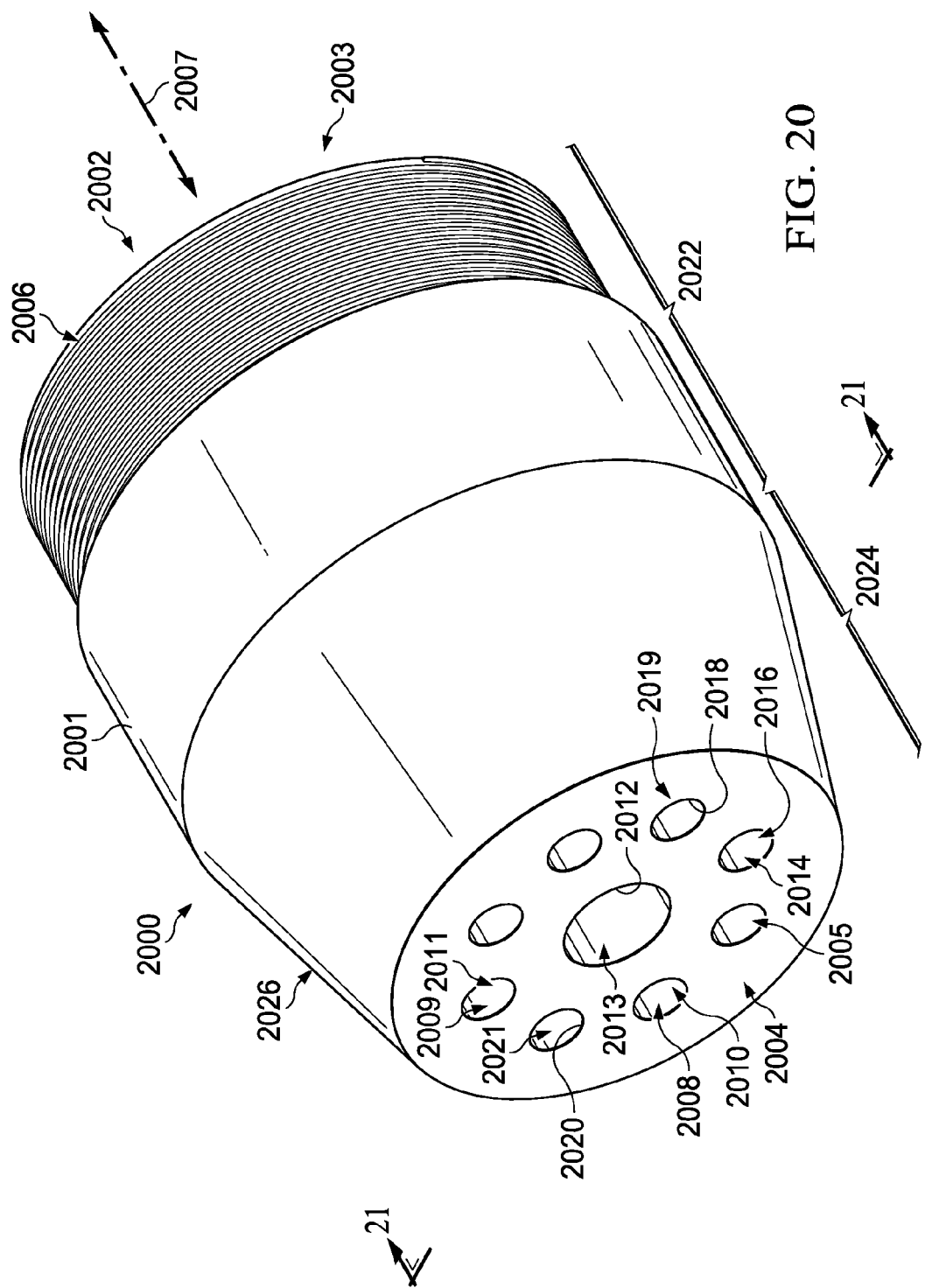
FIG. 20 is an illustration of another type of nozzle in accordance with an illustrative embodiment.

With reference now to FIG. 20, an illustration of another type of nozzle is depicted in accordance with an illustrative embodiment. In this illustrative example, nozzle 2000 may be an example of one implementation for nozzle 300 in FIG. 3. Nozzle 2000 may be a different type of nozzle that may be used in fluid dispensing system 400 shown in FIG. 10 instead of nozzle 1000.

As depicted, nozzle 2000 may have body 2001. Body 2001 may have first end 2002 and second end 2004. Body 2001, first end 2002, and second end 2004 may be examples of implementations for body 302, first end 304, and second end 306, respectively, in FIG. 3.

Nozzle 2000 may have input 2003 at first end 2002 and output 2005 at second end 2004. Input 2003 and output 2005 may be examples of implementation for input 305 and output 307, respectively, in FIG. 3.

As depicted, nozzle 2000 may have external threads 2006 located at first end 2002 of body 2001. External threads 2006 may be configured to engage, for example, without limitation, internal threads 1010 in FIG. 10 to attach nozzle 2000 to housing 402 shown in FIG. 10. Further, nozzle 2000 may have center axis 2007. Center axis 2007 may be an example of one implementation for center axis 311 in FIG. 3.

Input 2003 may be formed by an opening (not shown in this view) at first end 2002. Output 2005 may be formed be plurality of openings 2008. Plurality of openings 2008 may be the open ends of plurality of channels 2010. Plurality of openings 2008 and plurality of channels 2010 may be examples of implementations for plurality of openings 314 and plurality of channels 312, respectively, in FIG. 3.

As depicted, plurality of openings 2008 may have configuration 2009, which may be an example of one implementation for configuration 322 in FIG. 3. Configuration 2009 may be selected such that nozzle 2000 may be used to dispense a fluid (not shown) over an interface (not shown), such as corner interface 356 in FIG. 3. Configuration 2009 may include arrangement 2011 of plurality of openings 2008. Arrangement 2011 may be an example of one implementation for arrangement 326 in FIG. 3. Arrangement 2011 may be selected such that the fluid flowing through plurality of channels 2010 exits plurality of openings 2008 in a desired manner.

Arrangement 2011 may include plurality of openings 2008 arranged substantially parallel to each other. In particular, second end 2004 of body 2001 may be substantially planar and thus, plurality of openings 2008 at second end 2004 may be arranged substantially parallel to each other. Arrangement 2011 may be selected such that the fluid flowing through plurality of channels 2010 exits plurality of openings 2008 in a desired manner.

In this illustrative example, plurality of openings 2008 may include center opening 2012 for center channel 2013 and outer openings 2014 for outer channels 2016. Outer openings 2014 may include, for example, outer opening 2018 for outer channel 2019 and outer opening 2020 for outer channel 2021.

Center opening 2012 may be located along center axis 2007. Outer openings 2014 may be located away from center axis 2007. In this illustrative example, center opening 2012 may have a larger diameter than the diameters of outer openings 2014. Arrangement 2011 may be selected such that outer openings 2014 are substantially equally spaced relative to each other around center opening 2012 and substantially equally spaced from center opening 2012.

Further, body 2001 may include first section 2022 and second section 2024. First section 2022 and second section 2024 may be examples of implementations for first section 316 and second section 318, respectively, in FIG. 3.

In this illustrative example, second section 2024 of body 2001 may taper towards second end 2004 of body 2001 such that the outer shape of second section 2024 takes the form of tapered shape 2026. Tapered shape 2026 of second section 2024 may allow second end 2004 to be positioned relative to hard-to-reach locations. For example, the tapering of second section 2024 may allow second end 2004 to be positioned in tight spaces to reach, for example, sharp corners.

Figure 21:
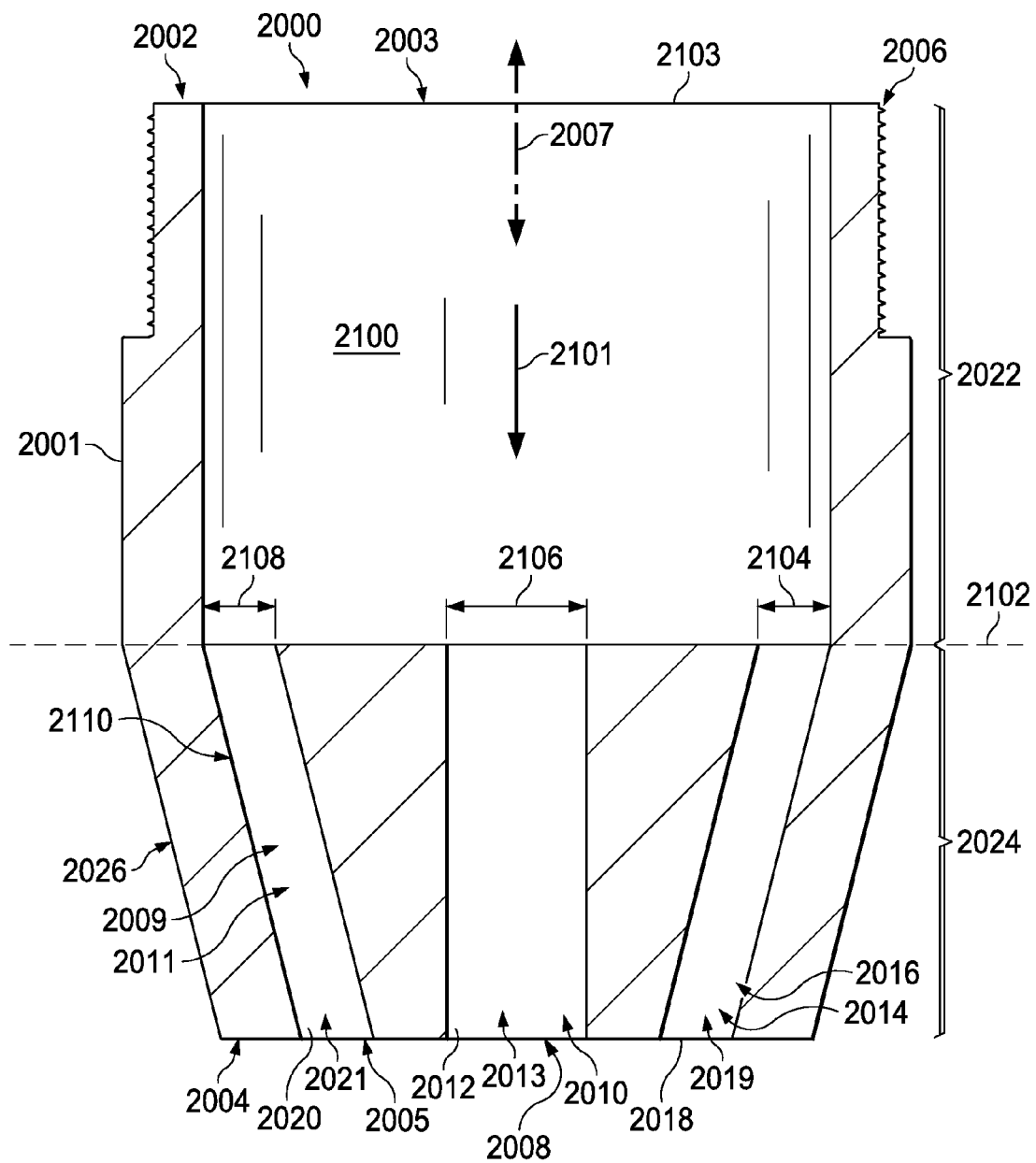
FIG. 21 is an illustration of a cross-sectional view of a nozzle in accordance with an illustrative embodiment.

With reference now to FIG. 21, an illustration of a cross-sectional view of nozzle 2000 from FIG. 20 is depicted in accordance with an illustrative embodiment. In this illustrative example, a cross-sectional view of nozzle 2000 from FIG. 20 is depicted taken with respect to lines 21-21 through center axis 2007 in FIG. 20.

First section 2022 may have cavity 2100 configured to receive a fluid. A fluid (not shown) may flow in the direction of arrow 2101 into cavity 2100 into nozzle 2000. Cavity 2100 may be an example of one implementation for cavity 320 in FIG. 3. Cavity 2100 may receive the fluid through opening 2103 at first end 2002 of body 2001. Opening 2103 may be an example of one implementation of an opening in number of openings 313 in FIG. 3. Opening 2103 may form input 2003 of nozzle 2000.

As depicted, first section 2022 of body 2001 may extend from first end 2002 of body 2001 to plane 2102 through body 2001. Second section 2024 may extend from plane 2102 to second end 2004 of body 2001.

The fluid may flow through cavity 2100 in first section 2022 into plurality of channels 2010 in second section 2024. As depicted, outer channel 2019, center channel 2013, and outer channel 2021 may have cross-sectional diameters 2104, 2106, and 2108, respectively. Cross-sectional diameters 2104, 2106, and 2108 may remain substantially constant with respect to center axis 2007. In other words, cross-sectional diameters 2104, 2106, and 2108 may not vary between plane 2102 and second end 2004.

Cross-sectional diameters 2104, 2106, and 2108 may form a portion of diameter profile 2110 for plurality of channels 2010. Diameter profile 2110 may be part of configuration 2009. Diameter profile 2110 may be an example of one implementation for diameter profile 324 in FIG. 3. Diameter profile 2110 may be selected such that the fluid flowing through plurality of channels 2010 exits plurality of openings 2008 in a desired manner.

Further, outer channel 2019 and outer channel 2021 may be angled towards center axis 2007. In particular, the distance between outer channel 2019 and center axis 2007 and the distance between outer channel 2021 and center axis 2007 may decrease in the direction of arrow 2101.

Figure 22:
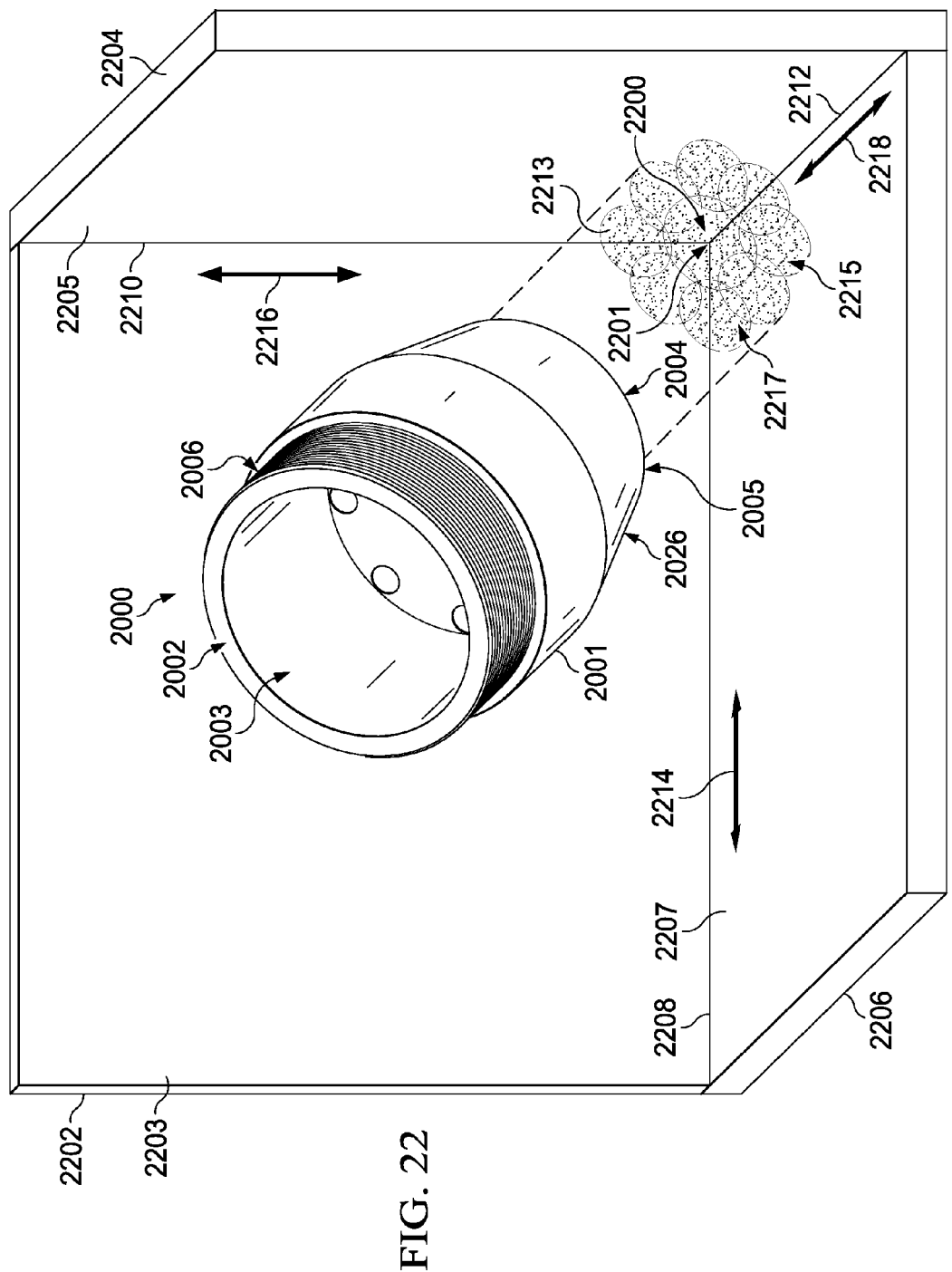
FIG. 22 is an illustration of a nozzle being used to seal a corner interface in accordance with an illustrative embodiment.

With reference now to FIG. 22, an illustration of nozzle 2000 from FIGS. 20-21 being used to seal a corner interface is depicted in accordance with an illustrative embodiment. In this illustrative example, nozzle 2000 may be used to seal interface 2200 formed between first object 2202, second object 2204, and third object 2206. Interface 2200 may be an example of one implementation for interface 346 in FIG. 3. As depicted, first object 2202 may have first surface 2203. Second object 2204 may have second surface 2205. Third object 2206 may have third surface 2207.

In this illustrative example, interface 2200 may take the form of corner interface 2201. A corner interface, such as corner interface 2201, may be formed where three seam interfaces meet to join three surfaces or sides of objects.

Seam interface 2208 may be formed between first object 2202 and third object 2206. Seam interface 2210 may be formed between first object 2202 and second object 2204. Seam interface 2212 may be formed between second object 2204 and third object 2206. The point at which seam interfaces 2208, 2210, and 2212 meet may form corner interface 2201.

Nozzle 2000 may be positioned relative to corner interface 2201 such that a fluid, in the form of sealant 2213, may be deposited over corner interface 2201 to form deposition 2215. Deposition 2215, which may be an example of one implementation for deposition 338 in FIG. 3, may be used to seal interface 2200.

Configuration 2009 of plurality of channels 2010 shown in FIGS. 20-21 and the positioning of nozzle 2000 may be selected such that deposition 2215 of sealant 2213 over corner interface 2201 has desired shape 2217. Desired shape 2217 may be an example of one implementation for desired shape 340 in FIG. 3. Further, configuration 2009 of plurality of channels 2010 may be selected such that sealant 2213 exits nozzle 2000 through output 2005 of nozzle 2000 having a desired velocity profile and a desired pressure profile.

Nozzle 2000 may then be moved in the direction of arrow 2214 to further deposit sealant 2213 over seam interface 2208, in the direction of arrow 2216 to further deposit sealant 2213 over seam interface 2210, and in the direction of arrow 2218 to further deposit sealant 2213 over seam interface 2212.

Figure 23:
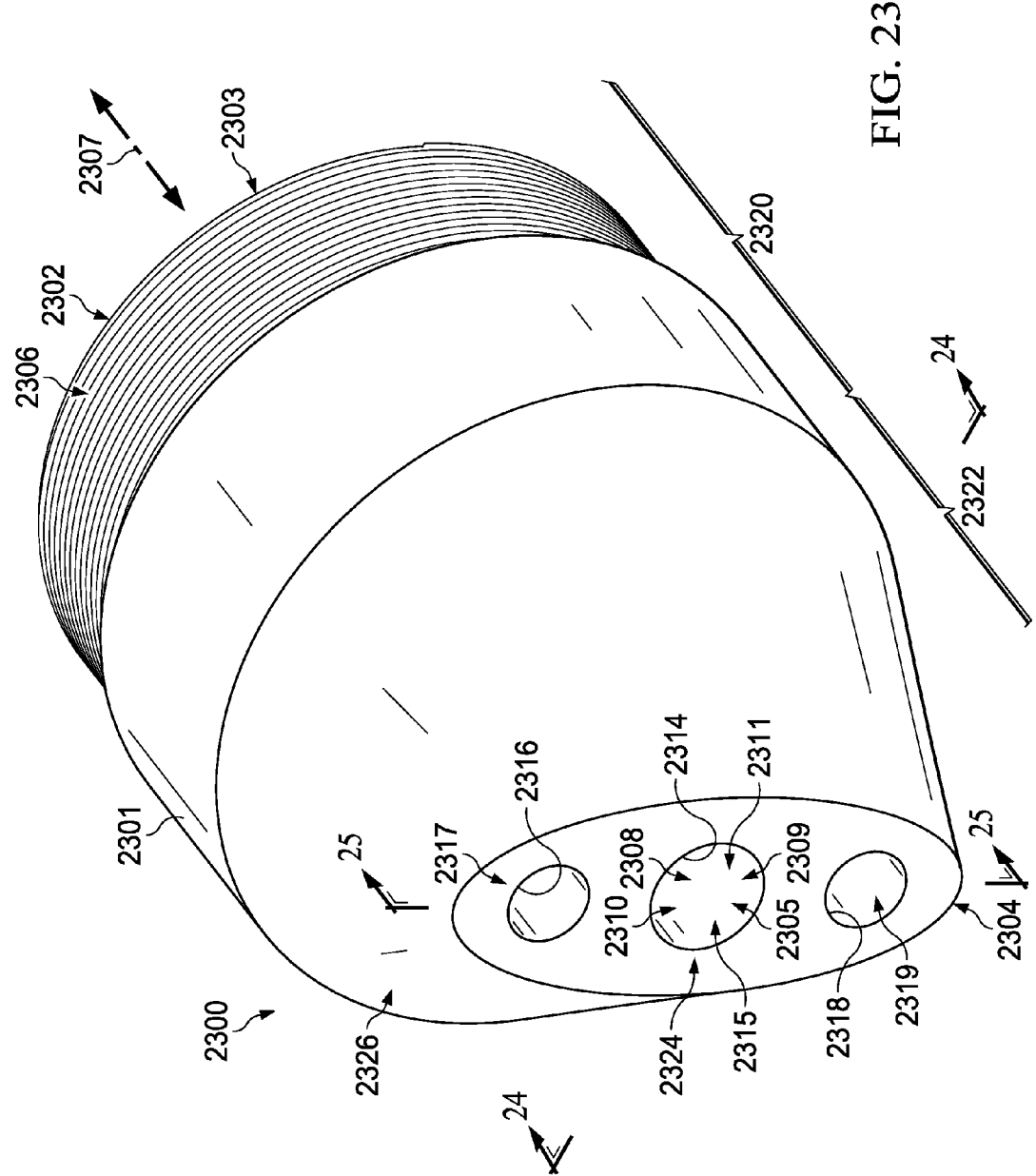
FIG. 23 is an illustration of another type of nozzle in accordance with an illustrative embodiment.

With reference now to FIG. 23, an illustration of another type of nozzle is depicted in accordance with an illustrative embodiment. In this illustrative example, nozzle 2300 may be an example of one implementation for nozzle 300 in FIG. 3. Nozzle 2300 may be a different type of nozzle that may be used in fluid dispensing system 400 shown in FIG. 10 instead of nozzle 1000.

As depicted, nozzle 2300 may have body 2301. Body 2301 may have first end 2302 and second end 2304. Body 2301, first end 2302, and second end 2304 may be examples of implementations for body 302, first end 304, and second end 306, respectively, in FIG. 3.

Nozzle 2300 may have input 2303 at first end 2302 and output 2305 at second end 2304. Input 2303 and output 2305 may be examples of implementation for input 305 and output 307, respectively, in FIG. 3.

As depicted, nozzle 2300 may have external threads 2306 located at first end 2302 of body 2301. External threads 2306 may be configured to engage, for example, without limitation, internal threads 1010 in FIG. 10 to attach nozzle 2300 to housing 402 shown in FIG. 10. Further, nozzle 2300 may have center axis 2307. Center axis 2307 may be an example of one implementation for center axis 311 in FIG. 3.

Input 2303 may be formed by an opening (not shown in this view) at first end 2302. Output 2305 may be formed be plurality of openings 2308. Plurality of openings 2308 may be the open ends of plurality of channels 2310. Plurality of openings 2308 and plurality of channels 2310 may be examples of implementations for plurality of openings 314 and plurality of channels 312, respectively, in FIG. 3.

As depicted, plurality of openings 2308 may have configuration 2309, which may be an example of one implementation for configuration 322 in FIG. 3. Configuration 2309 may be selected such that nozzle 2300 may be used to dispense a fluid (not shown) over an interface (not shown), such as step interface 358 in FIG. 3. Configuration 2309 may include arrangement 2311 of plurality of openings 2308. Arrangement 2311 may be an example of one implementation for arrangement 326 in FIG. 3. Arrangement 2311 may be selected such that the fluid flowing through plurality of channels 2310 exits plurality of openings 2308 in a desired manner.

Arrangement 2311 may include plurality of openings 2308 arranged substantially parallel to each other. In particular, second end 2304 of body 2301 may be substantially planar and thus, plurality of openings 2308 at second end 2304 may be arranged substantially parallel to each other. Arrangement 2311 may be selected such that the fluid flowing through plurality of channels 2310 exits plurality of openings 2308 in a desired manner.

In this illustrative example, plurality of openings 2308 may include center opening 2314 for center channel 2315, opening 2316 for channel 2317, and opening 2318 for channel 2319. Center opening 2314 may be located along center axis 2307. Opening 2316 and opening 2318 may be located away from center axis 2307. In this illustrative example, center opening 2314 may have a larger diameter than the diameters of opening 2316 and opening 2318. Arrangement 2311 may be selected such that opening 2316 and opening 2318 are substantially equally spaced away from center opening 2314.

Further, body 2301 may include first section 2320 and second section 2322. First section 2320 and second section 2322 may be examples of implementations for first section 316 and second section 318, respectively, in FIG. 3. In this illustrative example, second section 2322 of body 2301 may taper towards second end 2304 of body 2301 in a manner that causes second end 2304 to have elliptical shape 2324. In particular, second section 2322 may taper such that the outer shape of second section 2322 takes the form of tapered shape 2326 and such that second end 2304 has elliptical shape 2324. Elliptical shape 2324 may be an elliptical cross-sectional shape of second end 2304 taken substantially perpendicularly with respect to center axis 2307.

Tapered shape 2326 of second section 2322, and in particular, elliptical shape 2324 of second end 2304, may allow second end 2304 to be positioned relative to hard-to-reach locations. For example, the tapering of second section 2322 may allow second end 2304 to be positioned relative to stepped surfaces and lap joints.

Figure 24:
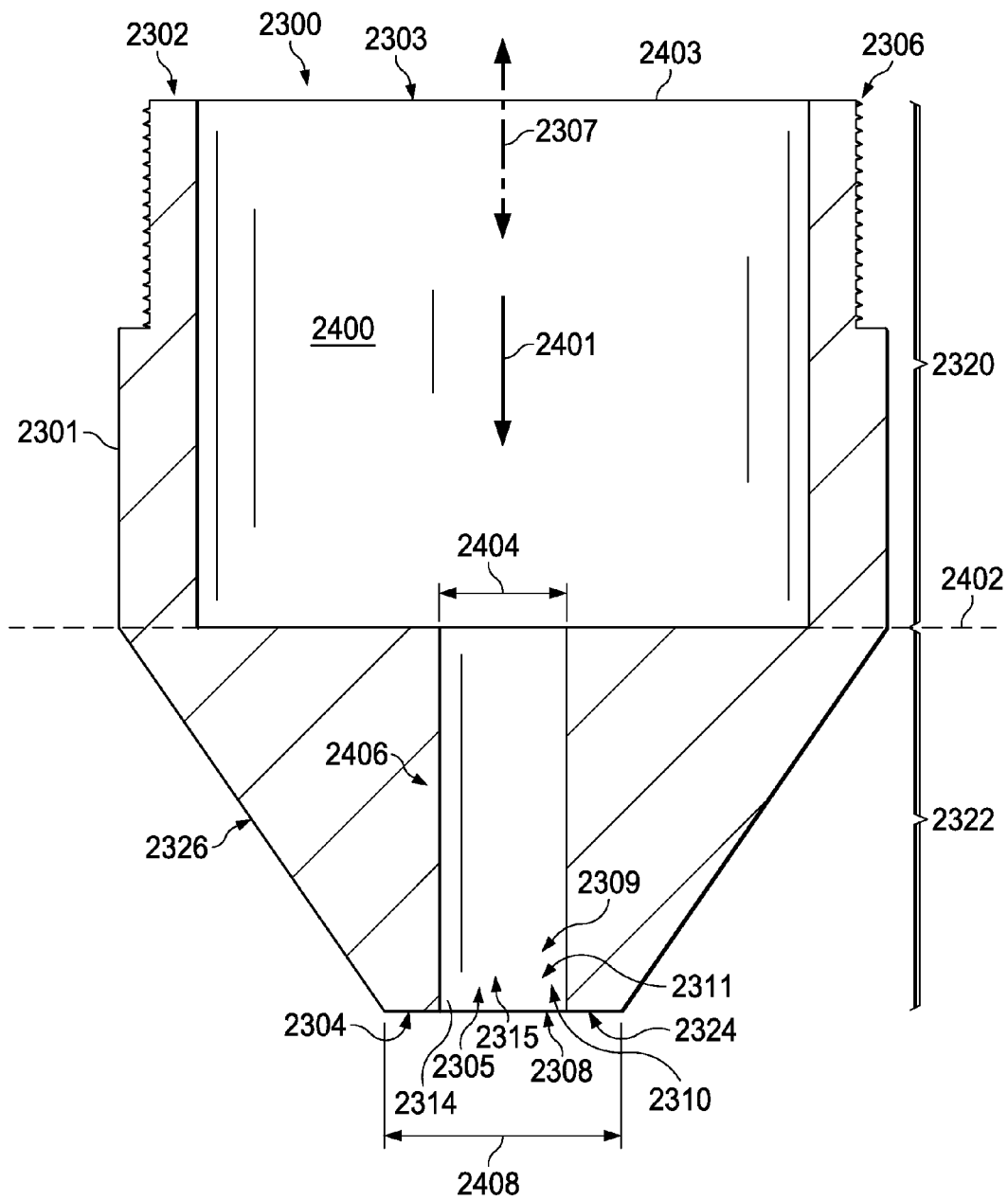
FIG. 24 is an illustration of a first cross-sectional view of a nozzle in accordance with an illustrative embodiment.

With reference now to FIG. 24, an illustration of a first cross-sectional view of nozzle 2300 from FIG. 23 is depicted in accordance with an illustrative embodiment. In this illustrative example, a first cross-sectional view of nozzle 2300 from FIG. 23 is depicted taken with respect to lines 24-24 through center axis 2307 in FIG. 23.

First section 2320 may have cavity 2400 configured to receive a fluid. A fluid (not shown) may flow in the direction of arrow 2401 into cavity 2400 into nozzle 2300. Cavity 2400 may be an example of one implementation for cavity 320 in FIG. 3. Cavity 2400 may receive the fluid through opening 2403 at first end 2302 of body 2301. Opening 2403 may be an example of one implementation of an opening in number of openings 313 in FIG. 3. Opening 2403 may form input 2303 of nozzle 2300.

As depicted, first section 2320 of body 2301 may extend from first end 2302 of body 2301 to plane 2402 through body 2301. Second section 2322 may extend from plane 2402 to second end 2304 of body 2301.

The fluid may flow through cavity 2400 in first section 2320 into plurality of channels 2310 in second section 2322. As depicted, only center channel 2315 is shown in this cross-sectional view. Center channel 2315 may have cross-sectional diameter 2404. Cross-sectional diameter 2404 may remain substantially constant with respect to center axis 2307. In other words, cross-sectional diameter 2404 may not vary between plane 2402 and second end 2304.

Cross-sectional diameter 2404 may form a portion of diameter profile 2406 for plurality of channels 2310. Diameter profile 2406 may be part of configuration 2309. Diameter profile 2406 may be an example of one implementation for diameter profile 324 in FIG. 3. Diameter profile 2406 may be selected such that the fluid flowing through plurality of channels 2310 exits plurality of openings 2308 in a desired manner.

In this illustrative example, tapered shape 2326 may include first diameter 2408. First diameter 2408 may be the diameter of second section 2322 at second end 2304 of second section 2322 with respect to the current cross-sectional view of nozzle 2300.

Figure 25:
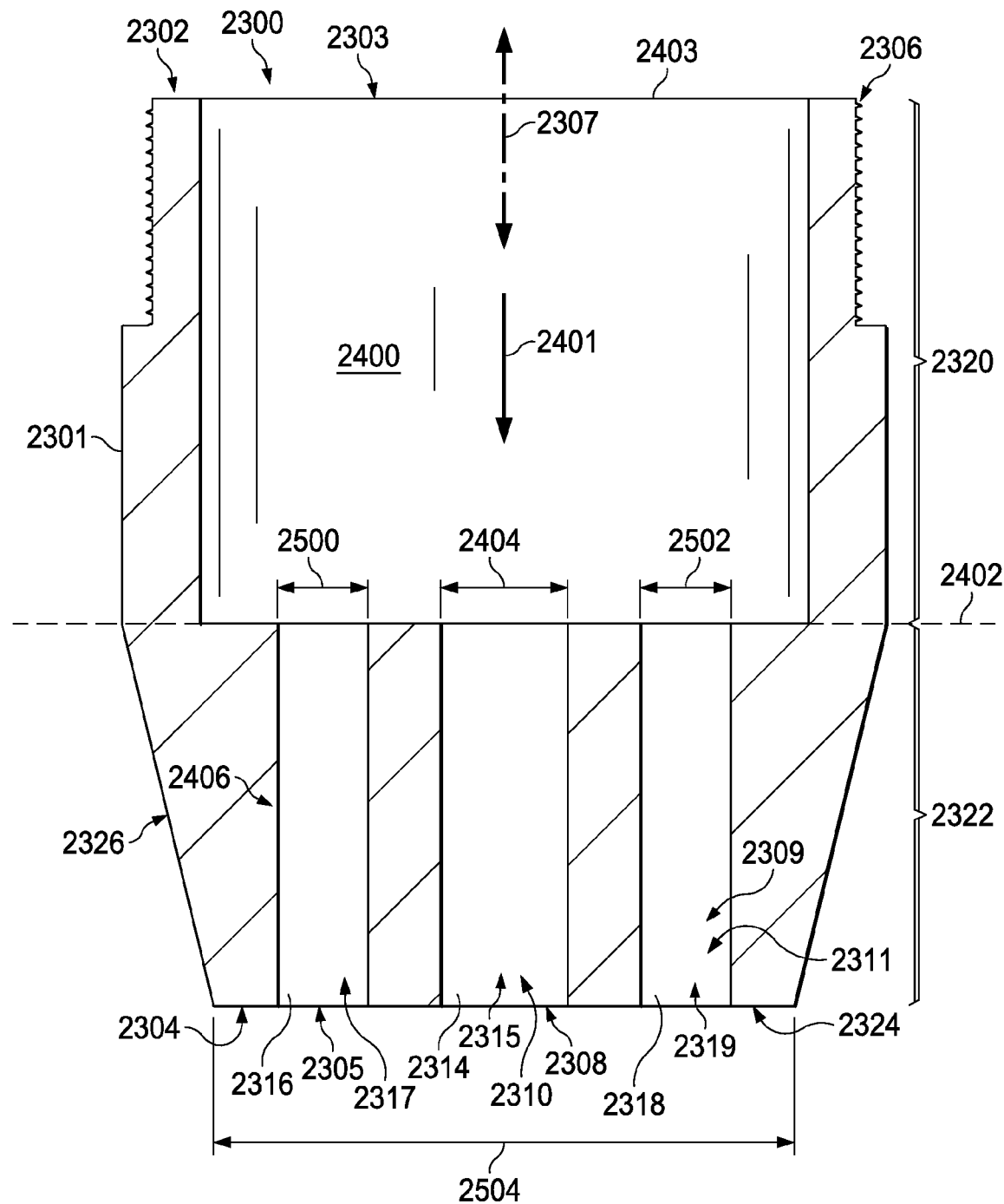
FIG. 25 is an illustration of a second cross-sectional view of a nozzle in accordance with an illustrative embodiment.

With reference now to FIG. 25, an illustration of a second cross-sectional view of nozzle 2300 from FIG. 23 is depicted in accordance with an illustrative embodiment. In this illustrative example, a second cross-sectional view of nozzle 2300 from FIG. 23 is depicted taken with respect to lines 25-25 through center axis 2307 in FIG. 23.

As depicted, channel 2317 and channel 2319 may be seen in this cross-sectional view. Channel 2317 and channel 2319 may have cross-sectional diameter 2500 and cross-sectional diameter 2502, respectively. Cross-sectional diameter 2500 and cross-sectional diameter 2502 may remain substantially constant with respect to center axis 2307. In other words, cross-sectional diameter 2500 and cross-sectional diameter 2502 may not vary between plane 2402 and second end 2304. Cross-sectional diameter 2500 and cross-sectional diameter 2502 may form a portion of diameter profile 2406 for plurality of channels 2310.

In this illustrative example, tapered shape 2326 may include second diameter 2504. Second diameter 2504 may be the diameter of second section 2322 at second end 2304 of second section 2322 with respect to the current cross-sectional view of nozzle 2300. Second diameter 2504 may be greater than first diameter 2408 in FIG. 24.

Figure 26:
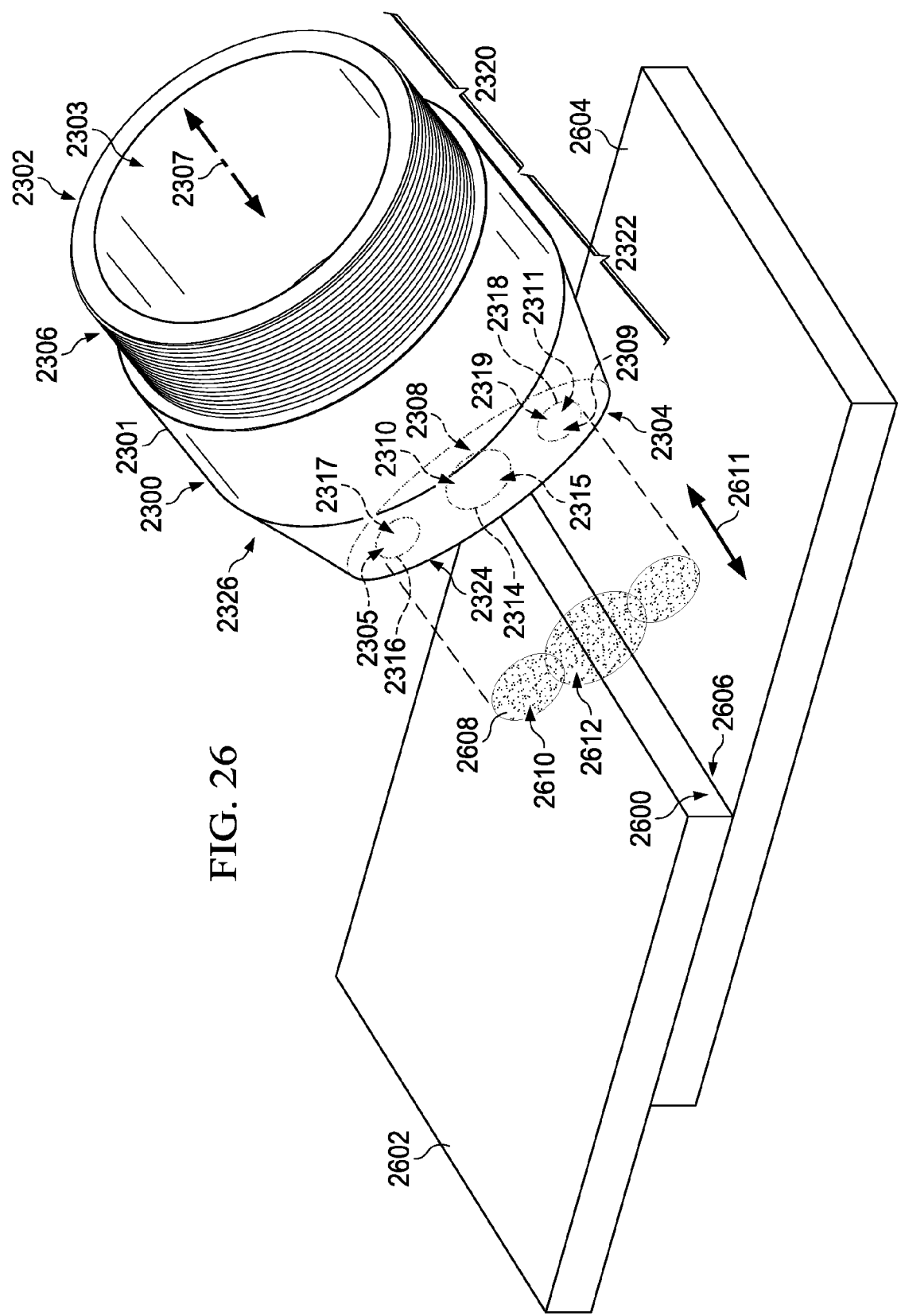
FIG. 26 is an illustration of a nozzle being used to seal a step interface in accordance with an illustrative embodiment.

With reference now to FIG. 26, an illustration of nozzle 2300 from FIGS. 23-25 being used to seal a step interface is depicted in accordance with an illustrative embodiment. In this illustrative example, nozzle 2300 may be used to seal interface 2600 formed between first object 2602 and second object 2604. Interface 2600 may be an example of one implementation for interface 346 in FIG. 3.

In this illustrative example, interface 2600 may take the form of step interface 2606. Step interface 2606 may be an example of one implementation for step interface 358 in FIG. 3. A step interface, such as step interface 2606, may be formed when two objects are overlapped such that a "step" is formed between them. A step interface may also be referred to as a lap joint in some cases.

Nozzle 2300 may be positioned relative to step interface 2606 such that a fluid, in the form of sealant 2608, may be deposited over step interface 2606 to form deposition 2610. Deposition 2610 may be an example of one implementation for deposition 338 in FIG. 3. Tapered shape 2326 of second section 2322 may allow nozzle 2300 to be positioned within some desired distance from step interface 2606 and to be easily moved along step interface 2606. Nozzle 2300 may be moved in the direction of arrow 2611 to further deposit sealant 2608 along step interface 2606.

In this illustrative example, nozzle 2300 may be positioned such that second diameter 2504, shown in FIG. 25, of tapered shape 2326 is substantially perpendicular to step interface 2606. However, in other examples, nozzle 2300 may be positioned such that second diameter 2504, shown in FIG. 25, of tapered shape 2326 is substantially parallel to step interface 2606.

Configuration 2309 of plurality of channels 2310 and the positioning of nozzle 2300 may be selected such that deposition 2610 of sealant 2608 over step interface 2606 has desired shape 2612. Further, configuration 2309 of plurality of channels 2310 may be selected such that sealant 2608 exits nozzle 2300 through output 2305 of nozzle 2300 having a desired velocity profile and a desired pressure profile.

Figure 27:
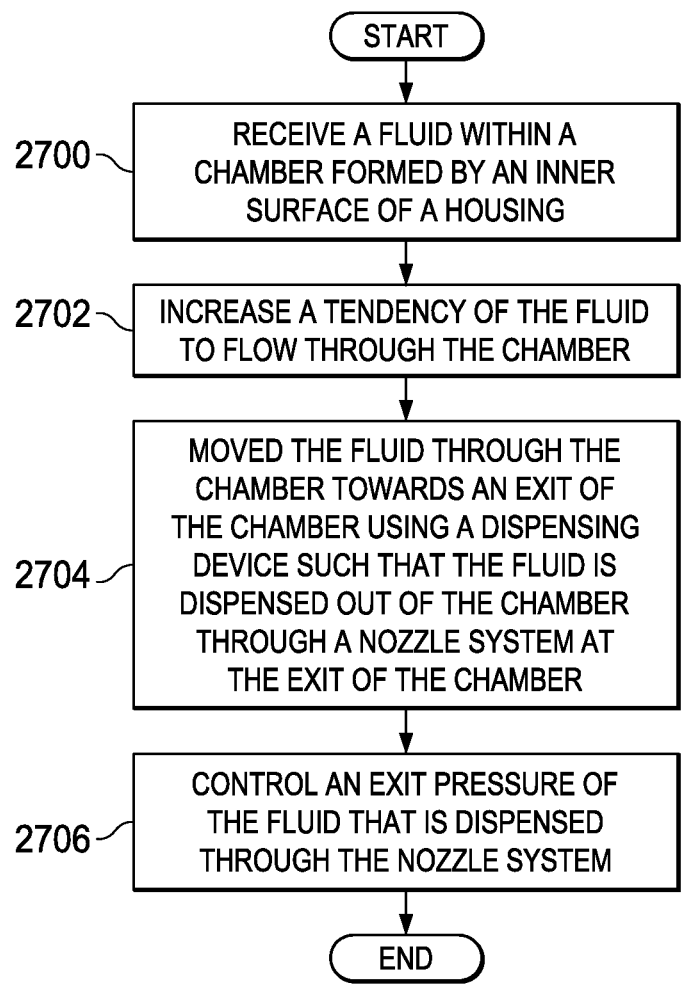
FIG. 27 is an illustration of a process for dispensing fluid in the form of a flowchart in accordance with an illustrative embodiment.

With reference now to FIG. 27, an illustration of a process for dispensing fluid is depicted in the form of a flowchart in accordance with an illustrative embodiment. The process illustrated in FIG. 27 may be implemented using fluid dispensing system 102 in FIG. 1.

The process may begin by receiving fluid 104 within chamber 115 formed by inner surface 126 of housing 114 (operation 2700). Further, inner surface 126 may be comprised of friction-reducing material 128. Next, a tendency of fluid 104 to flow through chamber 115 may be increased (operation 2702).

Thereafter, fluid 104 may be moved through chamber 115 towards exit 150 of chamber 115 using dispensing device 120 such that fluid 104 is dispensed out of chamber 115 through nozzle system 121 at exit 150 of chamber 115 (operation 2704). The exit pressure of fluid 104 dispensed through nozzle system 121 may be controlled (operation 2706), with the process terminating thereafter. In particular, nozzle system 121 may include nozzle 122 and nozzle screen 152 in which at least one of nozzle 122 and nozzle screen 152 may be used to control the exit pressure of fluid 104 such that fluid 104 exits nozzle system 121 at the desired velocity.

Figure 28:
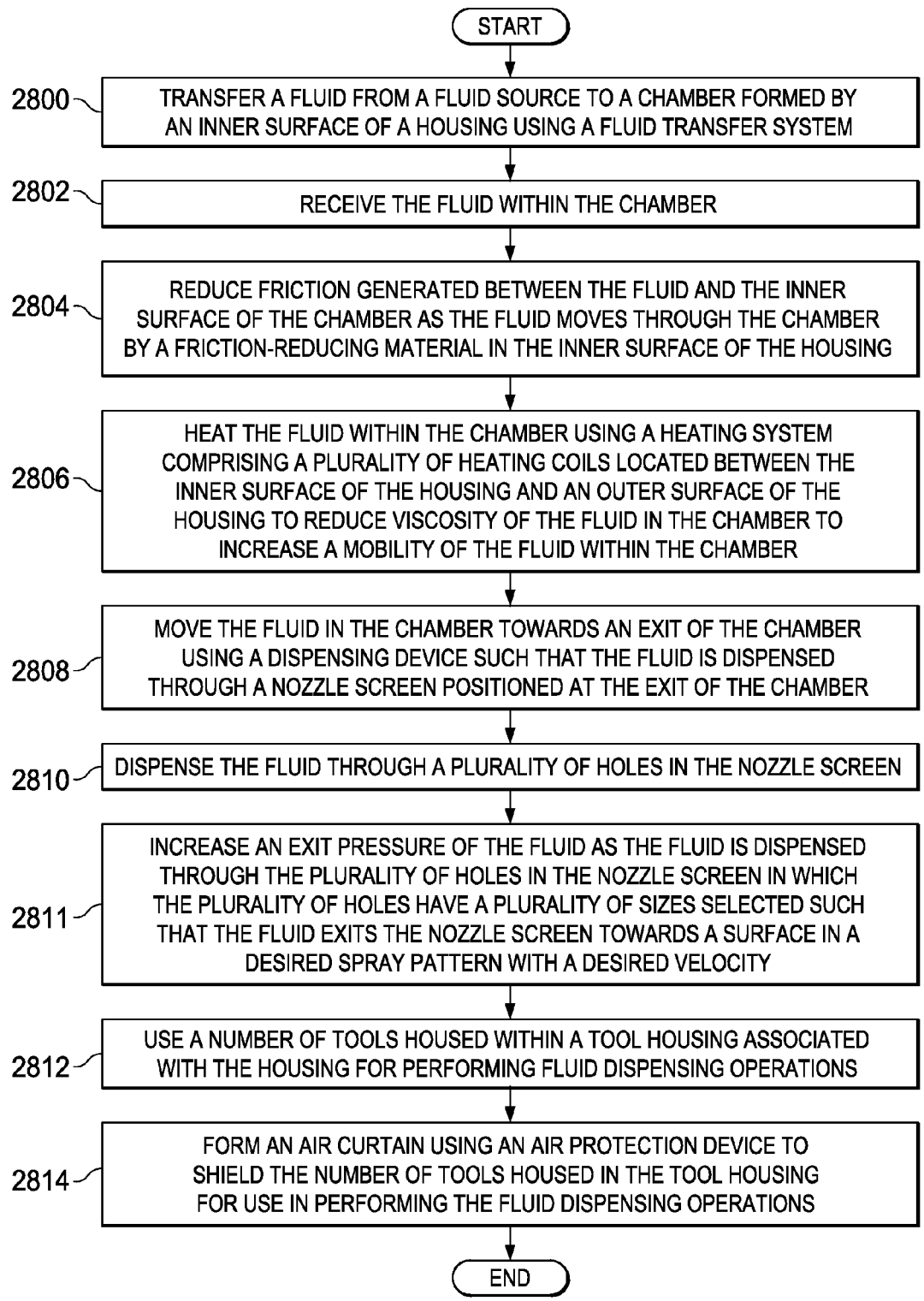
FIG. 28 is an illustration of a process for dispensing fluid in the form of a flowchart in accordance with an illustrative embodiment.

With reference now to FIG. 28, an illustration of a process for dispensing fluid is depicted in the form of a flowchart in accordance with an illustrative embodiment. The process in FIG. 28 may be implemented using fluid dispensing system 102 in FIG. 1.

The process may begin by transferring fluid 104 from fluid source 132 to chamber 115 formed by inner surface 126 of housing 114 using fluid transfer system 116 (operation 2800). Fluid 104 may be received within chamber 115 (operation 2802). Inner surface 126 may be comprised of friction-reducing material 128. In one illustrative example, friction-reducing material 128 may take the form of polytetrafluoroethylene 130.

Further, friction generated between fluid 104 and inner surface 126 of chamber 115 as fluid 104 moves through chamber 115 may be reduced by friction-reducing material 128 in inner surface 126 of housing 114 (operation 2804). Fluid 104 within chamber 115 may be heated using heating system 118 comprising plurality of heating coils 140 located between inner surface 126 of housing 114 and outer surface 124 of housing 114 to reduce viscosity 110 of fluid 104 in chamber 115 to increase a mobility of fluid 104 within chamber 115 (operation 2806).

Fluid 104 in chamber 115 may be moved towards exit 150 of chamber 115 using dispensing device 120 such that fluid 104 is dispensed through nozzle screen 152 positioned at exit 150 of chamber 115 (operation 2808). Fluid 104 may be dispensed through plurality of holes 206 in nozzle screen 152 (operation 2810). Further, an exit pressure of fluid 104 may be increased as fluid 104 is dispensed through plurality of holes 206 in nozzle screen 152 in which plurality of holes 206 have plurality of sizes 207 selected such that fluid 104 exits nozzle screen 152 towards surface 106 in a desired spray pattern with a desired velocity (operation 2811).

Number of tools 158 housed within tool housing 160 associated with housing 114 may be used for performing fluid dispensing operations (operation 2812). An air curtain may be formed using air protection device 162 to shield number of tools 158 housed in tool housing 160 for use in performing fluid dispensing operations (operation 2814), with the process terminating thereafter. In particular, in operation 2814, the air curtain formed by air protection device 162 may be used to shield number of tools 158 from fluid spatter and/or other types of debris.

Figure 29:
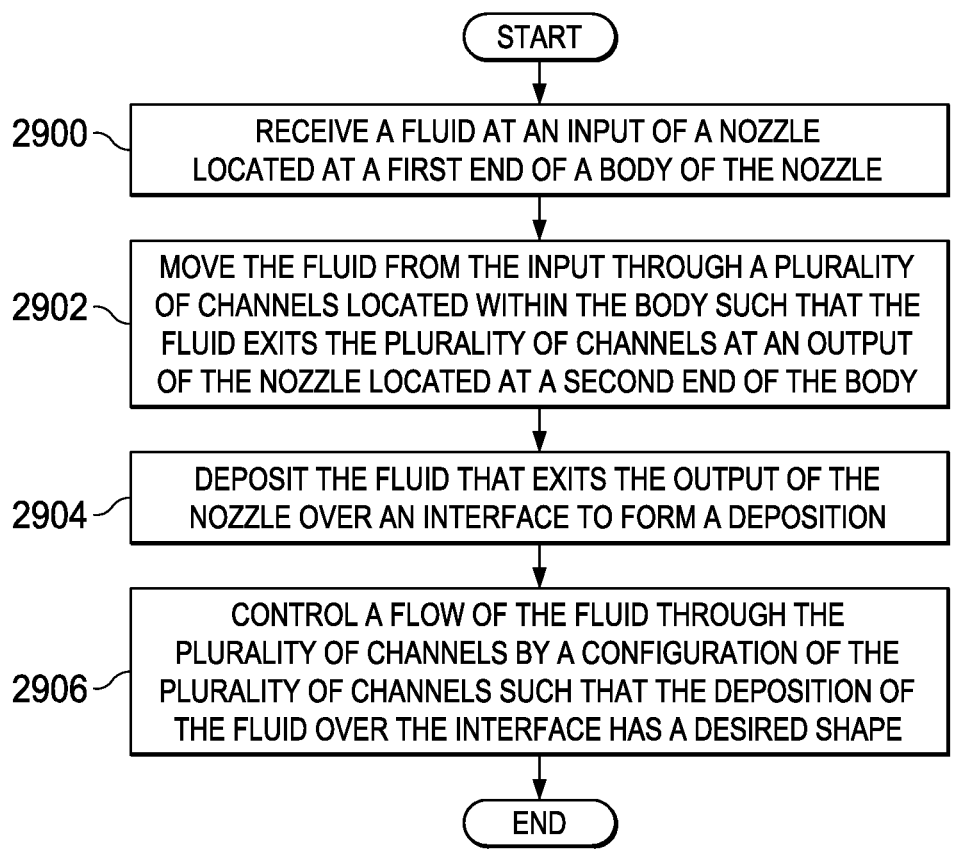
FIG. 29 is an illustration of a process for depositing fluid over an interface in the form of a flowchart in accordance with an illustrative embodiment.

With reference now to FIG. 29, an illustration of a process for depositing fluid over an interface is depicted in the form of a flowchart in accordance with an illustrative embodiment. The process illustrated in FIG. 29 may be performed using nozzle 300 in FIG. 3.

The process may begin by receiving fluid 104 at input 305 of nozzle 300 located at first end 304 of body 302 of nozzle 300 (operation 2900). Next, fluid 104 may be moved from input 305 through plurality of channels 312 located within body 302 such that fluid 104 exits plurality of channels 312 at output 307 of nozzle 300 located at second end 306 of body 302 (operation 2902).

Fluid 104 that exits output 307 of nozzle 300 may then be deposited over interface 346 to form deposition 338 (operation 2904). A flow of fluid 104 through plurality of channels 312 may be controlled by configuration 322 of plurality of channels 312 such that deposition 338 of fluid 104 over interface 346 has desired shape 340 (operation 2906), with the process terminating thereafter.

Figure 30:
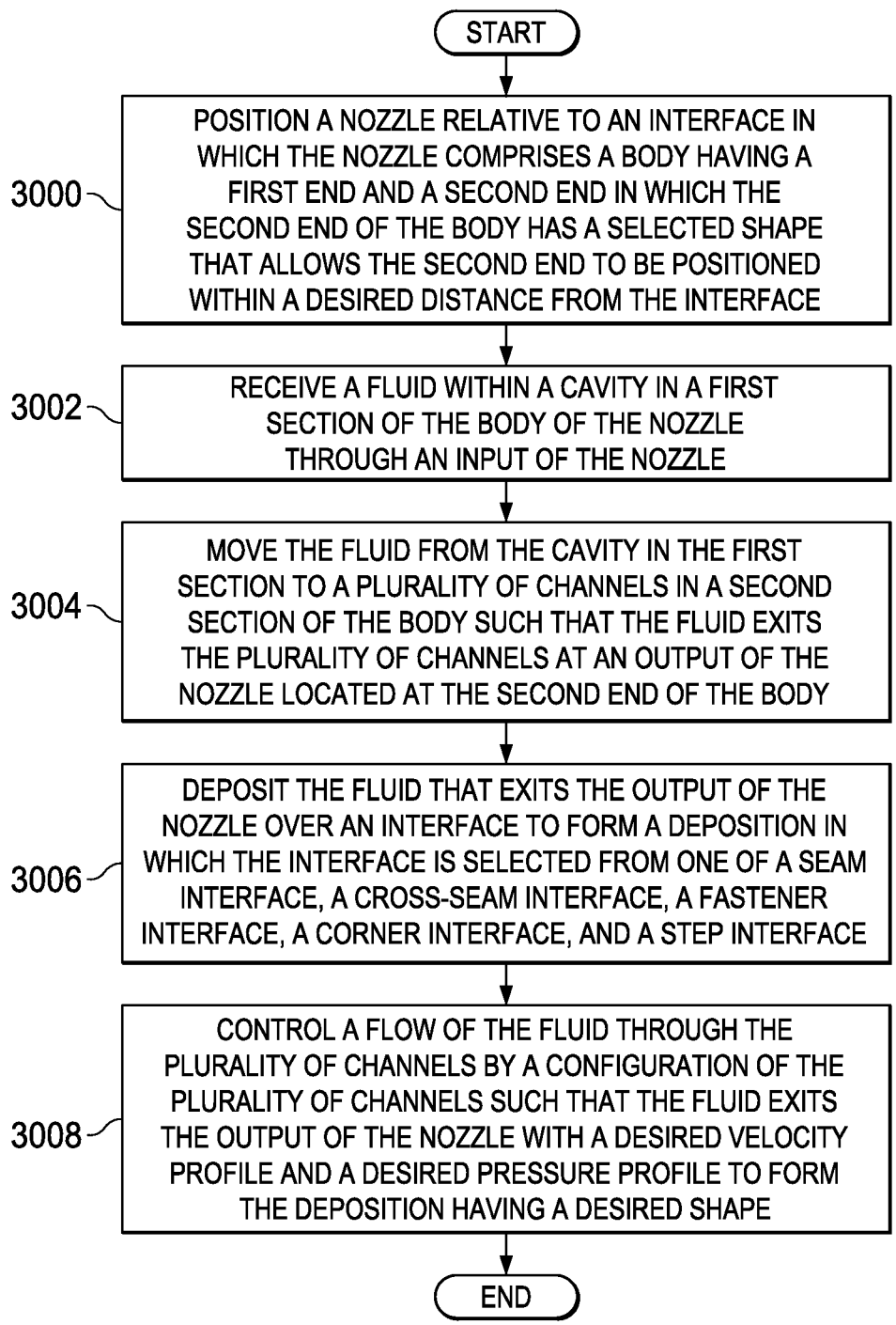
FIG. 30 is an illustration of a process for depositing a fluid over an interface using a nozzle in the form of a flowchart in accordance with an illustrative embodiment.

With reference now to FIG. 30, an illustration of a process for depositing a fluid over an interface using a nozzle is depicted in the form of a flowchart in accordance with an illustrative embodiment. The process illustrated in FIG. 30 may be performed using nozzle 300 in FIG. 3.

The process may begin by positioning nozzle 300 relative to interface 346 in which nozzle 300 comprises body 302 having first end 304 and second end 306 in which second end 306 of body 302 has selected shape 327 that allows second end 306 to be positioned within a desired distance from interface 346 (operation 3000). Next, fluid 104 may be received within cavity 320 in first section 316 of body 302 of nozzle 300 through input 305 of nozzle 300 (operation 3002). When nozzle 300 is attached to housing 114 of fluid dispensing system 102, fluid 104 received within cavity 320 may be fluid 104 that is moved, by dispensing device 120 of fluid dispensing system 102, within chamber 115 in housing 114 towards exit 150 of chamber 115 such that fluid 104 is dispensed through exit 150 of chamber 115 into cavity 320 through input 305.

Thereafter, fluid 104 may be moved from cavity 320 in first section 316 to plurality of channels 312 in second section 318 of body 302 such that fluid 104 exits plurality of channels 312 at output 307 of nozzle 300 located at second end 306 of body 302(operation 3004). Fluid 104 that exits output 307 of nozzle 300 may then be deposited over interface 346 to form deposition 338 in which interface 346 is selected from one of seam interface 350, cross-seam interface 352, fastener interface 354, corner interface 356, and step interface 358 (operation 3006).

A flow of fluid 104 through plurality of channels 312 may be controlled by configuration 322 of plurality of channels 312 such that fluid 104 exits output 307 of nozzle 300 with desired velocity profile 342 and desired pressure profile 344 to form deposition 338 having desired shape 340 (operation 3008), with the process terminating thereafter. In this manner, nozzle 300 may be used to dispense and deposit a fluid, such as fluid 104, over different types of interfaces. In particular, different configurations for nozzle 300 may be used for depositing fluid 104 over different types of interfaces.

Illustrative embodiments of the disclosure may be described in the context of aircraft manufacturing and service method 3100 as shown in FIG. 31 and aircraft 3200 as shown in FIG. 32. Turning first to FIG. 31, an illustration of an aircraft manufacturing and service method is depicted in the form of a flowchart in accordance with an illustrative embodiment. During pre-production, aircraft manufacturing and service method 3100 may include specification and design 3102 of aircraft 3200 in FIG. 32 and material procurement 3104.

During production, component and subassembly manufacturing 3106 and system integration 3108 of aircraft 3200 in FIG. 32 takes place. Thereafter, aircraft 3200 in FIG. 32 may go through certification and delivery 3110 in order to be placed in service 3112. While in service 3112 by a customer, aircraft 3200 in FIG. 32 is scheduled for routine maintenance and service 3114, which may include modification, reconfiguration, refurbishment, and other maintenance or service.

Each of the processes of aircraft manufacturing and service method 3100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 32, an illustration of an aircraft is depicted in the form of a block diagram in which an illustrative embodiment may be implemented. In this example, aircraft 3200 is produced by aircraft manufacturing and service method 3100 in FIG. 31 and may include airframe 3202 with plurality of systems 3204 and interior 3206. Examples of systems 3204 include one or more of propulsion system 3208, electrical system 3210, hydraulic system 3212, and environmental system 3214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3100 in FIG. 31. In particular, fluid dispensing system 102 from FIG. 1 may be used for applying fluid 104, such as sealant 105, to one or more objects of aircraft 3200 during any one of the stages of aircraft manufacturing and service method 3100. For example, without limitation, fluid dispensing system 102 from FIG. 1 may be used to dispense and apply sealant 105 in FIG. 1 during at least one of component and subassembly manufacturing 3106, system integration 3108, routine maintenance and service 3114, or some other stage of aircraft manufacturing and service method 3100.

Further, nozzle 300 in FIG. 3 may be used for dispensing and depositing sealant 105 over different types of structural interfaces in aircraft 3200 to seal these interfaces. Nozzle 300 may be used during at least one of component and subassembly manufacturing 3106, system integration 3108, routine maintenance and service 3114, or some other stage of aircraft manufacturing and service method 3100. Further, nozzle 300 may be used to seal interfaces during the manufacturing and assembly of airframe 3202, interior 3206, and components within systems 3204 of aircraft 3200.

In one illustrative example, components or subassemblies produced in component and subassembly manufacturing 3106 in FIG. 31 may be fabricated or manufactured in a manner similar to components or subassemblies produced while aircraft 3200 is in service 3112 in FIG. 31. As yet another example, one or more apparatus embodiments, method embodiments, or a combination thereof may be utilized during production stages, such as component and subassembly manufacturing 3106 and system integration 3108 in FIG. 31. One or more apparatus embodiments, method embodiments, or a combination thereof may be utilized while aircraft 3200 is in service 3112 and/or during maintenance and service 3114 in FIG. 31. The use of a number of the different illustrative embodiments may substantially expedite the assembly of and/or reduce the cost of aircraft 3200.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in FIG. 30, operations 3004 and operation 3008 may be performed simultaneously such that the flow of fluid 104 through plurality of channels 312 may be controlled as fluid 104 is moving through plurality of channels 312. In some cases, operation 3008 may be considered as being performed prior to the deposition of fluid 104 over interface 346 in FIG. 3.

Thus, the different illustrative embodiments provide an apparatus and method for depositing a fluid, such as sealant 105 in FIG. 1 over different types of interfaces. Using nozzle 300 in FIG. 3 to deposit sealant 105 over an interface, such as interface 346 in FIG. 3, may reduce the overall time and effort needed to seal interfaces. By having configuration 322 of plurality of channels 312 that is selected based on the type of interface 346 being sealed, nozzle 300 may be configured to form deposition 338 having desired shape 340. Desired shape 340 may be selected to improve the quality of the seal formed for that particular type of interface 346.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An apparatus comprising:
   a housing having a chamber configured to receive a fluid in which the chamber is configured to increase a tendency of the fluid to flow within the chamber;

a dispensing device configured to move the fluid in the chamber towards an exit of the chamber such that the fluid is dispensed through the exit of the chamber; and a nozzle comprising:
- a body having a first end and a second end;
- an input located at the first end of the body and configured to receive the fluid from the exit of the chamber;
- an output located at the second end of the body; and
- a plurality of channels located within the body in which the plurality of channels has a configuration that causes the fluid received through the input to flow through the plurality of channels and exit the output to form a deposition having a desired shape over an interface, wherein the configuration of the plurality of channels comprises:
  - a diameter profile that includes a cross-sectional diameter for each of the plurality of channels; and
  - an arrangement of the plurality of channels relative to each other and relative to the second end of the body, wherein the arrangement is selected such that the plurality of channels includes a center channel located along a center axis that extends through the first end and the second end of the body of the nozzle and outer channels located away from the center axis around the center channel, wherein the diameter profile is selected such that the cross-sectional diameter of the center channel varies along a length that extends along the center axis and the cross-sectional diameter of each of the outer channels remains substantially constant along the center axis.

2. The apparatus of claim 1, wherein the configuration of the plurality of channels causes the fluid flowing through the plurality of channels to exit the output of the body with a desired velocity profile and a desired pressure profile.

3. The apparatus of claim 1, wherein the diameter profile is selected such that the cross-sectional diameter of the center channel in the plurality of channels is larger than the cross-sectional diameter of an outer channel in the plurality of channels along the center axis through the nozzle.

4. The apparatus of claim 1, wherein the diameter profile is selected such that the cross-sectional diameter of each of the outer channels is substantially equal.

5. The apparatus of claim 1, wherein the diameter profile is selected such that the cross-sectional diameter of the center channel is larger than the cross-sectional diameter of each of the outer channels at corresponding locations along the center axis.

6. The apparatus of claim 1, wherein the output of the nozzle comprises:
- a plurality of openings of the plurality of channels located at the second end of the body, wherein the plurality of openings is arranged such that the plurality of openings substantially conform to a selected shape of the second end.

7. The apparatus of claim 6, wherein the selected shape is a concave shape.

8. The apparatus of claim 1, wherein the body of the nozzle comprises:
- a first section having a cavity configured to receive the fluid through the input; and
- a second section having the plurality of channels, wherein the fluid flows from the cavity to the plurality of channels.

9. The apparatus of claim 8, wherein the second section has an outer shape configured for positioning the nozzle relative to the interface within a desired distance from the interface.

10. The apparatus of claim 1, wherein the body has external threads located at the first end of the body and configured to engage internal threads inside a chamber of a housing for a fluid dispensing system.

11. The apparatus of claim 1, wherein the fluid is a sealant.

12. The apparatus of claim 1, wherein the interface is selected from one of a seam interface, a cross-seam interface, a fastener interface, a corner interface, and a step interface.

13. A fluid dispensing system comprising:
- a housing having a chamber configured to receive a fluid in which the chamber is configured to increase a tendency of the fluid to flow within the chamber;
- a dispensing device configured to move the fluid in the chamber towards an exit of the chamber such that the fluid is dispensed through the exit of the chamber; and
- a nozzle comprising:
  - a body having a first end and a second end in which the body includes a first section that extends from the first end to a plane through the body and a second section that extends from the plane to the second end of the body;
  - a plurality of channels located within the body and having a plurality of openings in which the plurality of channels has a configuration that includes a diameter profile and an arrangement, wherein the diameter profile includes a cross-sectional diameter of a center channel located along a center axis that extends through the first end and the second end of the body, and a cross-sectional diameter of outer channels, and wherein the cross-sectional diameter of the center channel varies along a length that extends along the center axis and the cross-sectional diameter of each of the outer channels remains substantially constant along the center axis;
  - an input located at the first end of the body and configured to receive the fluid from the exit of the chamber;
  - a cavity configured to receive the fluid from the input; and
  - an output located at the second end of the body and formed by the plurality of openings of the plurality of channels in which the configuration of the plurality of channels causes the fluid flowing through the plurality of channels to exit the output with a desired velocity profile and a desired pressure profile to form a deposition having a desired shape over an interface in which the interface is selected from one of a seam interface, a cross-seam interface, a fastener interface, a corner interface, and a step interface.

14. A nozzle comprising:
- a body having a first end and a second end;
- an input located at the first end of the body and configured to receive a fluid;
- an output located at the second end of the body; and
- a plurality of channels located within the body in which the plurality of channels has a configuration that causes the fluid received through the input to flow through the plurality of channels and exit the output to form a deposition having a desired shape over an interface;
- wherein the plurality of channels includes a center channel and outer channels surrounding the center channel, wherein the center channel is located along a center axis that extends through the first end of the body and the second end of the body, the center channel having a cross-sectional diameter that varies along a length extending along the center axis, and wherein each of the outer channels has a cross-sectional diameter that remains substantially constant along the center axis.

* * * * *